United States Patent
Nojima

(10) Patent No.: US 7,834,579 B2
(45) Date of Patent: Nov. 16, 2010

(54) LOW VOLTAGE, TWO-LEVEL, SIX-PULSE INDUCTION MOTOR CONTROLLER DRIVING A MEDIUM-TO-HIGH VOLTAGE, THREE-OR-MORE-LEVEL AC DRIVE INVERTER BRIDGE

(75) Inventor: Geraldo Nojima, Duluth, GA (US)

(73) Assignee: Eaton Corporation, Cleveland, OH (US)

( * ) Notice: Subject to any disclaimer, the term of this patent is extended or adjusted under 35 U.S.C. 154(b) by 1281 days.

(21) Appl. No.: 10/522,792

(22) PCT Filed: Jul. 31, 2003

(86) PCT No.: PCT/US03/19887

§ 371 (c)(1),
(2), (4) Date: Mar. 15, 2006

(87) PCT Pub. No.: WO2004/015851

PCT Pub. Date: Feb. 19, 2004

(65) Prior Publication Data

US 2006/0197491 A1    Sep. 7, 2006

Related U.S. Application Data

(60) Provisional application No. 60/399,355, filed on Jul. 31, 2002, provisional application No. 60/453,817, filed on Mar. 12, 2003.

(51) Int. Cl.
*H02P 7/00*    (2006.01)
*H02P 27/04*   (2006.01)

(52) U.S. Cl. ................. 318/801; 318/800; 318/254.2; 363/37; 363/71; 363/98; 363/132; 388/811; 388/812

(58) Field of Classification Search ............ 318/254.2, 318/800, 801; 388/811, 812; 363/37, 71, 363/98, 132

See application file for complete search history.

(56) References Cited

U.S. PATENT DOCUMENTS

| | | | |
|---|---|---|---|
| 5,463,296 A | 10/1995 | Fugere et al. | |
| 5,517,401 A | 5/1996 | Kinoshita et al. | |
| 5,734,565 A * | 3/1998 | Mueller et al. | 363/132 |
| 5,909,367 A * | 6/1999 | Change | 363/163 |
| 5,977,741 A | 11/1999 | DeLange et al. | |
| 6,005,788 A * | 12/1999 | Lipo et al. | 363/71 |
| 6,058,032 A * | 5/2000 | Yamanaka et al. | 363/71 |
| 6,118,932 A * | 9/2000 | Maurio et al. | 388/811 |

(Continued)

FOREIGN PATENT DOCUMENTS

EP    0 512 531 A3    11/1992

*Primary Examiner*—Paul Ip
(74) *Attorney, Agent, or Firm*—Martin J. Moran

(57) ABSTRACT

A method and circuit enabling off-the-shelf controllers designed for use with a two-level AC drive inverter bridge (1920) to drive inverter bridges with three-or-more levels. Signals from an ordinary induction motor controller or a two-level induction motor controller (2200) are used to drive the twelve-or-more switches of a three-or-more level inverter bridge (1920), as are used in medium-and-high voltage applications. The proper sequence and timing of switching for the three-or-more-level inverter bridge is based in-part upon either the output of the six pulse-width modulators, or the output of the flux and torque control device, or the voltage control device (2210), of the two-level controller (2200).

36 Claims, 41 Drawing Sheets

U.S. PATENT DOCUMENTS

| | | |
|---|---|---|
| 6,166,514 A | 12/2000 | Ando et al. |
| 6,229,722 B1 * | 5/2001 | Ichikawa et al. ............... 363/71 |
| 6,232,742 B1 | 5/2001 | Wacknov et al. |
| 6,236,580 B1 * | 5/2001 | Aiello et al. ................... 363/37 |
| 6,242,884 B1 | 6/2001 | Lipo et al. |
| 6,369,543 B1 | 4/2002 | Masselus et al. |
| 7,110,272 B2 * | 9/2006 | Nojima ..................... 363/56.03 |
| 7,253,574 B2 * | 8/2007 | Su et al. ................... 318/254.2 |
| 7,339,803 B2 * | 3/2008 | Nojima ......................... 363/37 |
| 7,436,147 B2 * | 10/2008 | Sato et al. .................... 318/800 |
| 2005/0281065 A1 * | 12/2005 | Nojima ......................... 363/98 |
| 2006/0245222 A1 * | 11/2006 | Nojima ........................ 363/132 |

\* cited by examiner

| | SWITCH STATE | OFF | ON | |
|---|---|---|---|---|
| 3 LEVEL | 1) | S1,S2 | S3,S4 | |
| | 2) | S1,S4 | S2,S3 | FIG. 4A |
| | 3) | S3,S4 | S1,S2 | |
| | | | | |
| 4 LEVEL | 1) | S1,S2,S3 | S4,S5,S6 | |
| | 2) | S1,S2,S6 | S3,S4,S5 | |
| | 3) | S1,S5,S6 | S2,S3,S4 | FIG. 4B |
| | 4) | S4,S5,S6 | S1,S2,S3 | |
| | | | | |
| 5 LEVEL | 1) | S1,S2,S3,S4 | S5,S6,S7,S8 | |
| | 2) | S1,S2,S3,S8 | S4,S5,S6,S7 | |
| | 3) | S1,S2,S7,S8 | S3,S4,S5,S6 | FIG. 4C |
| | 4) | S1,S6,S7,S8 | S2,S3,S4,S5 | |
| | 5) | S5,S6,S7,S8 | S1,S2,S3,S4 | |

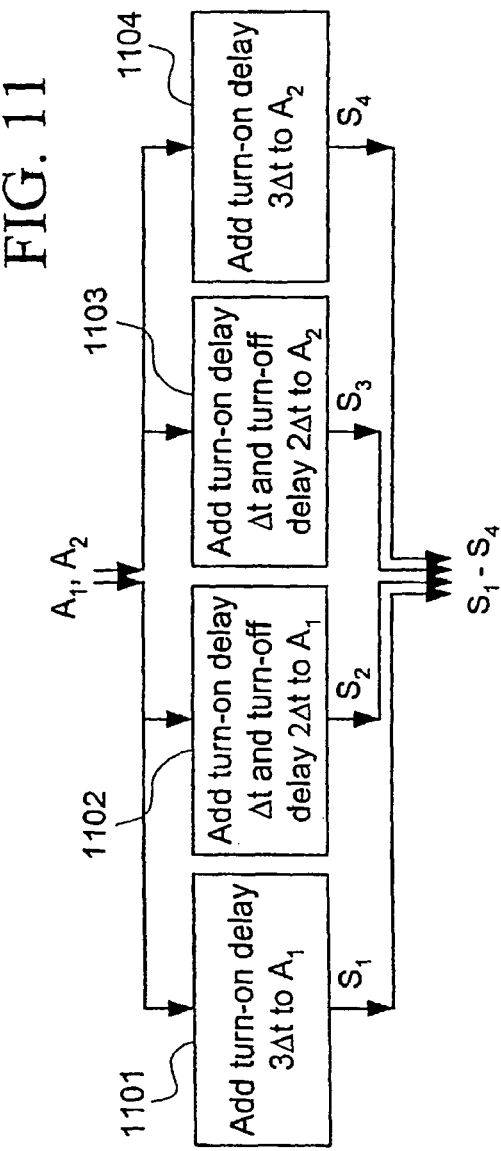
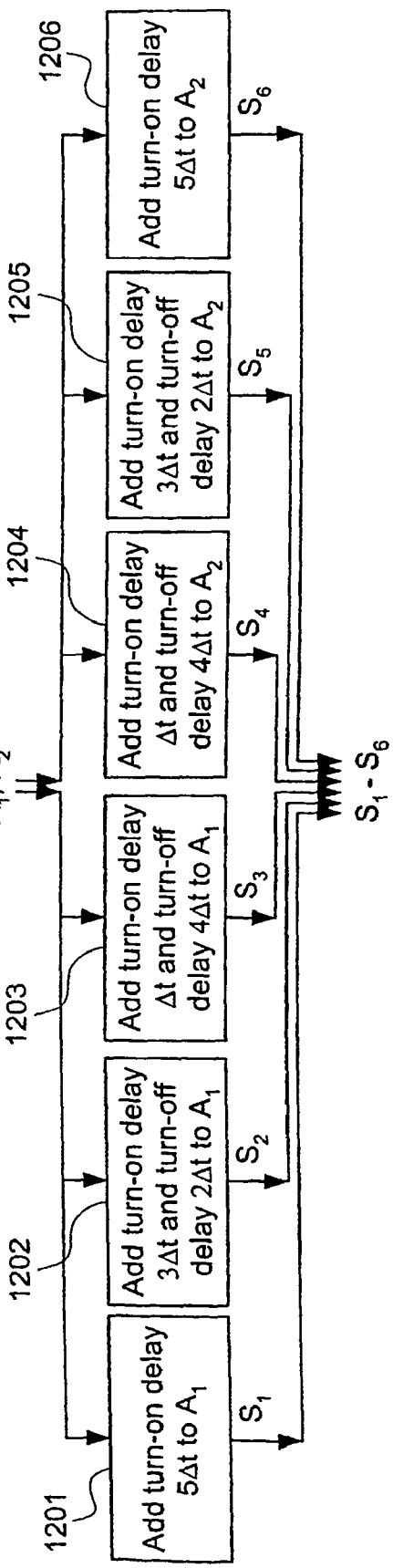

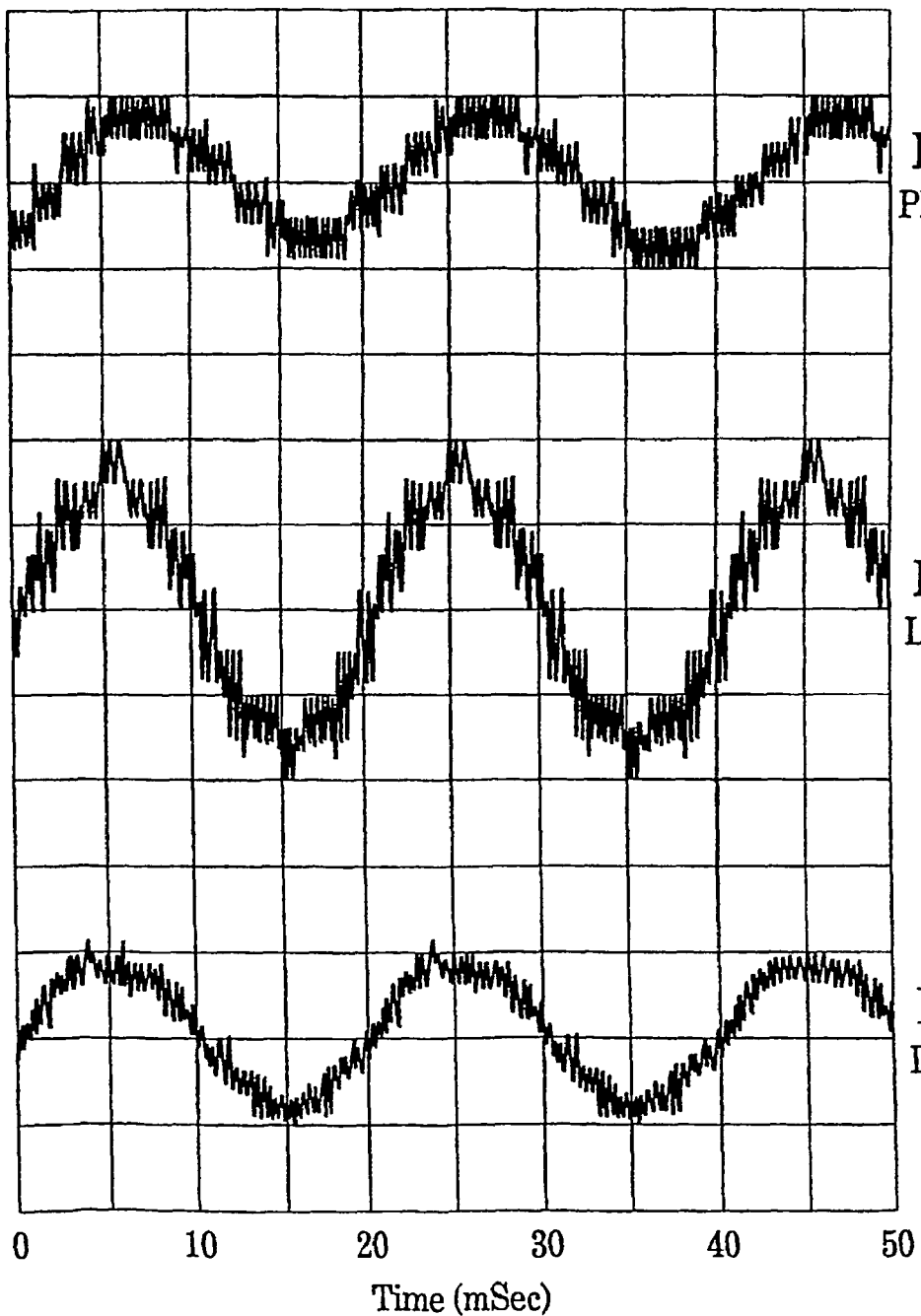
FIG. 27A Phase Voltage
FIG. 27B Line-To-Line Voltage
FIG. 27C Line Current

LOW VOLTAGE, TWO-LEVEL, SIX-PULSE INDUCTION MOTOR CONTROLLER DRIVING A MEDIUM-TO-HIGH VOLTAGE, THREE-OR-MORE-LEVEL AC DRIVE INVERTER BRIDGE Priority is claimed from U.S. Provisional Application 60/399,355 filed Jul. 31, 2002, and U.S. Provisional Application 60/453,817 filed Mar. 12, 2003, both provisional applications being incorporated herein by reference.

BACKGROUND OF THE INVENTION

1. Field of the Invention

Operation of an induction motor using a three-or-more level inverter bridge operating under the control of a controller designed for two-level inverter bridges.

2. Description of the Related Art

Induction motor drives, also called AC (alternating current) drives are used to control the speed and torque of multiphase induction motors, which for a long time have been the workhorse of the industry.

Today's AC drives can be divided into two categories: low-voltage and medium-voltage. The low-voltage AC drives are widely used and cover the 0 VAC to 600 VAC range. Low-voltage AC drives are manufactured by almost five hundred companies around the world. Medium-voltage AC drives cover input line voltages above 660 VAC and up to 15,000 VAC. Only about a half dozen companies design and produce medium-voltage AC drives. High-voltage AC drives cover voltages of 15,000 VAC and higher, but are very uncommon compared to low-voltage and medium-voltage AC drives. Recently, the auto industry and some other special applications requiring low output voltage harmonics are considering the use of multilevel inverter bridges for low voltage motors. This invention addresses this case as well.

Until recently, power semiconductor switches were rated at a maximum of 1,700V, which has allowed the low voltage three-phase AC drives to use a six switch inverter bridge. Today, state-of-the-art semiconductor switches are rated at 2,500V, 3,300V, 4,500V, 6,500V and can be used in a two-level six-switch inverter bridge having up to a 2,000 VAC input. Above 2,000 VAC, the inverter bridge requires a greater number of power semiconductor switches connected in series. The most popular inverter topology for three-phase medium-voltage induction motors of up to 4,000V is a three-level twelve-switch inverter bridge.

The number of levels in an inverter bridge defines the number of direct current (DC) voltage steps that are required by the inverter bridge in order to achieve a certain voltage level in its output. Because power semiconductor switches have limited voltage capability, the total DC bus voltage of an inverter bridge is divided into a number of voltage steps, such that each voltage step can be handled by one power switch.

As illustrated in FIG. 1, in a conventional two-level AC drive, three-phase AC power (R, S, T), after passing through an optional input line reactor 80, is rectified by rectifier 10 and capacitor 20 to form a two-level DC bus. Depending on the design approach, input harmonics on the DC bus may be further reduced by a DC reactor 81. The two-level DC bus voltage is applied across the six-switch inverter bridge which produces a two-level PWM voltage output.

The six switches are divided into three branches with two switches each (30-31, 32-33, and 34-35). A controller (not shown) controls each switch via the control terminals 50-55 of each switch. The three-phase motor 90 has a phase connection derived from the middle point (71, 72, 73, respectively) between two switches of a branch, and the three branches produce three phases which collectively drive the motor.

The two-levels of the DC bus constitute a positive bus and a negative bus. The top switch of each branch is connected to the positive bus and the bottom switch is tied to the negative bus. The two switches in a branch are in series (for example, switch 30 and switch 31) and therefore can not be turned-on at the same time without causing a short-circuit. In order to prevent short-circuit, switch delay times must be taken into consideration by the controller. The top switch needs to turn-off before the bottom one turns-on, and vice-versa. Each of the switches has to be able to handle the full voltage between the positive and negative busses.

In comparison to the two-level drive, in a three-level AC drive, as illustrated in FIG. 2, the DC bus has three voltage levels (relatively labeled positive, neutral, and negative), and the inverter bridge has twelve switches 130-141. The switches 130-141 are divided into three equal branches, each branch connecting to one phase of the three-phase motor 190. Thus, each branch has four switches in series (130-133, 134-137, and 138-141), and each connection to the motor 190 is derived from a middle point 171-173.

The top two switches of each branch are connected to the positive bus and behave like one switch, but they can not be turned on or off at the same time. The switch at the very top (e.g., switch 130) is turned-on after and turned-off before the other switch (e.g., switch 131), in the top pair. The bottom two switches of each branch are connected to the negative bus. The switch at the very bottom (e.g., switch 133) has to be turned-on after, and turned-off before, the other switch of the bottom pair (e.g., switch 132). The switches are controlled by signals applied via terminals 150-161. Here again, switch delay times must be taken into consideration to prevent short circuit.

For further comparison, a single branch (i.e., phase) of three, four, and five level inverter are shown in FIGS. 3A, 3B, and 3C, respectively.

The ability to utilize multiple levels has the benefit of producing an output voltage with lower harmonic distortion, in addition to providing higher output voltages with lower voltage-rated power switches. For example, a three-level inverter has lower voltage harmonic distortion than a two-level inverter bridge.

A drawback of a three-level inverter is that while a two-level inverter bridge requires only six semiconductor power switches, a three-level inverter bridge requires twelve switches, thereby increasing costs. These costs continue to increase as additional levels are utilized: a four-level inverter requires eighteen switches and a five-level inverter requires twenty-four switches.

Further increasing costs is that as the number of levels and switches in the inverter bridge is increased, the complexity of controlling the switches also increases. The signals that drive the switches need to be carefully timed—otherwise the switches may be damaged or destroyed. This complexity increases the costs of controllers used with multiple-level inverters.

Accordingly, a cost-benefit analysis typically results in multiple-level inverters being used only when the output voltages, harmonics and power requirements exceed the capabilities of two-level inverters. A side-effect of this result is that controllers for multiple-level drives are produced in much lower volume.

Any induction motor drive has to control the motor and additionally perform a large number of interfacing tasks such as: communicating diagnostics information; receiving control input from an operator and/or a host or slave process computer; receiving commands from the drive application; performing external control functions; and/or serving as a communications gateway by interfacing different serial communications protocols. These functions are all in addition to motor control, and demand large amounts of expertise and resources to be developed. As a result of the lower volumes, controllers for multiple-level systems used with medium-and-high voltage drives are more expensive and typically offer less-or-limited interfacing capabilities than corresponding controllers for two-level systems produced for low voltage AC drives. Unfortunately, common two-level modulator signals from a low-voltage induction motor controllers are not suitable for the control of multi-level inverter bridges.

Even so, to be able to utilize existing "off-the-shelf" low voltage controllers to control multiple-level inverter bridges would shorten development cycles and speed up product availability of medium-and-high voltage AC drives. A further advantage with this approach is that because low-voltage drives are produced in large volumes, the cost of the two-level controllers is optimized and the circuitry of the controllers is of superior quality and reliability.

SUMMARY OF THE INVENTION

The present invention allows "off-the-shelf" controllers designed for use with a two-level inverter bridge to drive inverter bridges having three-or-more levels. As used herein, "multiple levels" is defined to mean "three-or-more levels." Signals from an ordinary induction motor controller or a two-level induction motor controller are used to drive the twelve switches of a three-level inverter bridge, or drive inverters with larger number of levels, as are used in medium-and-high voltage applications.

A first aspect of the invention is a method of controlling a multiple-level inverter bridge with a two-level induction motor controller, the two-level induction motor controller outputting six modulated signals for controlling switching of six switches in a two-level inverter bridge. The method includes converting the six modulated signals into twelve-or-more time-coordinated signals, and controlling the corresponding twelve-or-more switches of the multiple-level inverter bridge by applying the time-coordinated signals.

A second aspect of the invention is an adapter circuit that generates the twelve-or-more time-coordinated signals needed for controlling a multiple-level inverter bridge, based upon the six modulated signals output from a two-level induction motor controller. The electronic circuit comprises: three pairs of modulated signal inputs, whereby the six modulated signals from the two-level induction motor controller are input into the circuit; three sets of time-coordinated signal outputs, each set of time-coordinated signals being timed to control the switches of a branch of the multiple-level inverter bridge; and timing circuitry that generates each set of time-coordinated output signals from a respective pair of the modulated input signals, adding at least a turn-on delay or turn-off delay to each modulated input signal. The time-coordinated signals are arranged so that for each branch-set, never-less-than one-half of the switches in the multiple-level inverter bridge are off. The timing circuitry can be implemented using analog circuits, digital circuits, a Digital Signal Processor (DSP), or a microprocessor.

A third aspect of the invention is a system for driving a three-phase motor, the system comprising: a two-level induction motor controller, outputting signals for controlling a two-level inverter bridge; a multiple-level inverter bridge, having twelve or more switches divided into three branches, each branch providing one phase of a three-phase output for driving the three-phase motor; and an electronic circuit, generating twelve-or-more time-coordinated signals from the signals output by the two-level induction motor controller modulator. The twelve-or-more signals control the twelve-or-more switches of the multiple-level inverter bridge.

A fourth aspect of the invention is a method of controlling a multiple-level inverter bridge with command signals output from a two-level induction motor controller. The command signals are ordinarily used for regulating a three-phase motor. In an embodiment of this invention, they are passed via a serial or parallel port to a separate circuit containing at least one multilevel modulator. Preferably, the motor controller utilizes vector control, vector command signals being used for regulating speed and torque of the motor. The command signals are mathematically transformed to suit the type of modulator used. Other types of control, such as scalar control may also be used. In any case, the method includes generating twelve-or-more time-coordinated signals based upon the command signals, by inputting them into a multilevel modulator of any type, and controlling a corresponding twelve-or-more switches of the multiple-level inverter bridge.

Further aspects, object and advantages will be set forth in the detailed description that follows.

BRIEF DESCRIPTION OF THE DRAWINGS

FIGS. 4A-4C respectively illustrate the allowed switching states for the switches of one branch of three, four, and five-level inverter bridges.

FIG. 11 is an exemplary implementation of the procedure of FIG. 10, converting a pair of the modulated signals output from a two-level induction motor controller into four time-coordinated signals for controlling four switches of one branch of a three-level inverter bridge.

FIG. 12 is an exemplary implementation of the procedure of FIG. 10, converting a pair of the modulated signals output from a two-level induction motor controller into six time-coordinated signals for controlling six switches of one branch of a four-level inverter bridge.

FIG. 27A illustrates the phase voltage output of a three-level inverter bridge when implementing the second variation of the invention with a three-level system.

FIG. 27B illustrates the line-to-line voltage output of a three-level inverter bridge when implementing the second variation of the invention with a three-level system.

FIG. 27C illustrates the line current output of a three-level inverter bridge when implementing the second variation of the invention with a three-level system.

DETAILED DESCRIPTION OF THE PREFERRED EMBODIMENTS

Figure 1:
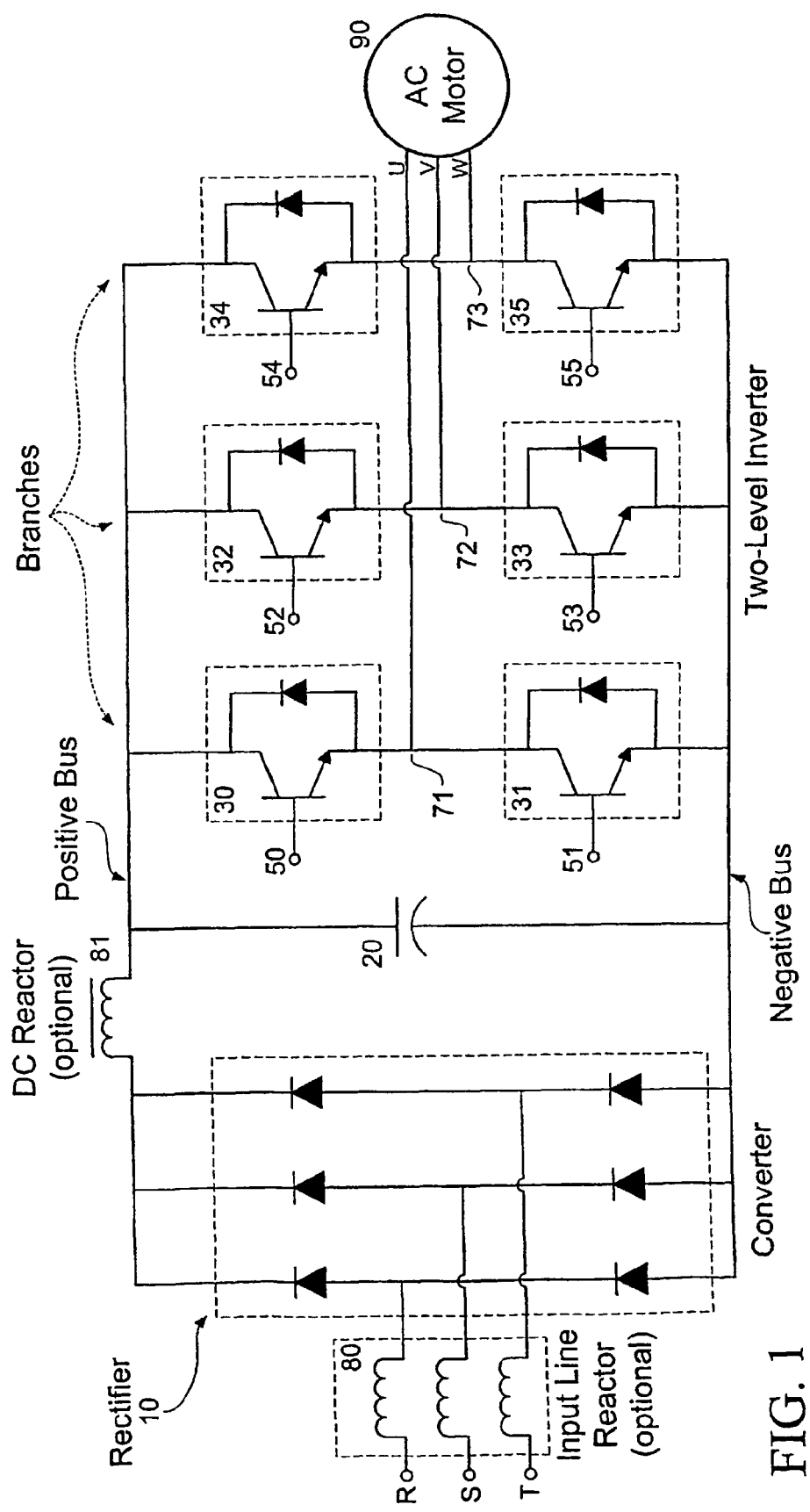
FIG. 1 illustrates a circuit diagram for a conventional two-level inverter.

As is known in the air, specialized circuits called pulse-width modulators are part of ordinary induction motor drive controllers. In a low voltage drive system (i.e., 0-600V), the output of these modulators is used to directly control the six switches of the two-level inverter bridge. For example, referring to FIG. 1, the output of the six pulse-width modulators of the controller would be applied to the two-level inverter bridge via terminals 50-55. These modulators derive the pulse-width modulated signals from voltage (or current) and phase input signals that come from a speed and torque control devices of the motor controller. Exemplary controllers are field oriented, vector control, or a simple open-loop voltage controllers. Examples of common modulation methods are sine-triangle comparison, space vector, and third harmonic injection methods.

In this invention, the proper sequence and timing of switching for a multiple-level inverter bridge are preferably based in-part upon either the outputs of the six pulse-width modulators (first variation), or the outputs of the speed and torque control devices (second variation). Consideration is given to the position and delay times of each switch of the multiple-level inverter bridge.

Throughout this disclosure, variables are used to simplify explanation. The variable "N" is used interchangeably as the number switches in the multiple-level inverter, and as the number of signals used to control the multiple level inverter bridge. Typically, if a multiple-level inverter bridge has "L" levels, then N=6(L−1). Another variable used is "b," which is always 1, 2, or 3, and refers the branches of an inverter bridge, or a set of signals intended to control a branch of an inverter bridge. Both the switch and the signal controlling the switch are referred to interchangeably (i.e., $S_n$). The delay value $\Delta t_b$ is at least as long as a turn-off delay time of a switch with a longest turn-off delay time of the N/3 switches in a branch b of the multiple-level inverter bridge. The inverter switches shown in the figures each comprise a transistor, but inverters can be used having any type of switch that has appropriate voltage and switching characteristics.

Figure 2:
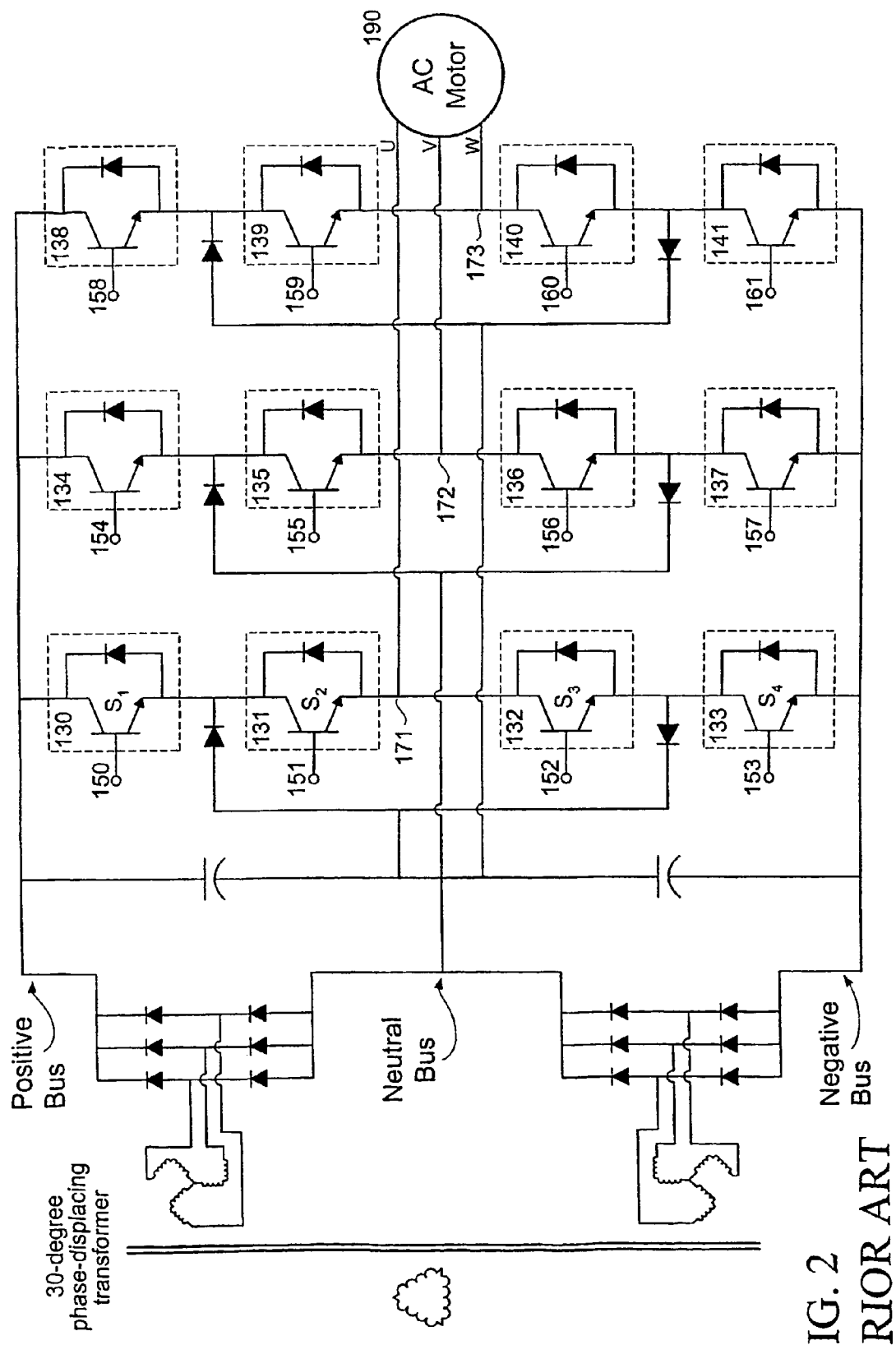
FIG. 2 illustrates a circuit diagram for a three-level inverter, as used conventionally and with the present invention.
Figure 3A:
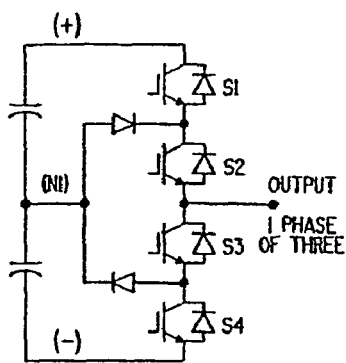
FIGS. 3A-3C respectively illustrate a single branch of three, four, and five level inverters.
Figure 3B:
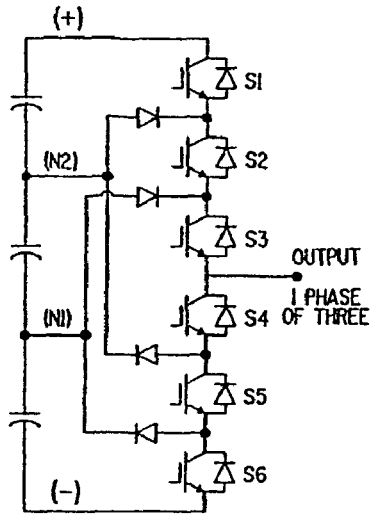

Referring to the three-level inverter bridge of FIG. 2 as an example, a summary of the operating switching states follows. Switches 130-133, which form a branch of the three-level inverter bridge, will be referred to as $S_1$-$S_4$. This arrangement is also illustrated in FIG. 3A. The schema discussed for $S_1$-$S_4$ equally applies to the other branches—discussion being limited to an exemplary branch for the purpose of brevity.

The switches are allowed to assume one of the three following states:
1) $S_1$ and $S_2$ are off, $S_3$ and $S_4$ are on;
2) $S_2$ and $S_3$ are on, $S_1$ and $S_4$ are off;
3) $S_1$ and $S_2$ are on, $S_3$ and $S_4$ are off.

These states are reflected in the table provided as FIG. 4A. The allowed switching states for a branch of four and five-level inverter bridges are provided in FIGS. 4B and 4C, respectively.

It can be seen that the DC voltage $V_{dc}$ is never applied to less than one-half of the switches connected is series, which permits the voltage to be as high as twice the voltage rating of each individual switch. In other words, for each branch b, never-less-than N/6 of the time coordinated signals/switches $S_{1b}$ to $S_{(N/3)b}$ have a logical-off state.

How the proper sequence and timing of switching for the multiple-level inverter bridge are derived depends upon the particular variation of the invention implemented.

The first variation enables any two-level induction motor controller to drive a multiple-level medium-or-high voltage inverter bridge by producing quasi-two-level output voltages from a three-level inverter bridge. The six modulated signals generated by a two-level controller are time-resequenced to produce the twelve-or-more time-coordinated signals needed to control the multiple-level inverter bridge, taking into account the position and delay times of a switch in the multilevel inverter bridge. This variation results in the multiple-level inverter bridge producing a two-level voltage output and therefore does not take advantage of the lower harmonic distortion that is possible with a multiple-level inverter bridge. This variation is adequate for many applications, in particular for motors up to 750 BP.

The second variation utilizes command signals ordinarily utilized within an ordinary induction controller. Preferably, the control method is vector control, in which case only the flux and torque control devices inside the ordinary induction motor controller are utilized by transmitting their output signals or a mathematically transformation of their output (a.k.a. vector control data) to an external control circuit having a multi-level modulator (i.e., the ordinary induction motor controller sends its most suitable set of signals for the external multilevel modulator via an interface port to an external circuit which contains also an interface port and a three-or-more level (multilevel) modulator). The external control circuit's multilevel modulator drives the power switches of a medium or high voltage inverter bridge. This variation enables existing low voltage and two-level induction motor controllers to drive a medium or high voltage multi-level inverter bridge. The advantage of this variation is that a three-level output voltage waveform is produced with the lower voltage harmonic content. This approach also decouples the switching frequency of the existing controller, such that a target switching frequency can be optimized for the high voltage semiconductor switches in the multiple-level inverter bridge. The higher the rated-voltage is for a switch, the lower that the switching frequency needs to be to achieve the switch's rated output power.

In both variations, the twelve-or-more power switches of the inverter turn on-and-off with varying duty cycles in order to produce balanced three-phase sinusoidal-current waveforms when the output from the switches is applied to a three-phase inductive load, such as an induction motor.

First Variation

The embodiments directed to the first variation of the invention utilize the six pulse-width-modulated driving signals from an ordinary controller two-level modulator to control a multiple-level inverter bridge. This is accomplished by breaking apart the two-level modulator's six signals into the multiple time-coordinated signals required by the three-or-more level inverter bridge, taking into consideration the position of the respective switch inside the multiple-level inverter bridge and a switch's turn-on and/or turn-off delay times. The position of the switch inside the multiple-level inverter bridge determines the overall timing of the signal applied to the switch.

Figure 5:
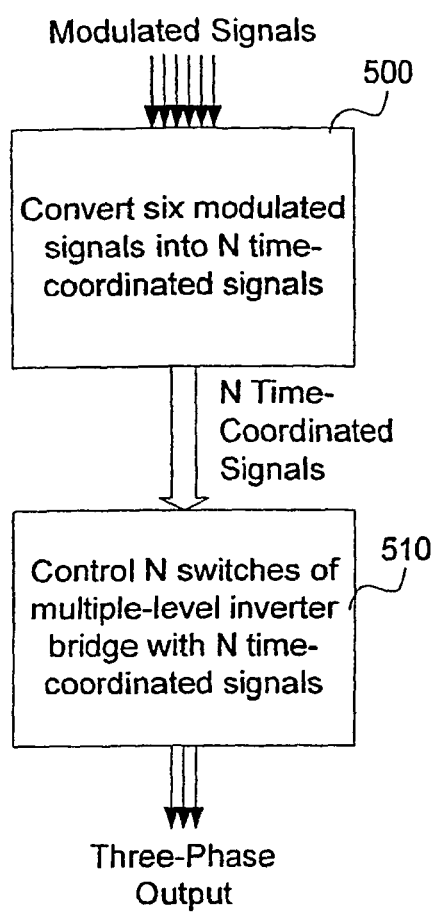
FIG. 5 illustrates steps for implementing a first variation of the invention, converting six modulated signals output from a two-level induction motor controller into twelve-or-more signals, and controlling twelve-or-more switches of a multiple-level inverter bridge with the twelve-or-more signals.

The first embodiment is a method for implementing this first variation of the invention. As illustrated in FIG. 5, the six modulated signals are converted into N time-coordinated signals (step 500), the N time-coordinated signals being used to control the N switches of a multiple-level inverter bridge (step 510). As illustrated, there is a three-phase, pulse-width modulated output. As explained above, it is required that when the six modulated signals are converted into N time-coordinated signals, for each branch b, never-less-than N/6 of the time coordinated signals have a logical-off state.

Since the six modulated signals were originally intended to control three branches of two switches each (FIG. 1), the six modulated signals can be further characterized as being three pairs of modulated signals $A_{1b}$ and $A_{2b}$. If these modulated signals were used to control a two-level inverter bridge, each pair would control one of the three branches of the two-level bridge. That is, each pair would control one phase of a three-phase output.

Figure 6:
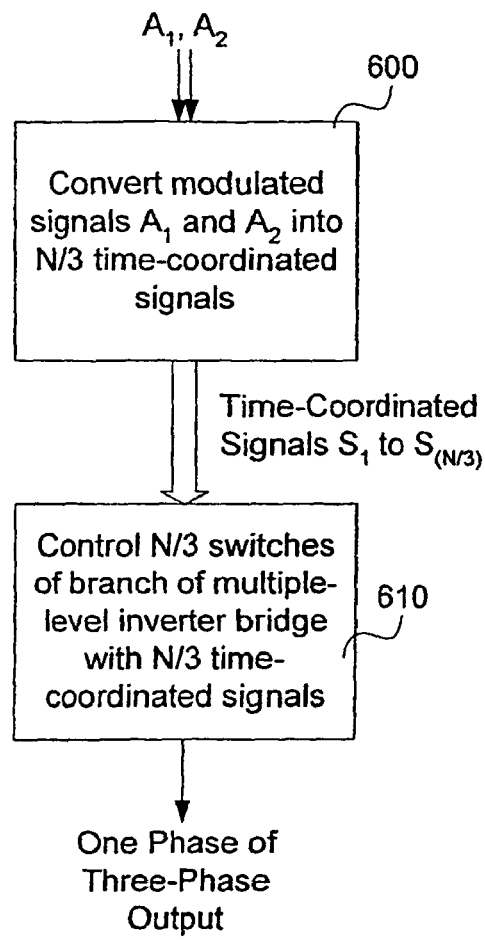
FIG. 6 further illustrates steps for implementing a first variation of the invention, converting two-of-six modulated signals (one pair) output from a two-level induction motor controller into time-coordinated signals, and controlling the switches of one branch of a multiple-level inverter bridge with the time-coordinated signals.

Preferably, as illustrated in FIG. 6, each pair of modulated signals $A_{1b}$ and $A_{2b}$ are converted into N/3 time-coordinated signals $S_{1b}$ to $S_{(N/3)b}$ (step 600). The timing of each time-coordinated signal $S_{1b}$ to $S_{(N/3)b}$ varies based on at least a delay time of the switches of the multiple-level inverter bridge. The N/3 time-coordinated signals are then used to control the switches of one of the three branches of the multiple-level inverter bridge (step 610).

Conversion of the modulated signals into time-coordinated signals is further defined by applying a rule-based procedures A first procedure is illustrated in FIGS. 7A-7D. For time-coordinated signals $S_{1b}$ to $S_{(N/6)b}$, each $S_{yb}$ has a logical-on state after, and a logical-off state before, $S_{(y+1)b}$, and for time-coordinated signals $S_{(N/3)b}$ to $S_{(N/6+1)b}$, each $S_{zb}$ has a logical-on state after, and a logical-off state before, $S_{(z-1)b}$. The value y is a series of integers from 1 to (N/6−1), and z is a series of integers from (N/6+2) to (N/3).

Figure 3C:
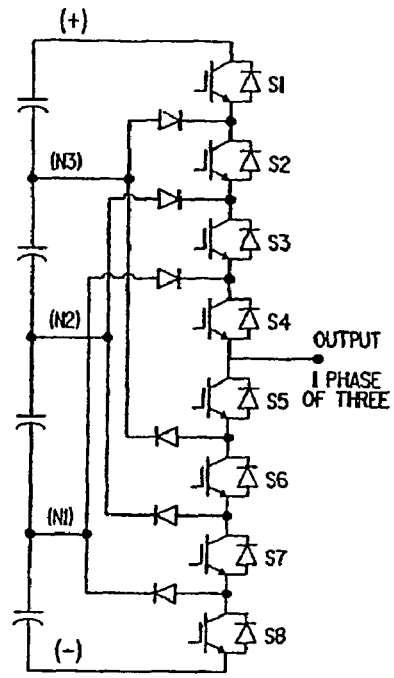

To better understand this procedure, consider an example a five-level inverter system. A branch of such a system, as illustrated in FIG. 3C, has eight switches ($S_1$-$S_8$). This results in a total of 24 switches (N=24). Therefore, as defined, y=1 to 3.

Figures 7A, 7B, 7C, 7D:
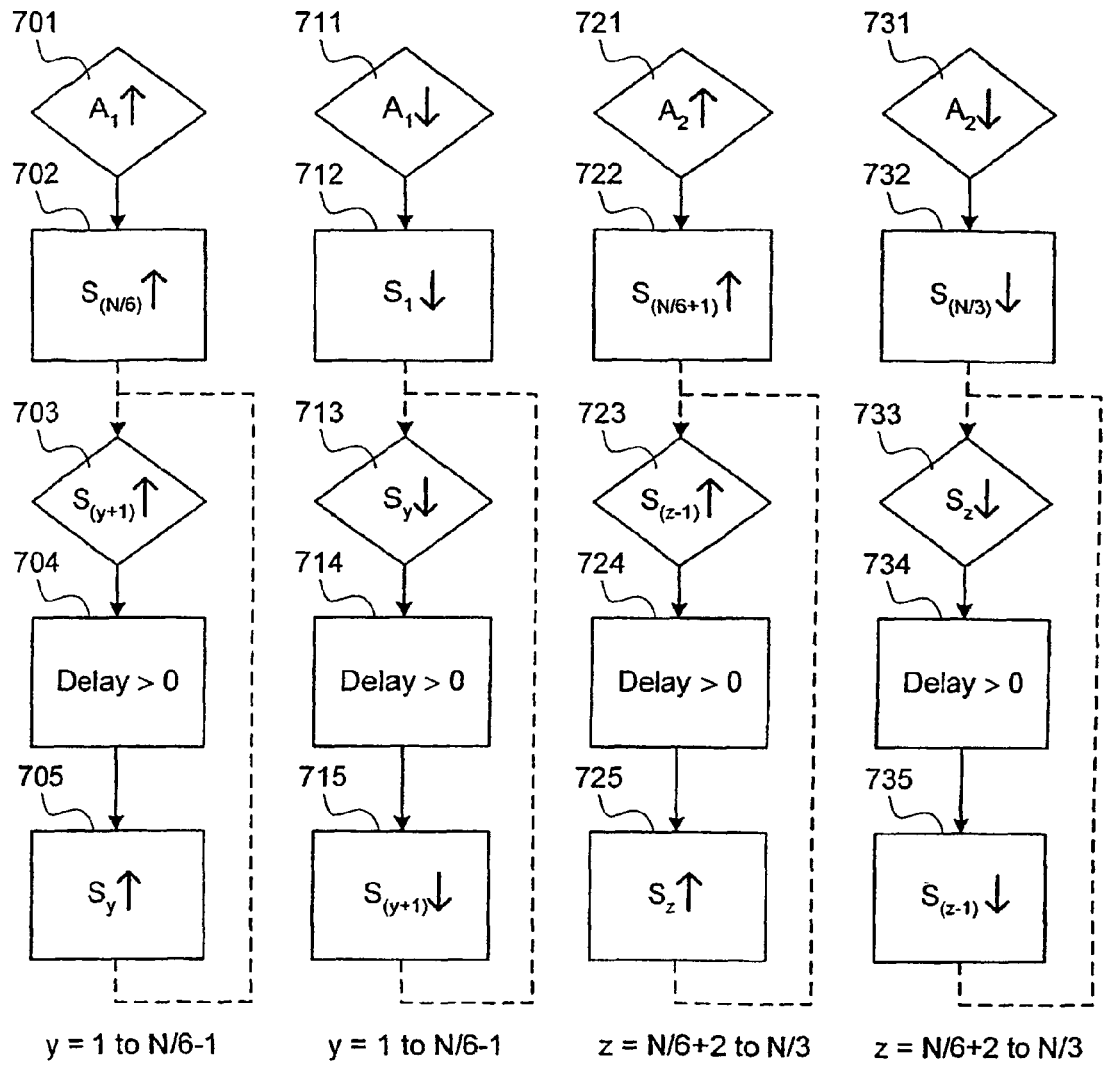
FIGS. 7A-7D illustrate a first procedure for converting (i.e., step 600 from FIG. 6) a pair of the modulated signals output from the two-level induction motor controller into time-coordinated signals for controlling the switches of one branch of a multiple-level inverter bridge.

The portion of the procedure responsible for transitioning time-coordinated signals $S_{1b}$ to $S_{(N/6)b}$ (i.e., switches $S_1$ to $S_4$ of the branch in FIG. 3C) from off to on is FIG. 7A. When $S_4$ transitions from logical-off to logical-on, step 703 is true. After a delay (704), $S_3$ is set from a logical-off state to a logical-on state (705). Now of course, $S_3$ has transitioned from off-to-on, such that step 703 is again true, but now because of $S_3$. So after a delay (704), $S_2$ is set from a logical-off state to a logical-on state. This sequence continues until finally $S_1$ is set from a logical-off state to a logical-on state, at which point, since there are no further signal transitions to trigger step 703.

As illustrated, the initial triggering event is the transition of modulated signal $A_1$ from a logical-off to a logical-on (701), triggering $S_{(N/6)}$ to transition from off-to-on (702).

The portions of the procedure illustrated in FIGS. 7B-7D operate in a similar manner. FIG. 7B (711-715) is the portion of the procedure responsible for transitioning $S_{1b}$ to $S_{(N/6)b}$ from logical-off to logical-on; FIG. 7C (721-725) handles transitioning $S_{(N/6+1)b}$ to $S_{(N/3)}$ from off-to-on; and FIG. 7D (731-735) handles transition $S_{(N/6+1)b}$ to $S_{(N/3)}$ from on-to-off.

Note that in FIGS. 7A-7D, steps 701, 703, 711, 713, 721, 723, 731, and 733 are not limited to ordered steps in a sequence, but rather, are independent triggering events. Accordingly, the procedure is easily implemented sequentially in steps, or in an entirely event-drive manner (e.g., as in a "ripple" device).

Figure 8A:
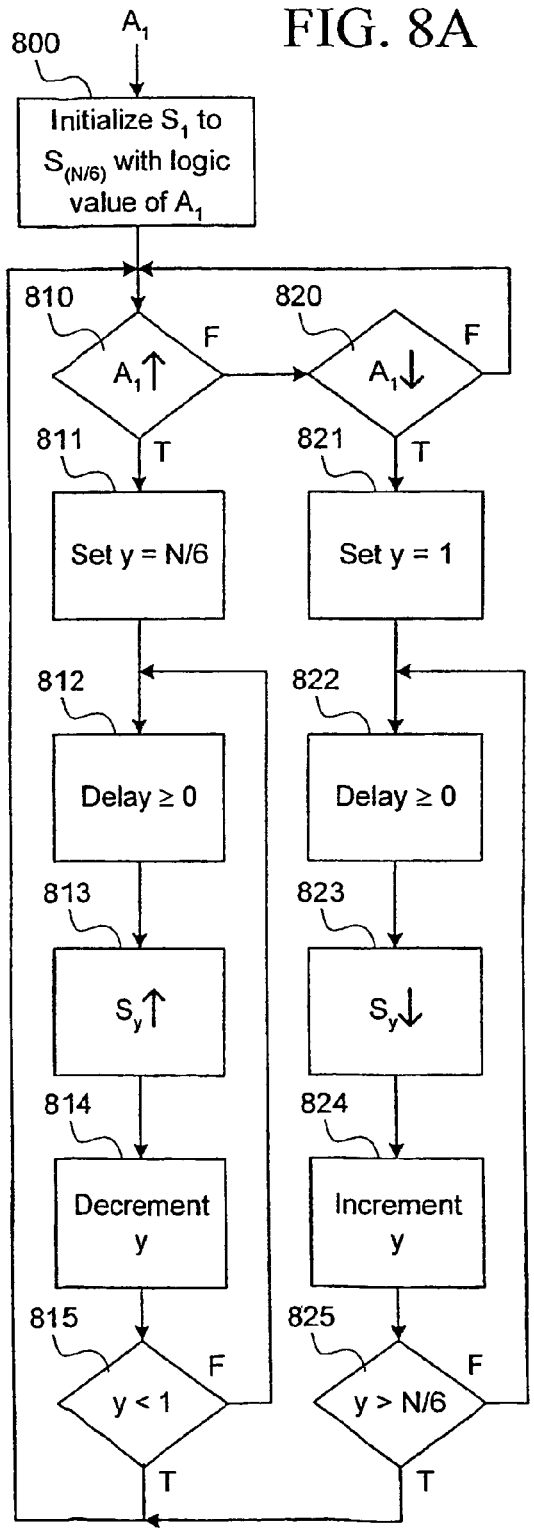
FIGS. 8A and 8B illustrate an exemplary sequential implementation of the procedure of FIGS. 7A-7D.
Figure 8B:
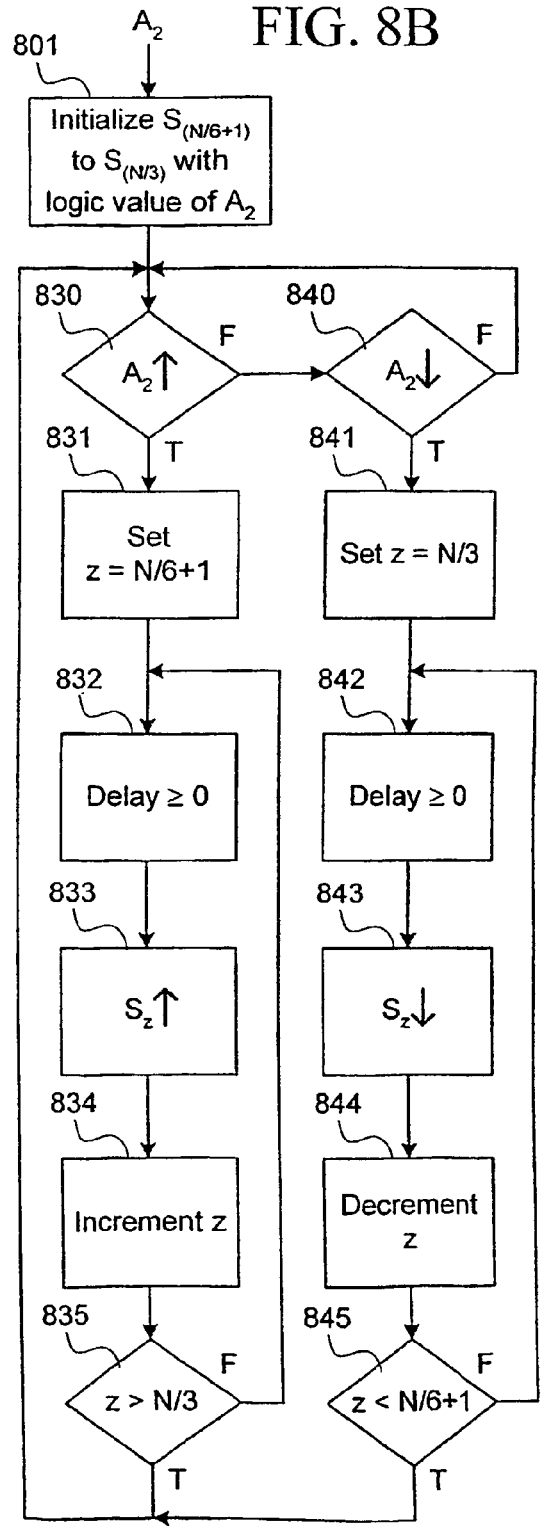

An example of a sequential implementation of the procedure of FIGS. 7A-7D is illustrated in FIGS. 8A-8B. FIG. 8A (800, 810-825) convert the modulated signal $A_{1b}$ into time-coordinated signals $S_1$ to $S_{(N/6)}$. FIG. 8B (801, 830-845) convert modulated signal $A_{2b}$ into time-coordinated signals $S_{(N/6+1)}$ to $S_{(N/3)}$.

In this example, the procedure begins by initializing all of the time-coordinated signals based on $A_1$ and $A_2$ (800, 801). A loop is then entered, waiting for $A_1$ to transition (810 and 820) and $A_2$ to transition (830, 840). When a transition occurs, a pointer value is initialized (811, 821, 831, 841), and after a delay (812, 822, 832, 842), a first time-coordinated signal is switched from on-to-off (823, 843) or off-to-on (S 13, 833). For the first pass through steps 812, 822, 832, and 842, the delay is preferably zero.

The pointer value is then incremented or decremented (814, 824, 834, 844), and a check is made to see whether all of the time-coordinated signals have been transitioned (815, 825, 835, 845). If signals remain to be transitioned, the sequence loops back to the delay step (812, 822, 832, 842). On this second and any subsequent pass, the delay is based on at least a turn-off delay time $\Delta t_b$ of the switches. When all the signals have been transition, the sequence returns to the loop waiting for $A_1$ to transition (810 and 820) or $A_2$ to transition (830, 840).

Figure 9A:
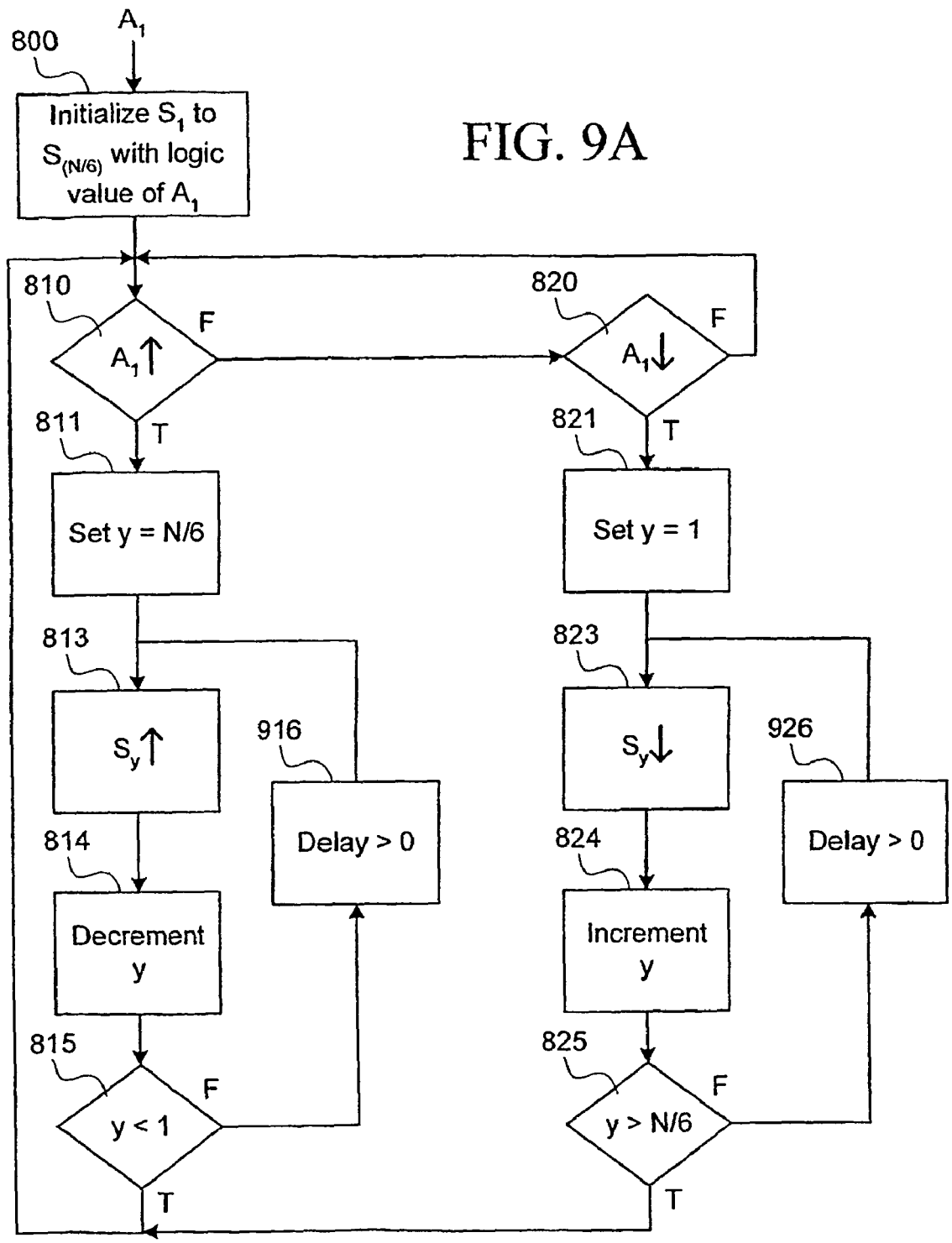
FIGS. 9A and 9B illustrate another exemplary sequential implementation of the procedure of FIGS. 7A-7D.
Figure 9B:
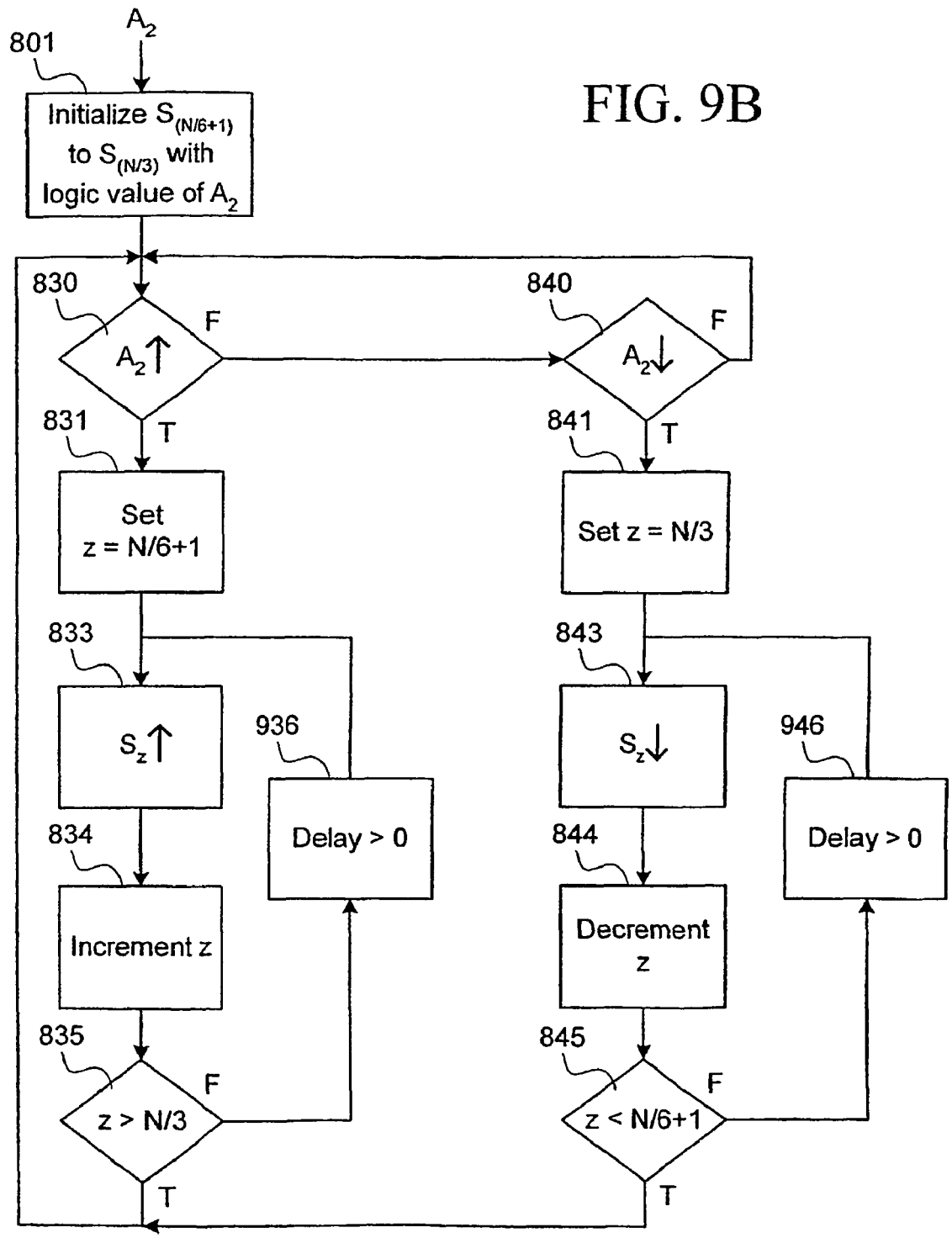

The exemplary sequential implementation in FIGS. 8A and 8B can be modified in numerous ways, so long as the proper sequence of time-coordinated signals are generated in accordance with the requirements outlined in FIGS. 7A-7D. For example, where the delay is placed in the sequence can be changed, as shown in FIGS. 9A and 9B. In this example, the delay (916, 926, 936, 946) is preferably based on at least a turn-off delay time $\Delta t_b$ of the switches.

As explained above, in order to avoid overloading the switches, it is important that for each branch b, never-less-than N/6 of the time coordinated signals/switches $S_{1b}$ to $S_{(N/3)b}$ have a logical-off state. For this reason the delay time $\Delta t_b$ is set to at least as long as a turn-off delay time of a switch with a longest turn-off delay time of the N/3 switches in a branch b of the multiple-level inverter bridge. This minimum delay assures that a switching delay will not cause more than one-half of the switches to be turned on, thereby causing an overload.

However, this value for $\Delta t_b$ provides a threshold, and in practice, it may be desirable to use a larger threshold value. For example, it may be convenient to set $\Delta t_b$ to at least the longest turn-off delay of all of the switches of all the branches of an inverter, as such information may be all that is known about the inverter without testing. As another example, it may be desirable to set a larger threshold in anticipation of changes in performance over time.

Further, "based on" $\Delta t_b$ should be understood to mean that the actual delay is no-less-than $\Delta t_b$. The actual delay used must tale into account the fact that the switches $S_{1b}$ to $S_{(N/3)b}$ form one phase of a three phase output. For example, referring back to FIG. 2, S1-S4 create the signal at middle-point 171, which is one phase of the drive signal to the motor. The actual delays used depend upon a variety of factor, such as the type of power semiconductor switch used, its driving method and its operating condition limits.

Preferably, the delay sequence of the time-coordinated signals is optimized to achieve desired output characteristics in the three-phase signals output to the motor. In some cases, this will mean minimizing harmonics in the output signals. However, in some applications, it may be desirable to sacrifice increased harmonics for higher output power. Accordingly, what defines "optimal" is application specific.

Figure 10:
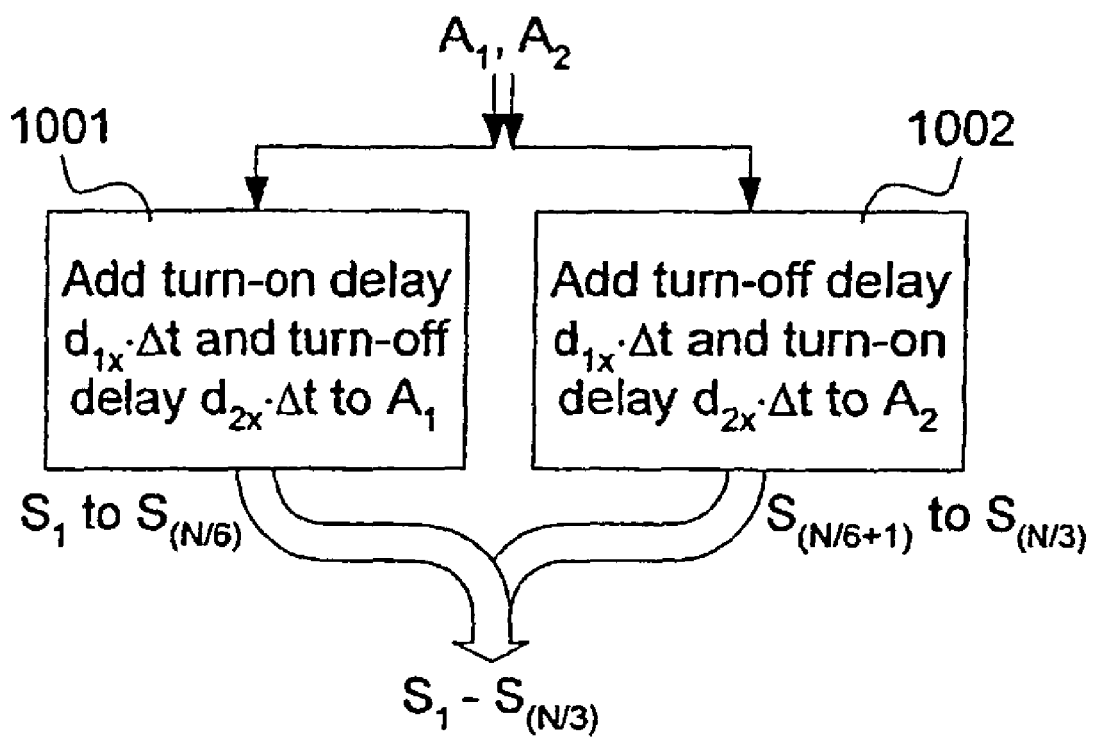
FIG. 10 illustrates a second procedure for converting (i.e., step 600 from FIG. 6) a pair of the modulated signals output from the two-level induction motor controller into time-coordinated signals for controlling the switches of one branch of a multiple-level inverter bridge.

A second rule-based procedure for conversion of the six modulated signals into the time-coordinated is illustrated in FIG. 10. Time-coordinated-signals $S_{1b}$ to $S_{(N/6)b}$ are formed by adding a turn-on delay $d_{1x} \cdot \Delta t_b$, and a turn-off delay $d_{2x} \cdot \Delta t_b$, to the modulated signal $A_{1b}$ (step 1001), and time-coordinated signals $S_{(N/3)b}$ to $S_{(N/6+1)b}$ are formed by adding a turn-off delay $d_{1x} \cdot \Delta t_b$, and a turn-on delay $d_{2x} \cdot \Delta t_b$, to the modulated signal $A_{2b}$ (step 1002). In this case, $d_{1x} \geq 0$, $d_{2x} \geq 0$, and x is a series of integers from 1 to N/6. Also, every $d_{1x}$ has a different value, and every $d_{2x}$ has a different value.

Whereas the first rule-based procedure outlined in FIGS. 7A-7D relies upon the interrelationship of the time-coordinated to create the timing sequence, the procedure of FIG. 10 uses preset delays to generate the time-coordinates signals. Ideally, once optimized, the time-coordinated signals output from these two procedures will be the same for any given implementation.

Figure 13:
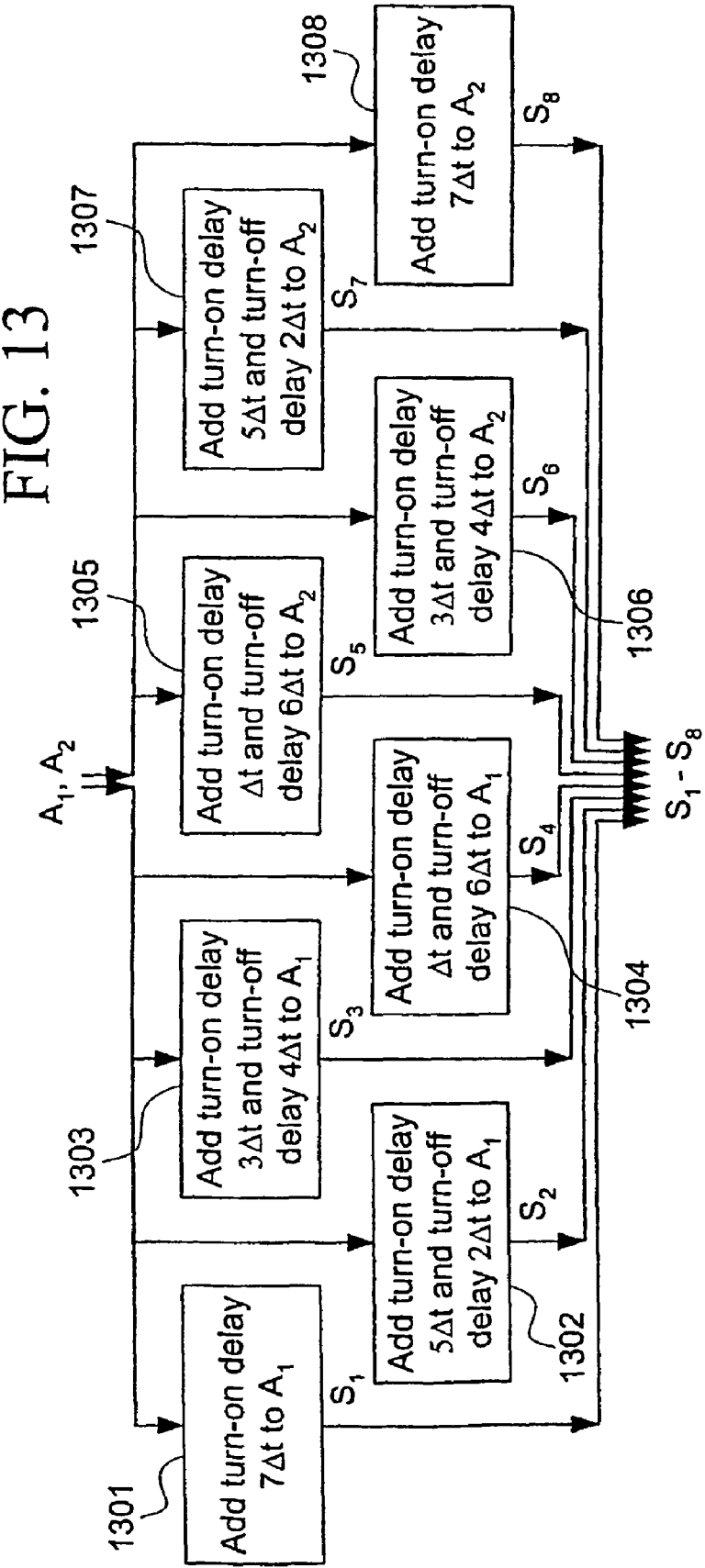
FIG. 13 is an exemplary implementation of the procedure of FIG. 10, converting a pair of the modulated signals output from a two-level induction motor controller into eight time-coordinated signals for controlling eight switches of one branch of a five-level inverter bridge.

As a demonstration, examples implementing the second-rule based procedure for three, four, and five level systems are provided in FIGS. 11-13. As a further demonstration, exemplary timing diagrams for three, four, and five level systems are provided in FIGS. 14-16. In each of FIGS. 11-16, turn-on and turn-off delays are added to input signals in order to generate the time-coordinated signals for controlling the switches of a branch of an inverter bridge.

Figure 14:
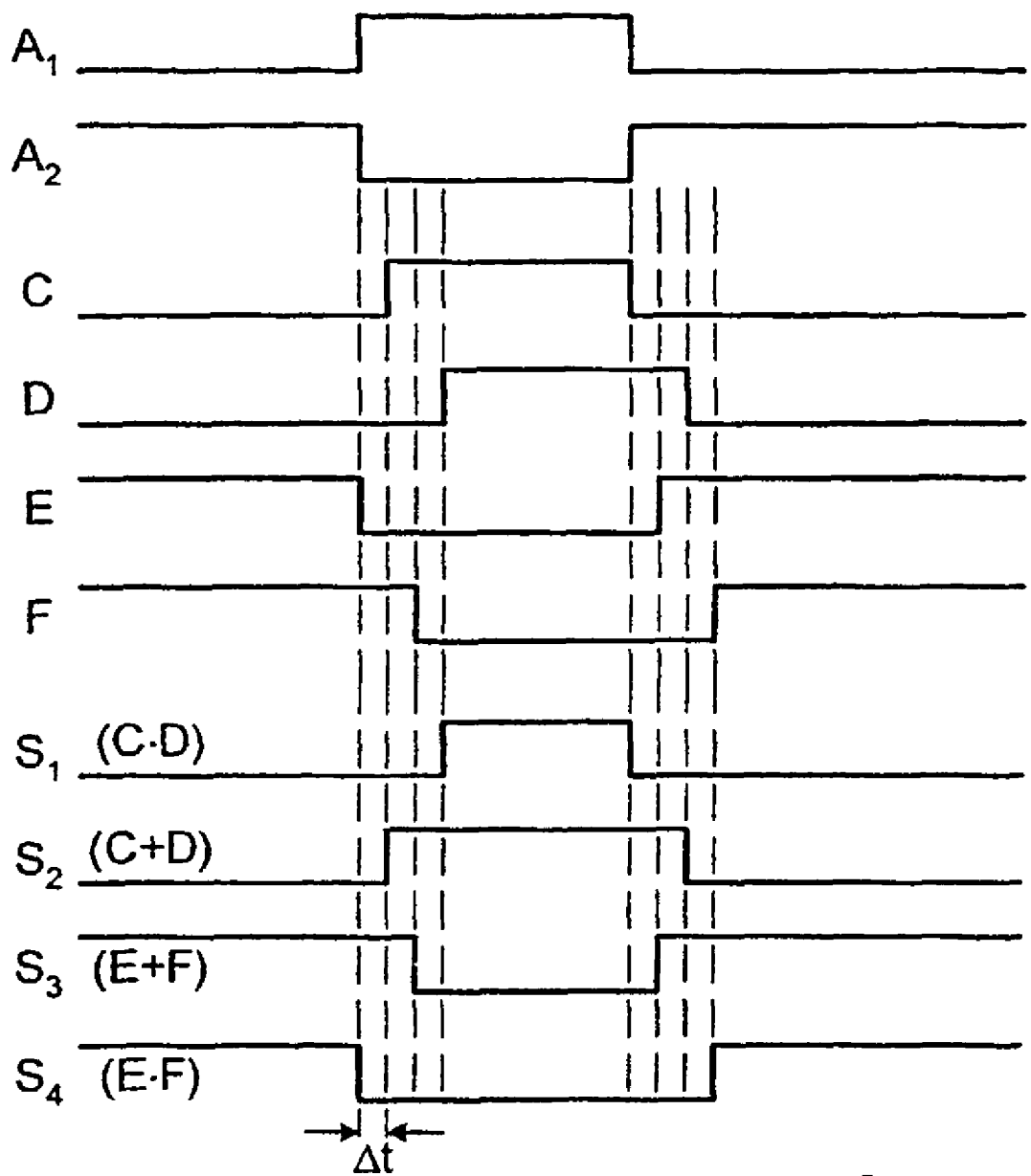
FIG. 14 is a signal-generation timing diagram illustrating turn-on and turn-off delays added to a pair of the modulated signals in order to generate the time-coordinated signals for controlling the switches of a branch of a three-level inverter bridge.
Figure 15:
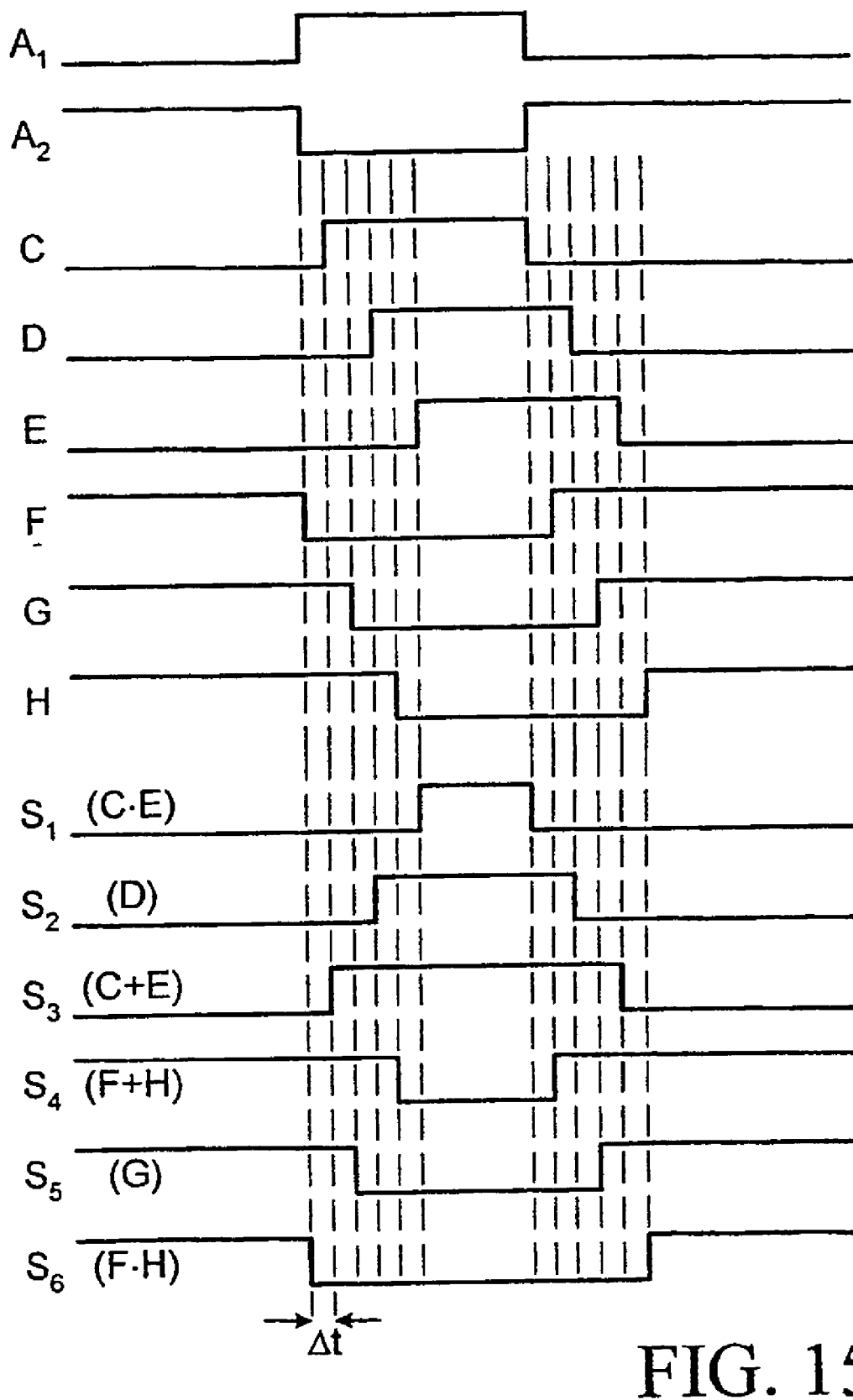
FIG. 15 is a signal-generation timing diagram illustrating turn-on and turn-off delays added to a pair of the modulated signals in order to generate the time-coordinated signals for controlling the switches of a branch of a four-level inverter bridge.
Figure 16:
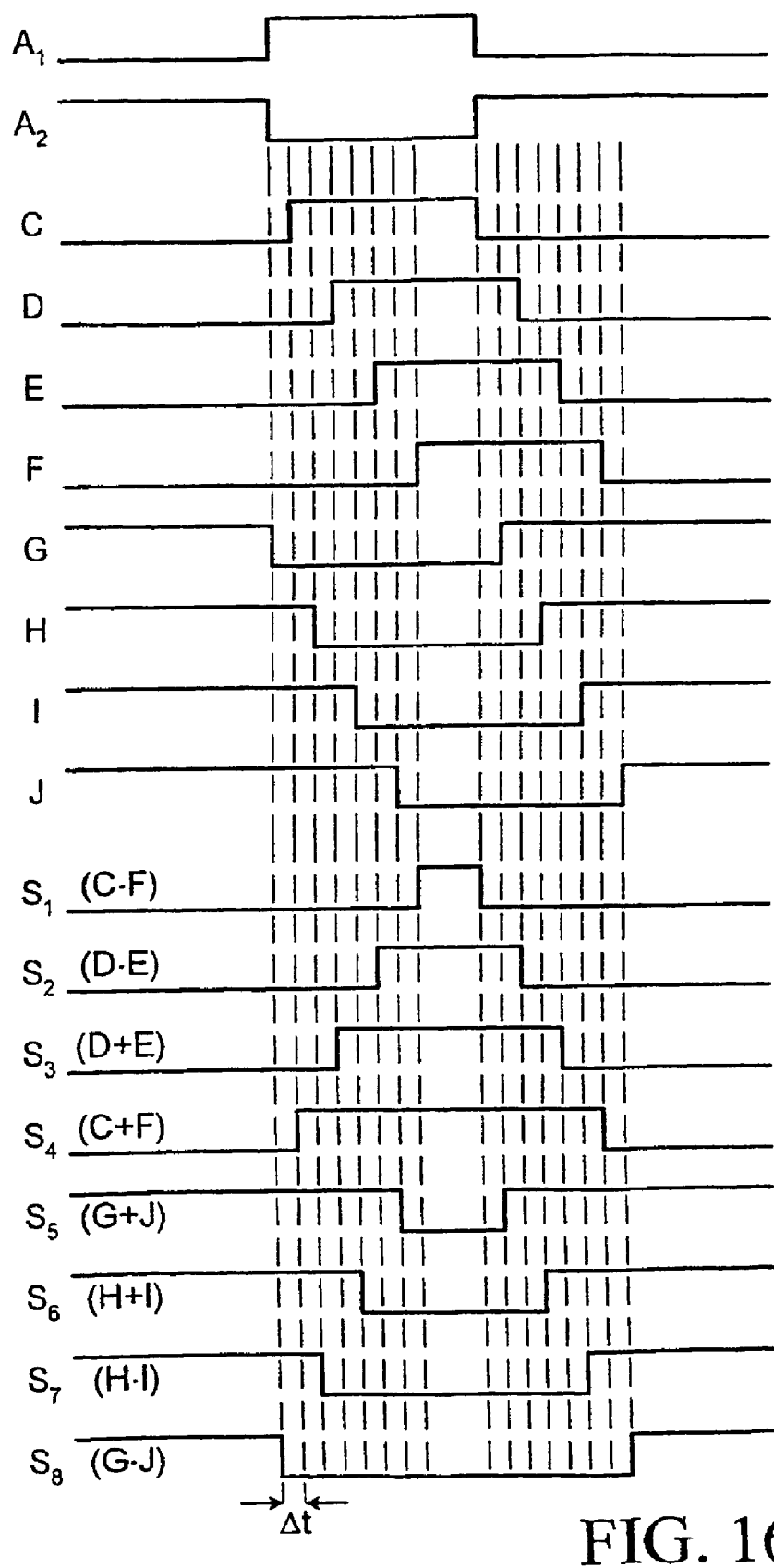
FIG. 16 is a signal-generation timing diagram illustrating turn-on and turn-off delays added to a pair of the modulated signals in order to generate the time-coordinated signals for controlling the switches of a branch of a five-level inverter bridge.

The delays added to form $S_1$ to $S_{(N/3)}$ relative to $A_1$ and $A_2$ in FIGS. 11-13 respectively correspond to $S_1$ to $S_{(N/3)}$ in the timing diagrams of FIGS. 14-16,. Referring to the second-rule procedure of FIG. 10, the delay multiplier $d_{1x}$ and $d_{2x}$ in FIGS. 11 and 14 are $d_{11}=3$, $d_{12}=1$, $d_{21}=0$, and $d_{22}=2$; in FIGS. 12 and 15 are $d_{11}=5$, $d_{12}=3$, $d_{13}=1$, $d_{21}=0$, $d_{22}=2$, and $d_{23}=4$; and in FIGS. 13 and 16 are $d_{11}=7$, $d_{12}=5$, $d_{13}=3$, $d_{14}=1$, $d_{21}0$, $d_{22}=2$, $d_{23}=4$, and $d_{24}=6$. Note that these timing sequences also comply with the requirements of the first rule-based procedure (FIGS. 7A-7D).

For systems having even higher levels, this pattern for generating the delay multipliers $d_{1x}$ and $d_{2x}$ can be generalized as follows:

$d_{1x}$ is a descending sequence of odd integers from (N/3−1) to 1; and
  $d_{2x}$ is an ascending sequence of even integers from zero to (N/3−2).

In addition to illustrating the timing of time-coordinated signals $S_1$-$S_{(N/3)}$ relative to modulated signals $A_1$ and $A_2$, FIGS. 14-16 also illustrate intermediate signals that can be used in order to construct the delays required in FIGS. 11-13. The intermediate signals in FIGS. 14-16 allow simple timing and logic circuitry to be used to construct time-coordinated signals $S_1$-$S_{(N/3)}$ from $A_1$ and $A_2$.

Referring to FIG. 14, a turn-on delay time of $\Delta t$ is added to signal $A_1$ to form signal C. Signal D is simply signal C, advanced by $2\Delta t$. A turn-on delay time of $\Delta t$ is added to signal $A_2$ to form signal E. Signal F is formed by advancing signal E by $2\Delta t$. From these signals, time-coordinated signals $S_1$-$S_4$ are derived. Time-coordinated signal $S_1$ is equal to C×D (i.e., C AND D); $S_2$ is equal to C+D (i.e., C OR D); $S_3$ is E+F; and $S_4$ is E×F. Using this timing scheme, the pair of modulated signals $A_1$ and $A_2$ provide the basis for controlling the four switches $S_1$-$S_4$ of a branch of the three-level inverter bridge.

FIGS. 15 and 16 show similar schemes for four and five-level systems, and the method is scalable to any number of levels. Note that the pattern for generating the intermediate signals demonstrated in FIG. 14 also holds true for FIGS. 15 and 16. For instance, in FIG. 16, a turn-on delay time of $\Delta t$ is added to signal $A_1$ to form signal C. Signal D is signal C, advanced by $2\Delta t$. Signal E is signal D advanced by $2\Delta t$. Signal F is signal E advanced by $2\Delta t$. Signal G is $A_2$ with a turn-on delay of $\Delta t$. Signal H is signal G, advanced by $2\Delta t$. Signal I is signal H, advanced by $2\Delta t$. Signal J is signal I, advanced by $2\Delta t$. As shown, time-coordinated $S_1$-$S_8$ are formed from intermediate signals C-J using basic logic functions. The delay and logic requirements illustrated in FIGS. 14-16 are simple, such that these procedure can be implemented with rudimentary logic elements such as AND gates and OR gates for logic functions, and flip-flops as delay elements.

The second embodiment of the invention is an adapter circuit in accordance with the first variation of the invention, converting modulated signals $A_{1b}$ and $A_{2b}$ into time-coordinated signals $S_{1b}$ to $S_{(N/3)b}$. The adapter circuit is built from analog and/or digital circuits, and/or programmed into a programmable logic device such as a Digital Signal Processor (DSP), a microcontroller, a microprocessor, or a Complex Programmable Logic Device (CPLD) in accordance with the procedures illustrated in FIGS. 5 to 16 and as discussed above.

Figure 28:
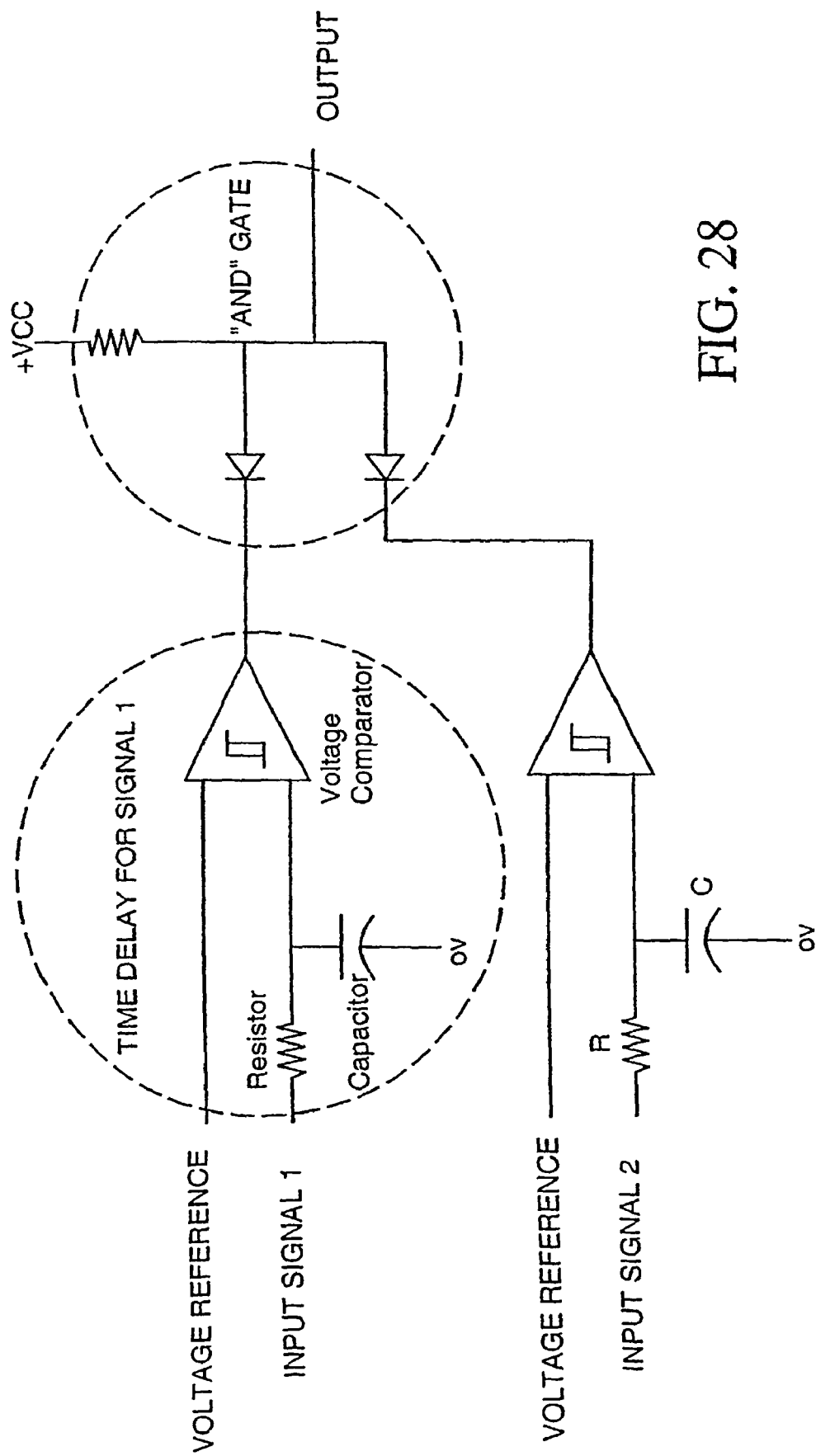
FIG. 28 illustrates exemplary analog-based time-delay and gate logic circuitry.

For an analog implementation, any type of delay element can be used, such circuits being numerous, and well known in the art. One example is a timer circuit implemented to create a delay. Another example is a resistor and capacitor in series connected to a voltage comparator amplifier, as illustrated in FIG. 28. The amount of time delay is defined by the values of the resistor and the capacitor. The voltage comparator amplifier compares an analog voltage threshold to the changing capacitor voltage creating the delay time between the input signal which is injected into the resistor and the voltage comparator output signal.

Once the delay time is generated, the combination between the delayed signal and the non-delayed or other signal may be made via a logic gate. In FIG. 28, an "AND" logic gate made out of diodes is illustrated combining a delayed "Signal 1" and an independently delayed "Signal 2." This exemplary two input AND gate is formed by connecting the anodes of two diodes to a resistor connected to the positive of the power supply. The inputs of the gate are the cathodes of the two diodes. When any of the two input signals are zero volts or "logic zero", the respective diode conducts and then the output (which is the anode of the two diodes) goes to logic zero. When both signals are "logic one" or power supply level, then both diodes are blocked and the output is also at the power supply level, thanks to the resistor, and therefore at logic one.

For a digital implementation, preferably a combination combinatorial (logic gates) and sequential circuits (flip-flops) are used. Of course, if desired for the particular implementation, digital and analog circuits may be interchangeably mixed. For example, analog delay elements may be used with digital logic gates (i.e., combinatorial circuits), or sequential circuits may be used with analog logic gates. Likewise, hard-wired circuits may be utilized in combination with programmable circuits.

Figure 17A:
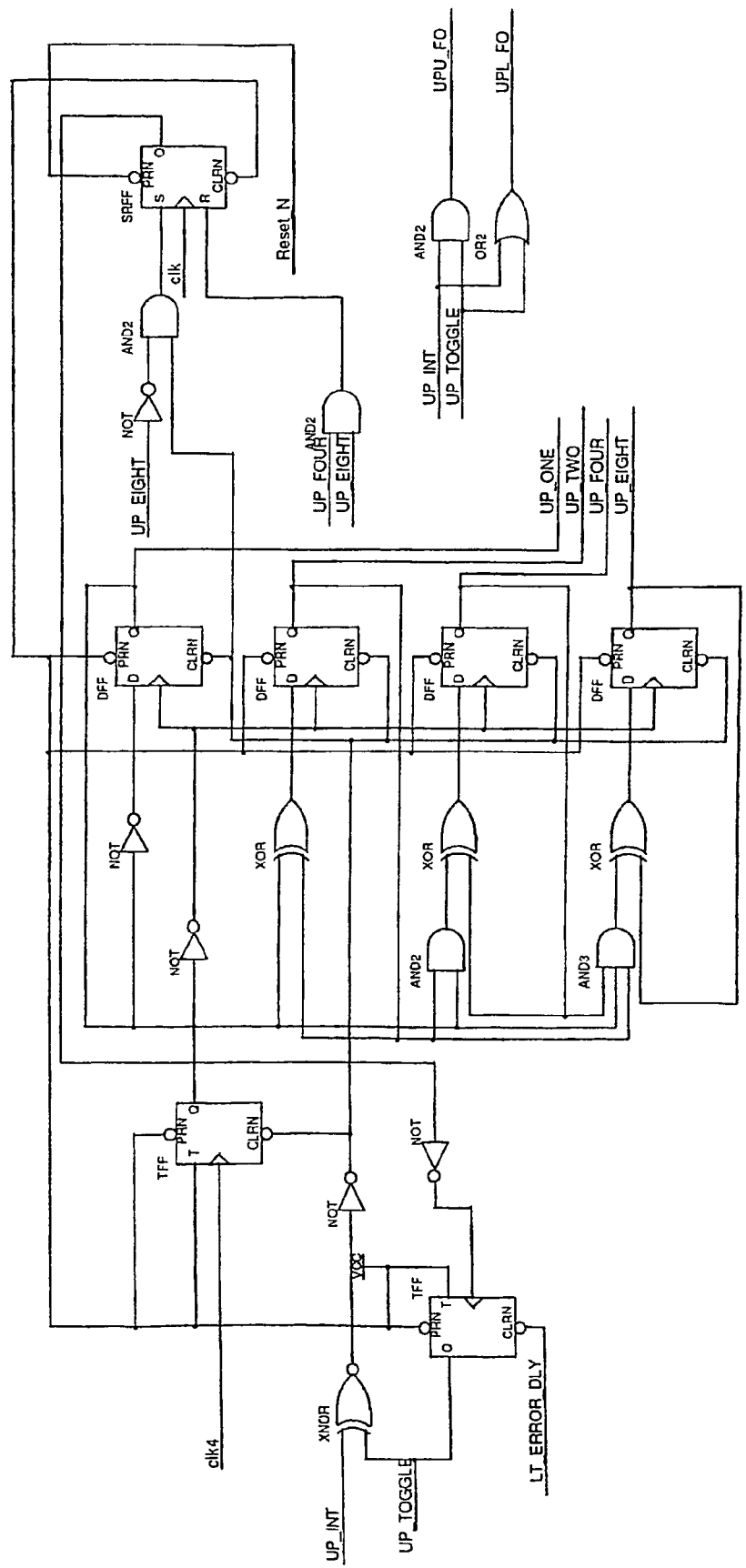
FIGS. 17A-17P are circuit diagrams of a CPLD program which realizes the timing functions as illustrated in FIG. 14, and including control and fault coordination functions.
Figure 17B:
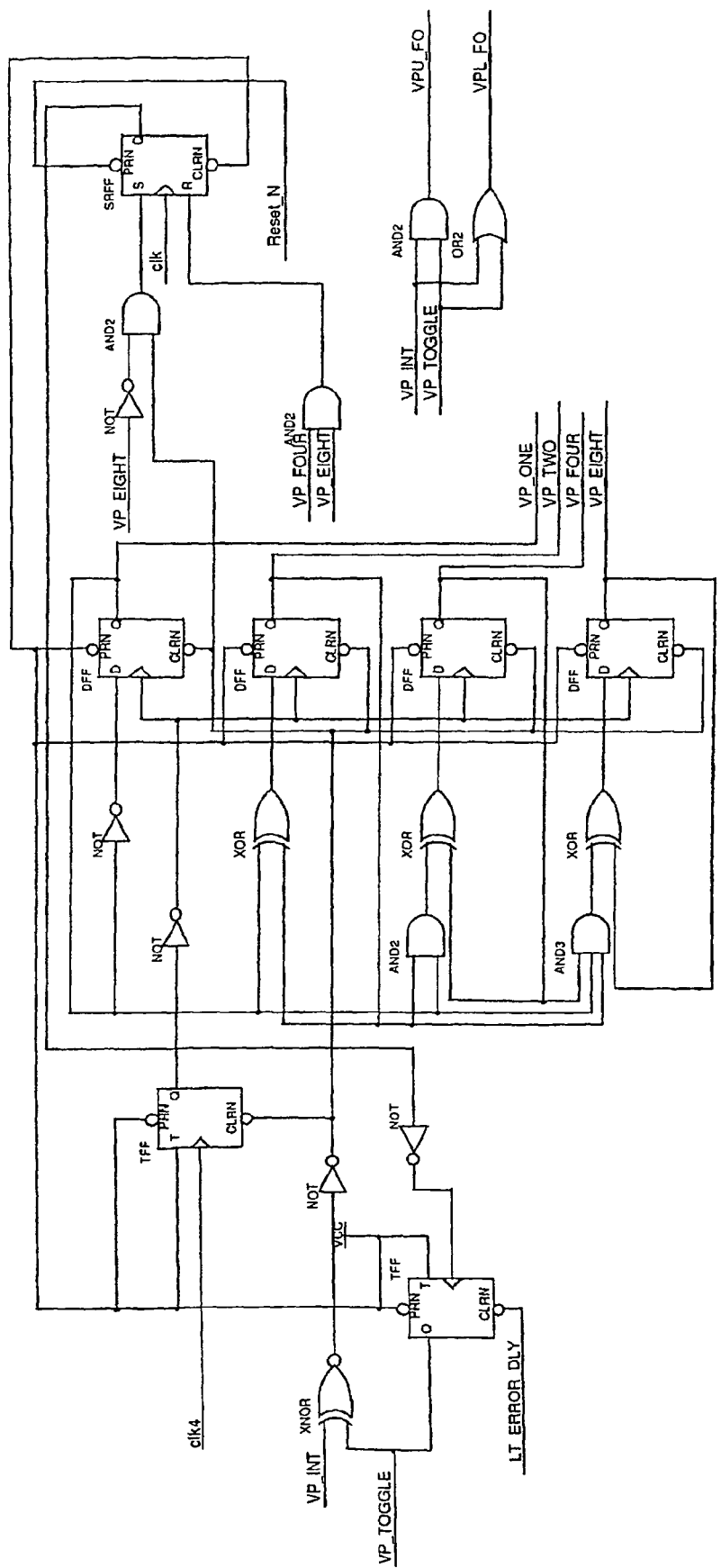
Figure 17C:
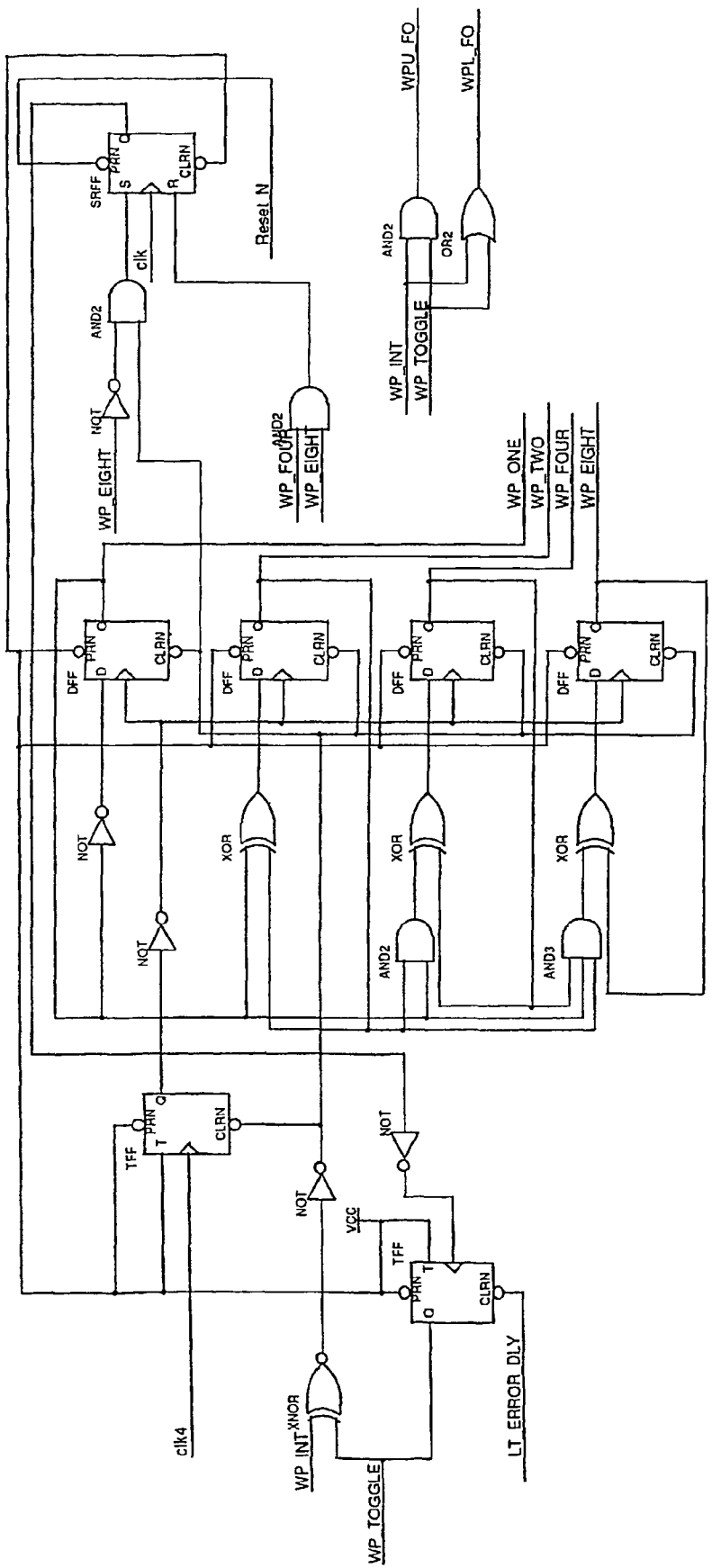
Figure 17D:
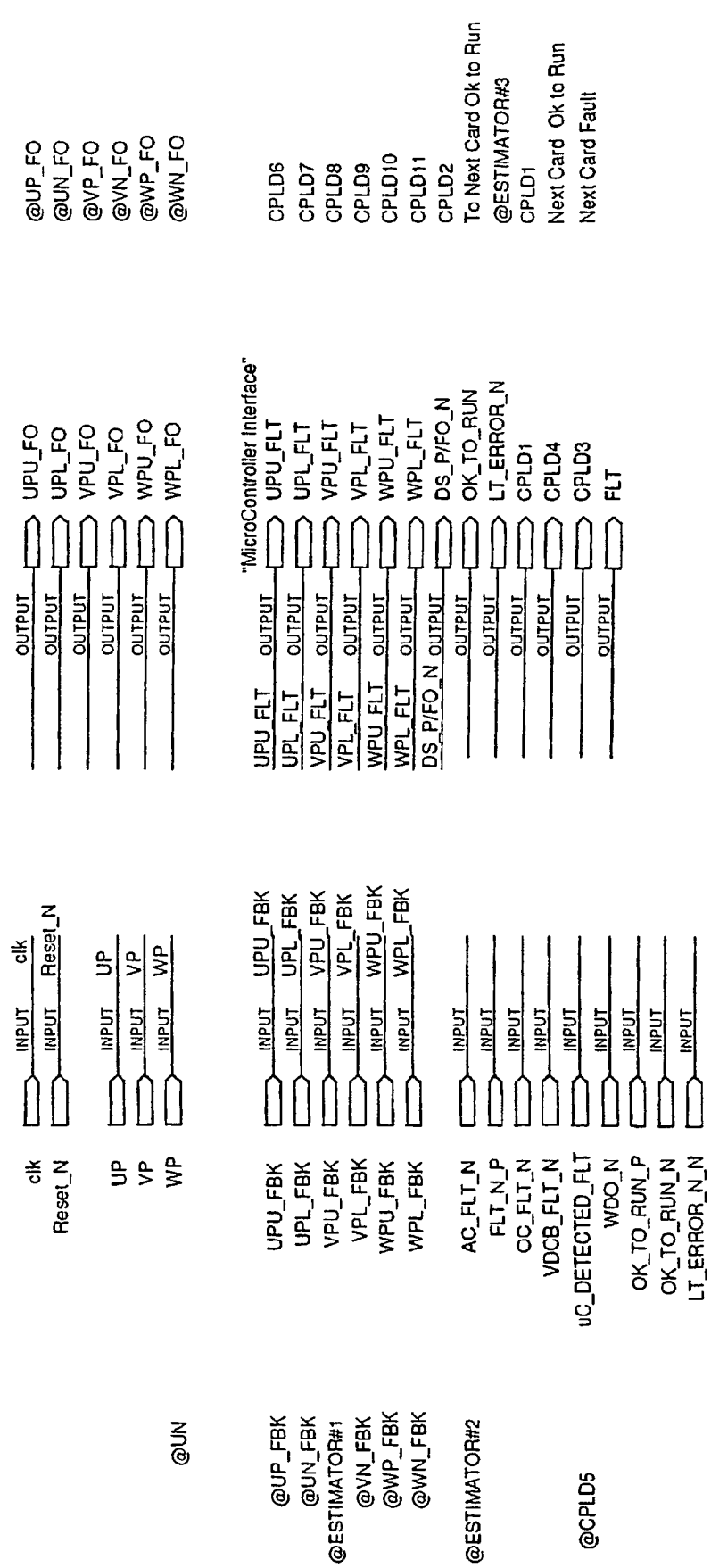
Figure 17F:
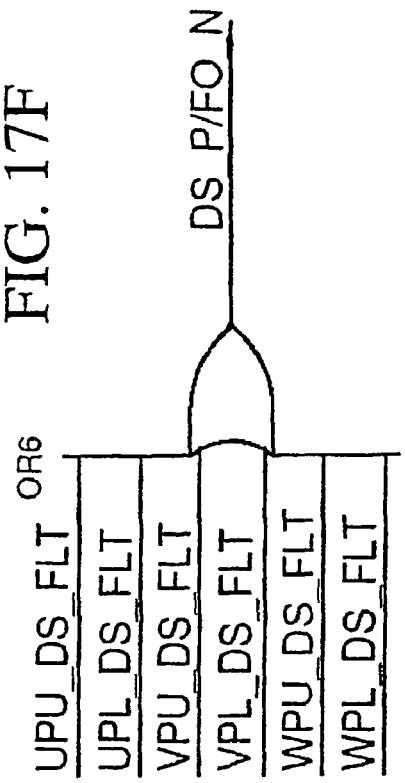
Figure 17E:
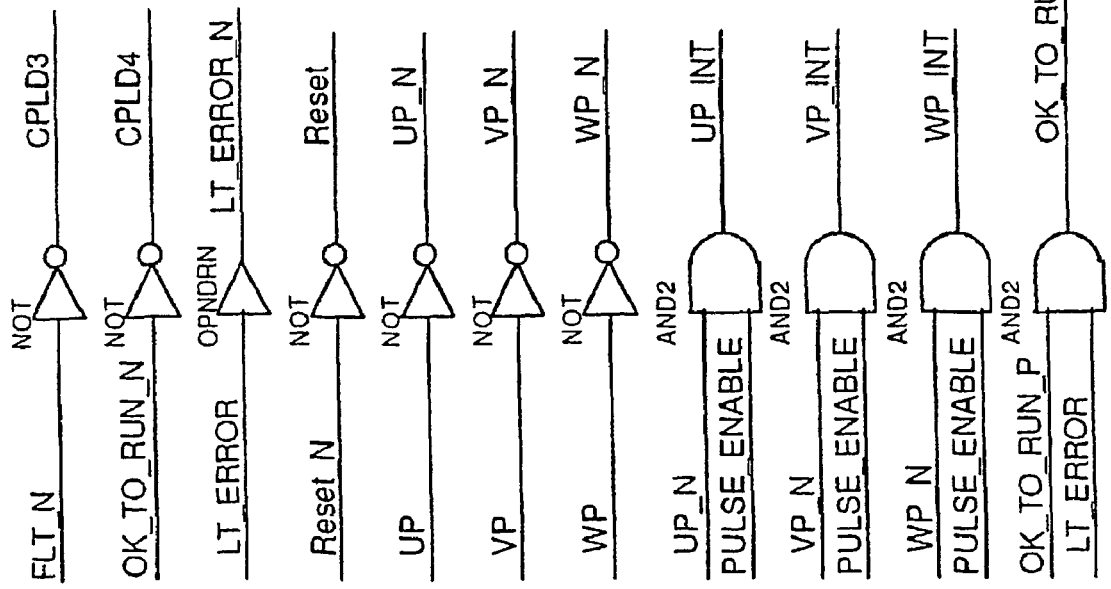
Figure 17G:
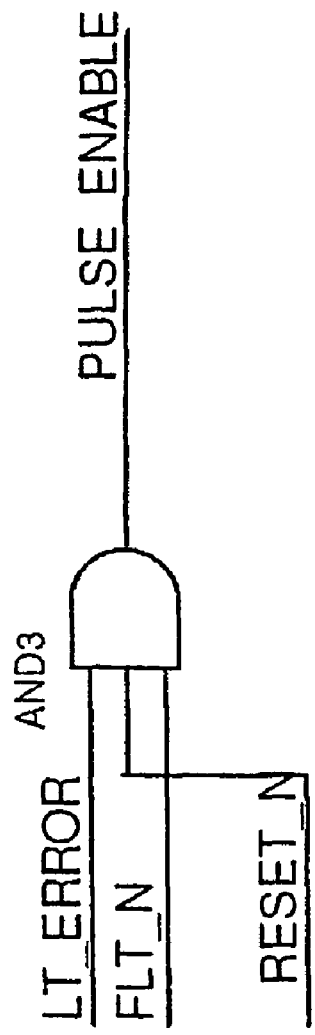
Figure 17H:
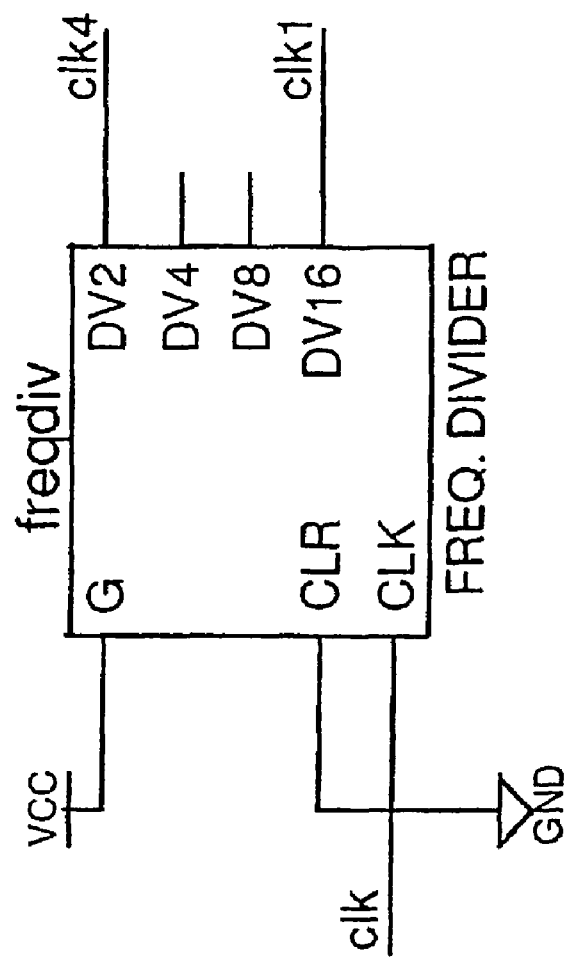
Figure 17I:
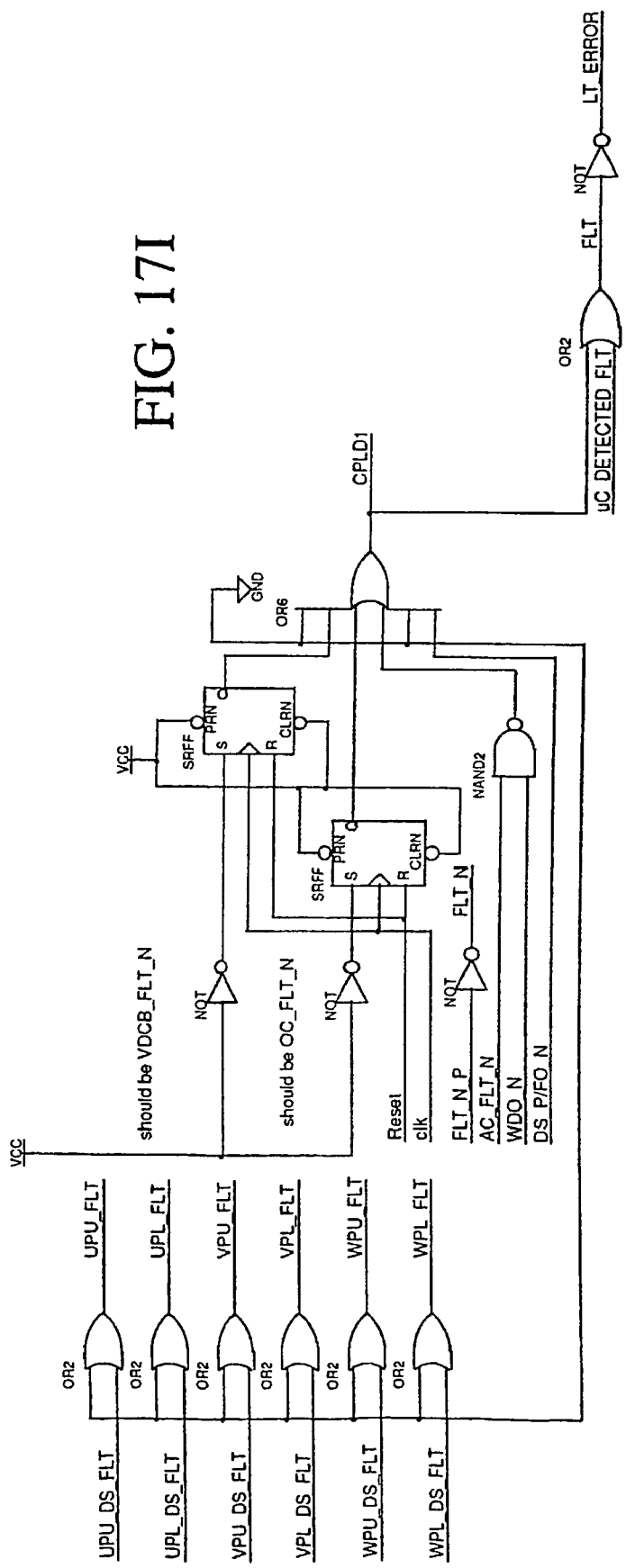
Figure 17J:
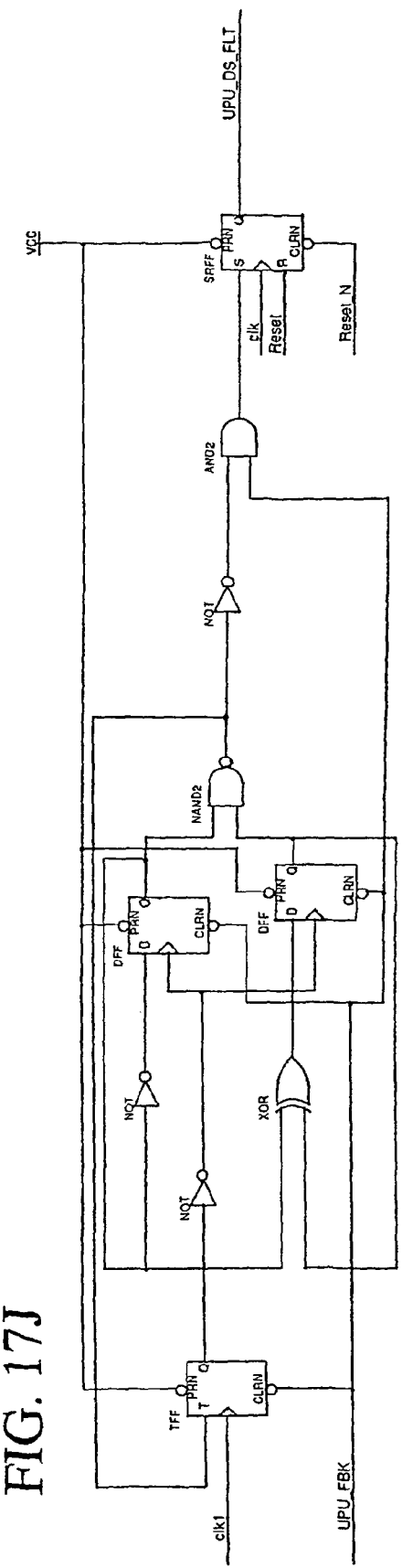
Figure 17K:
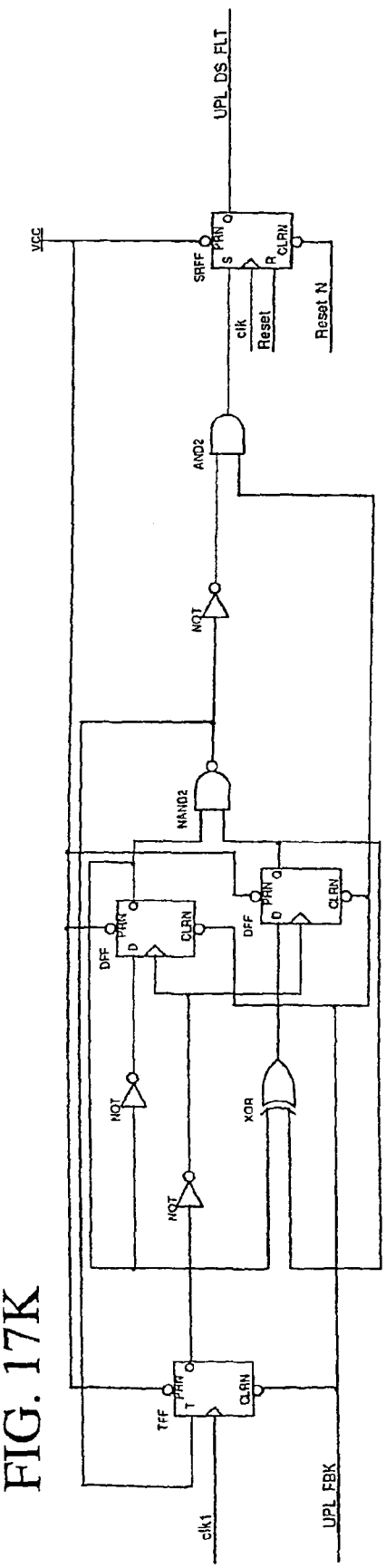
Figure 17L:
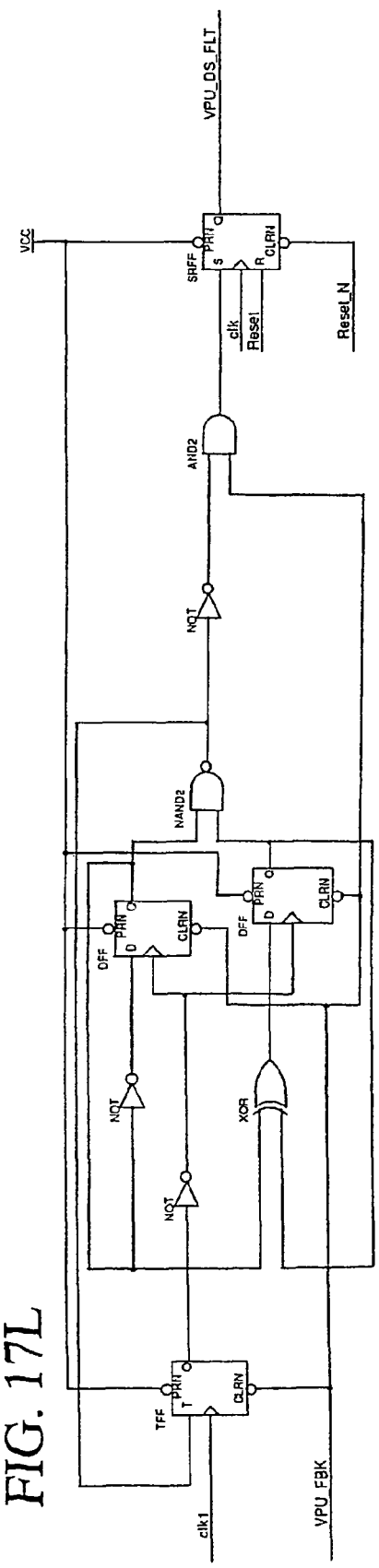
Figure 17M:
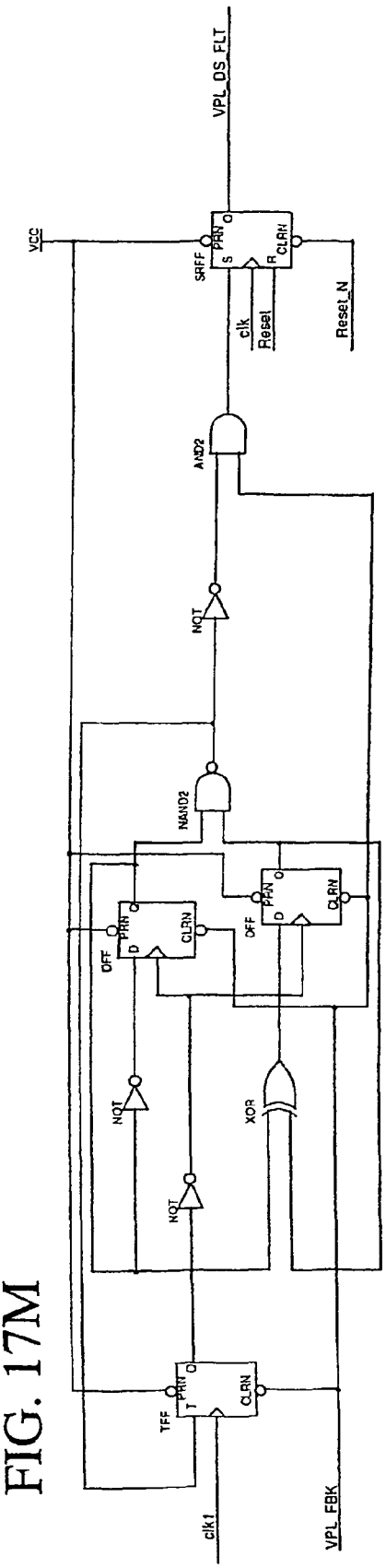
Figure 17N:
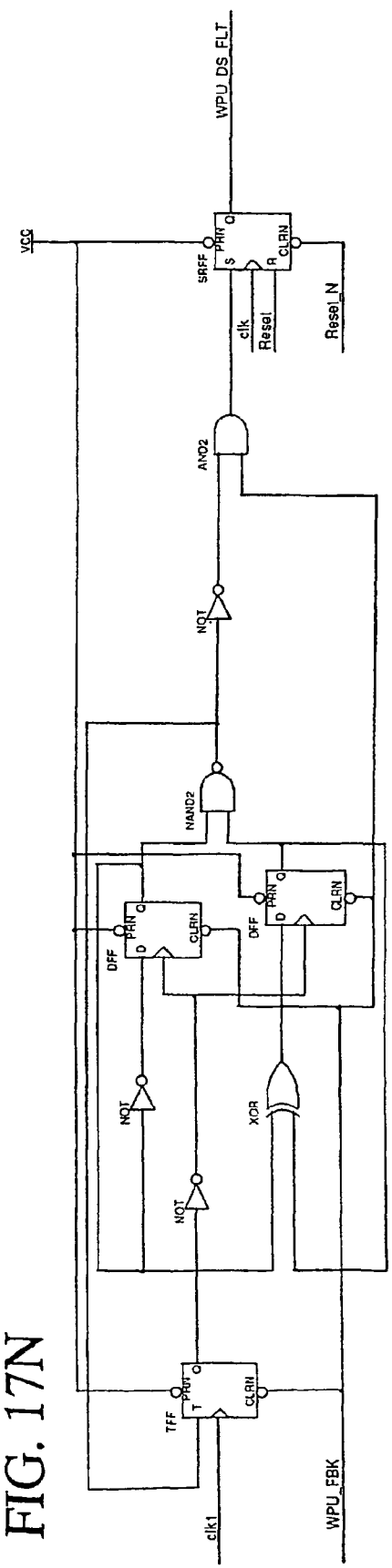
Figure 17O:
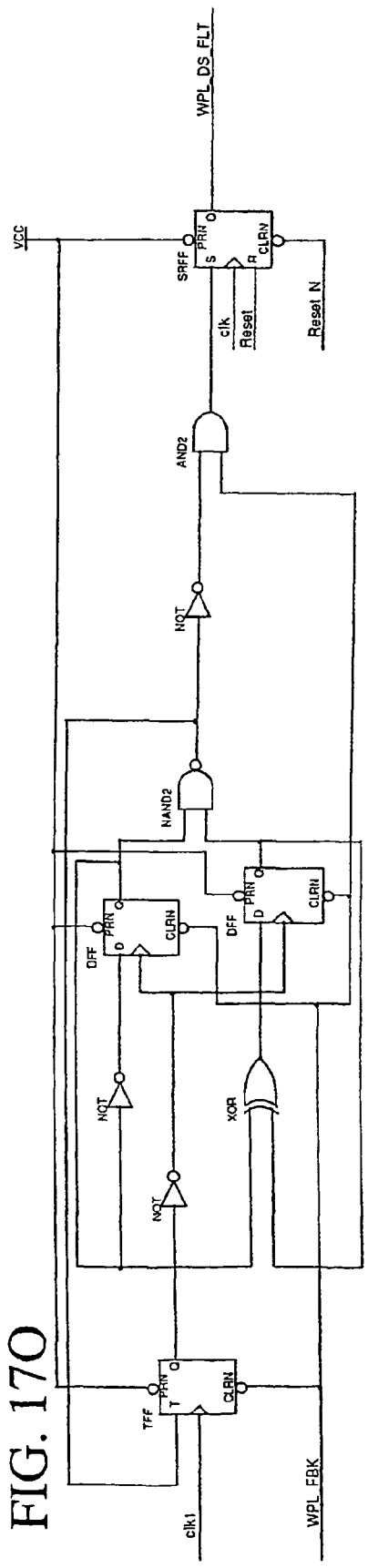
Figure 17P:
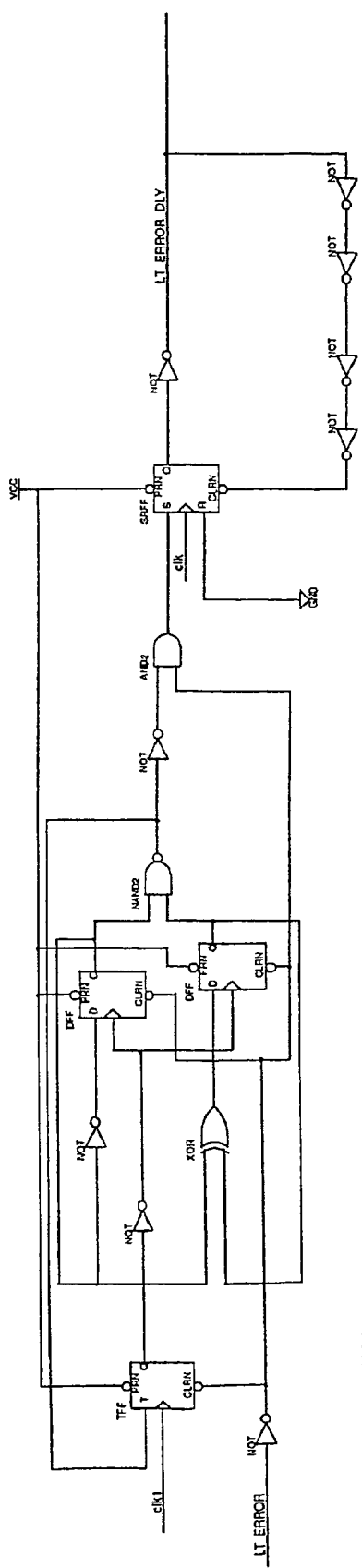

As an example of a digital implementation, FIGS. 17A-17P illustrates a preferred embodiment of the signal processing described in FIG. 14 through a combinatorial/sequential digital circuit which is then embedded into a Complex Programmable Logic Device (CPLD). In reality the process can be implemented with analog or digital circuits, or with a Digital Signal Processor (DSP) or a microprocessor. Additionally, the combinatorial/sequential digital circuit includes control and fault coordination functions.

The third embodiment is an induction motor drive system implementing the first variation of the invention. The induction motor drive includes at least a two-level motor controller outputting signals for controlling a two-level inverter bridge, a multiple-level bridge having $N \geq 12$ switches arranged to form 3 branches, and an adapter circuit generating N time-coordinated signals for controlling the N switches of the multiple-level inverter bridge from the signals output by the two-level induction motor controller.

Figure 18:
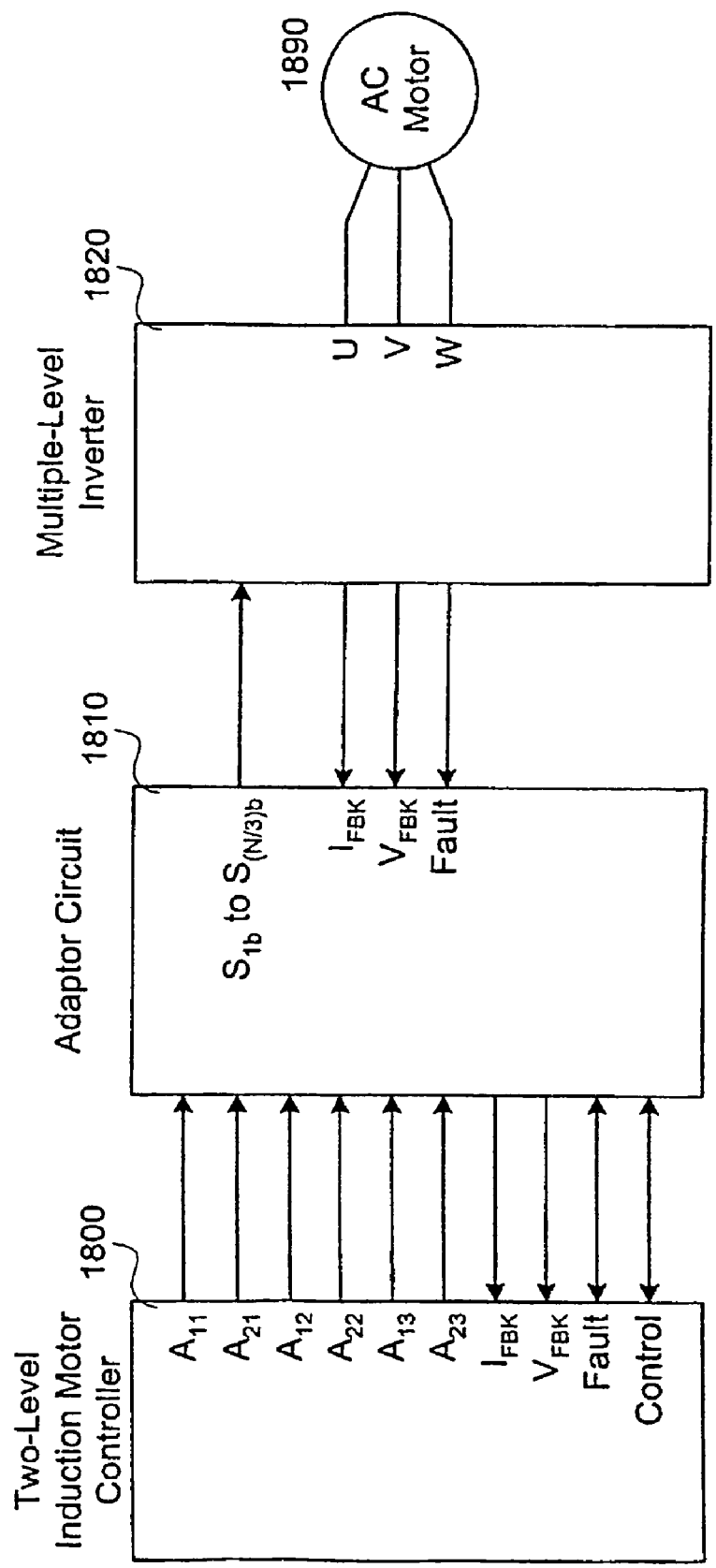
FIG. 18 illustrates a signal flow within an induction motor drive system implementing the first variation of the invention.

FIG. 18 illustrates signal flow within the drive system. The two-level induction motor controller 1800 outputs six modulated signals ($A_{1b}$, $A_{2b}$), which the adapter circuit 1810 converts into N time-coordinated signals. The N time-coordinated signals control the switches in the N switches in the multiple-level inverter 1820, which provides a three-phase output to an AC motor 1890. For examples of common configurations of the N switches of the multiple-level inverter bridge, see FIGS. 2 and 3A-3C.

The "off-the-shelf" control circuit 1800 requires certain pieces of information from the converter and inverter power sections of a given AC drive. The converter is the portion of the drive which provides the multiple voltage levels to the inverter. For example, the section in FIG. 1 providing the positive bus and negative bus, and the section in FIG. 2 providing the positive bus, neutral bus, and negative bus.

The controller 1800 uses these signals in order to derive motor data such as rotor position and angular speed, as well as flux position and angular speed. As illustrated in FIG. 18, there are signals generated by the adapter circuit block 1810 that are passed to the "off-the-shelf" two-level control circuit. The adapter circuit is synthesizing the signals that the "off-the-shelf" control circuit needs to control the induction motor speed and torque. In the case of vector control, torque is regulated such that the motor will respond to quick variations of load, whereas with scalar control, it is not, but is a byproduct of the frequency and voltage output of the controller and it is only suitable for steady state conditions without load transients. The synthesized signals of the adapter circuit generally are: "current feedback," "voltage feedback," "fault" and "control coordination and timing." The adapter circuit illustrated in FIG. 17A-P includes this functionality.

The "off-the-shelf" motor controller 1800 needs to receive some current (IFBK) and voltage (VFBK) feedback signals, which are used for the speed, flux, and torque regulation. It also needs fault information from the inverter circuit 1820 in order to coordinate the appropriate shutting down sequence, and give proper feedback to the operator or host computer.

Besides giving the "off-the-shelf" control circuit the required feedback and control signals, the adapter circuit 1810 also uses these signals internally in order to have redundant, and in a few cases an instantaneous, fault detection. This allows the adapter to react without having to wait for the "off-the-shelf" control circuit.

The signals from the "off-the-shelf" low voltage motor controller 1800 that are used by the adapter circuit 1810, are the two-level modulator signals $A_{1b}$ and $A_{2b}$, and the fault and control signals to command when the AC drive is to run or to stop.

Figure 19:
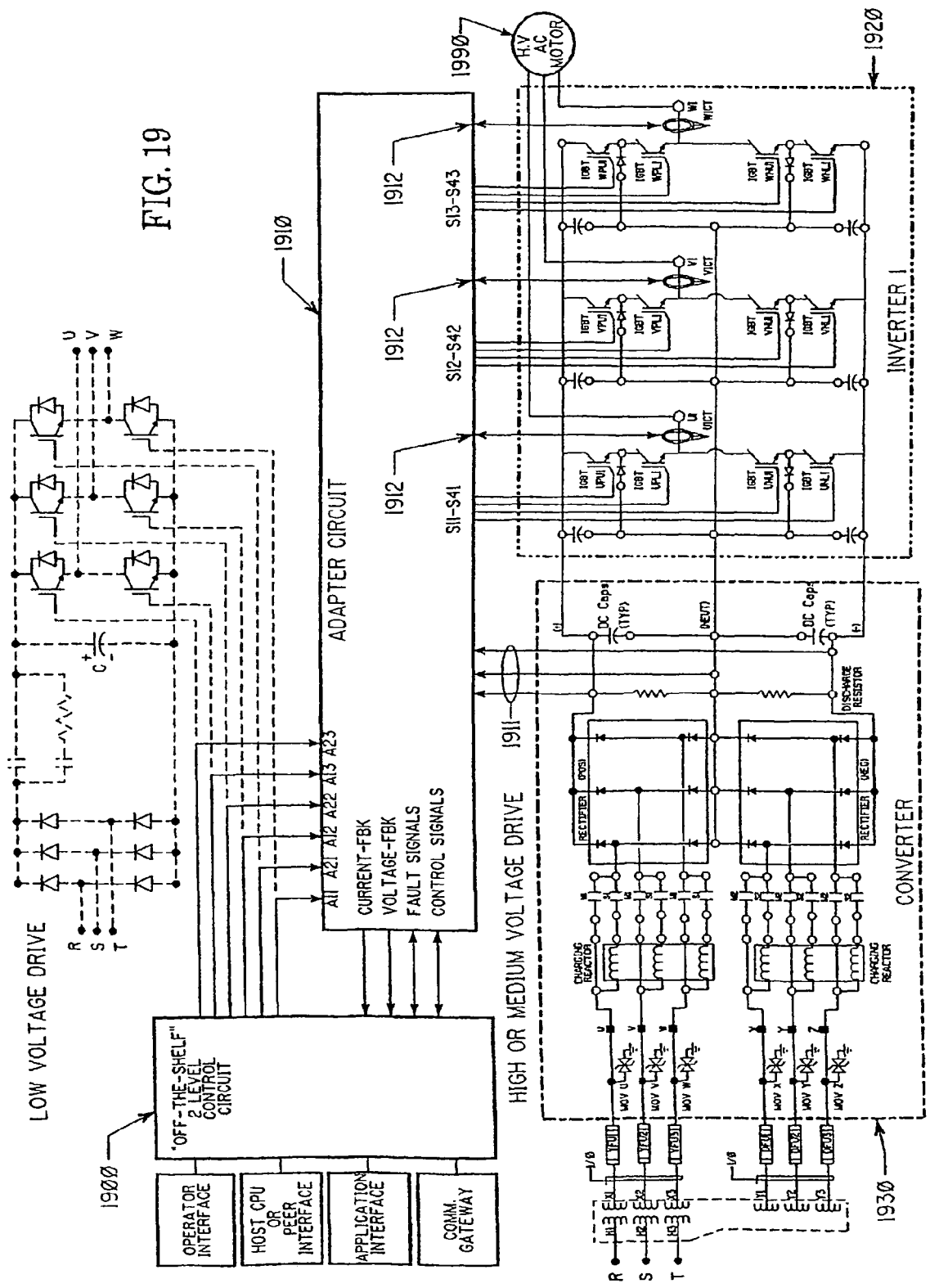
FIG. 19 is a block diagram of an induction motor drive system implementing the first variation of the invention with a three-level inverter bridge.

An example of this embodiment is illustrated for a three-level inverter bridge in FIG. 19. The adapter circuit 1910 receives three pair of modulated signal inputs $A_{1b}$ and $A_{2b}$ from the two-level controller 1900, and outputs signals $S_{1b}$ to $S_{(N/3)b}$ to multiple-level in inverter 1920. The voltages "levels" output by the converter are sensed by the adapter circuit (via lines 1911), as are the current levels of the drive signals to the motor 1990 (via sensors lines 1912). The adapter circuit provides voltage and current feedback to the two-level induction motor controller 1900 based on the voltage (1911) and current (1912) feedback received from the converter 1930 and inverter 1920. Note that the feedback voltages 1911 can be measured in either the converter 1930 or inverter 1920.

From these feedback signals (1911, 1912), fault detection is performed within the adapter circuit 1910. If the two-level controller 1900 detects the fault first, it signals the adapter circuit 1910 that a fault has occurred. However, if the adapter circuit 1910 detects the fault first, the adapter circuit signals a fault to the two-level controller 1900. Accordingly, fault and control signaling is illustrated in FIGS. 18 and 19 as bidirectional.

The signals $S_{1b}$ to $S_{(N/3)b}$ are derived from $A_{1b}$ and $A_{2b}$ in accordance with the procedures and circuits illustrated in accordance with the procedures in FIGS. 5 to 17. Accordingly, the drive system illustrated in FIG. 19 for a three-level system scales to accommodate four-and-higher level systems as well.

Second Variation

The second variation of this invention utilizes only the control signals (a.k.a., command signals) that feed the two-level modulator inside an ordinary induction motor controller by transmitting these signals to a separate adapter control circuit. Generally these induction motor controllers use either scalar and/or vector control techniques. Scalar control is the oldest and simplest form of control for generating frequency and output voltage signals in an open-loop configuration with limited torque response. Vector control, on the other hand, controls the speed, flux and torque components of the induction motor in a closed loop configuration and therefore provides high motor performance to load torque transients. The separate adapter circuit includes a multi-level modulator which drives the power switches of a medium or high voltage inverter bridge. The method of transmitting the motor control data is via a serial or a parallel interface port, over any media, such as wire, fiber, or wireless. This allows for existing low voltage and two-level induction motor controllers to drive a medium or high voltage multi-level inverter bridge.

In a preferred embodiment, vector control is utilized, with the flux and torque control devices (e.g., a microprocessor-based vector controller with PID loops regulating both torque and magnetic flux) continuously calculating the angular speed and position of the motor shaft and of the rotating flux of the induction motor being controlled. By comparing these calculated values to desired values for the motor, the same speed and torque control devices are able to generate torque and flux command signals. In a conventional controller, this comparison occurs typically one to four times per millisecond. The signals resulting from these comparisons are transformed into voltage (or current) and phase command signals by a conventional vector control method.

In this preferred embodiment of the second variation of this invention, the existing induction motor controller outputs the vector control command signals via an interface port to an external circuit. The external circuit comprises an interface port and a multiple level modulator. Similarly, if scalar control is used instead, the controller updates and outputs voltage and frequency command signals via the interface port to the external adapter circuit.

We tale the off-the-shelf induction motor controller (i.e., flux and torque signals or voltage and frequency or their mathematically transformed components, that yield sinusoidal voltage (or current) and phase command signals) output signals via a serial or parallel port and then inject them into a specialized multilevel modulator circuit which generates the signals to drive the switches in a multilevel inverter bridge. The innovation of invention here is that we are talking the off-the-shelf, two-level, low voltage command signals via a serial or parallel port into a separate circuit which has a modulator for multi-level inverter. The invention is in the idea of the link (passing the command signals to another circuit via serial or parallel port) between the off-the-shelf two-level low voltage control circuit and the new circuit with a multilevel modulator. The multi-level modulator may use any modulation method, and be of any type, whether known now or developed the future. Well known existing modulation methods include space vector, hysteresis, pulse-pattern, sine-triangle comparison, and third harmonic injection.

Figure 20A:
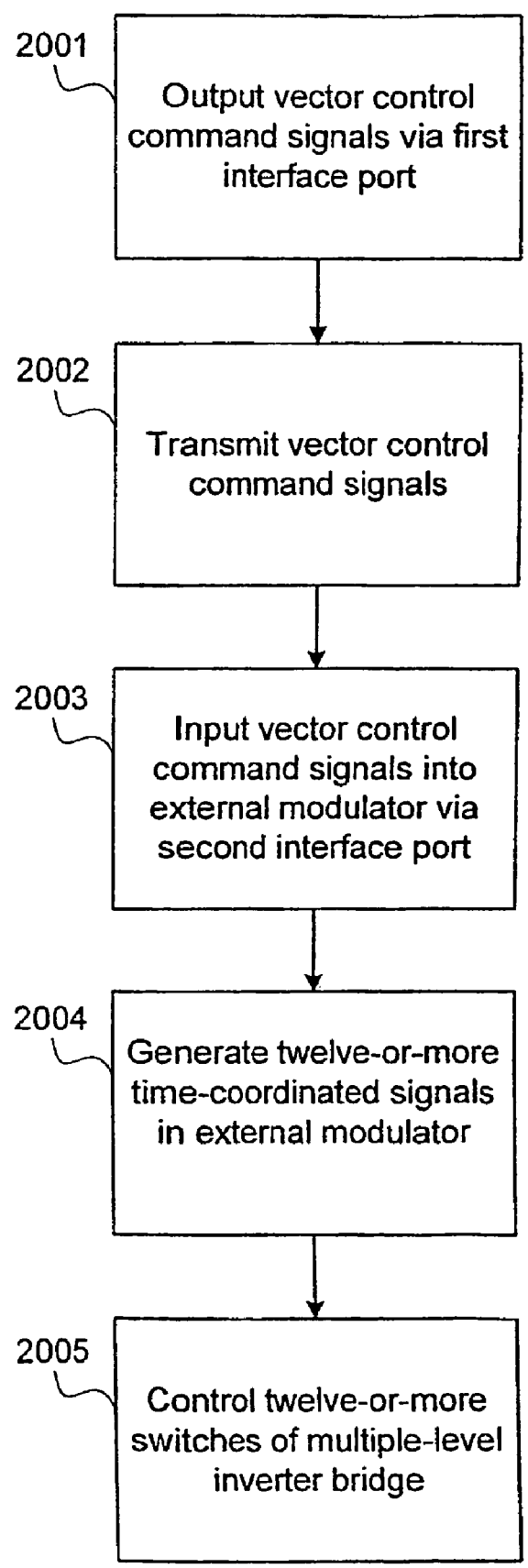
FIG. 20A illustrates process steps for implementing a second variation of the invention utilizing vector control, converting vector control data from a two-level induction motor controller into the twelve-or-more signals needed to control the twelve-or-more switches of the multiple-level inverter bridge.

Referring to FIG. 20A, utilizing vector control, the procedure comprises extracting the vector control command signals from a two-level induction motor controller via an interface port (step 2001), transmitting vector control command signals from the interface port of the controller (step 2002) and inputting the command signals into an external modulator (step 2003), generating twelve-or-more time-coordinated signals in the external modulator (step 2004) and controlling the switches of a multiple-level inverter bridge with the time-coordinated signals (step 2005).

Figure 20B:
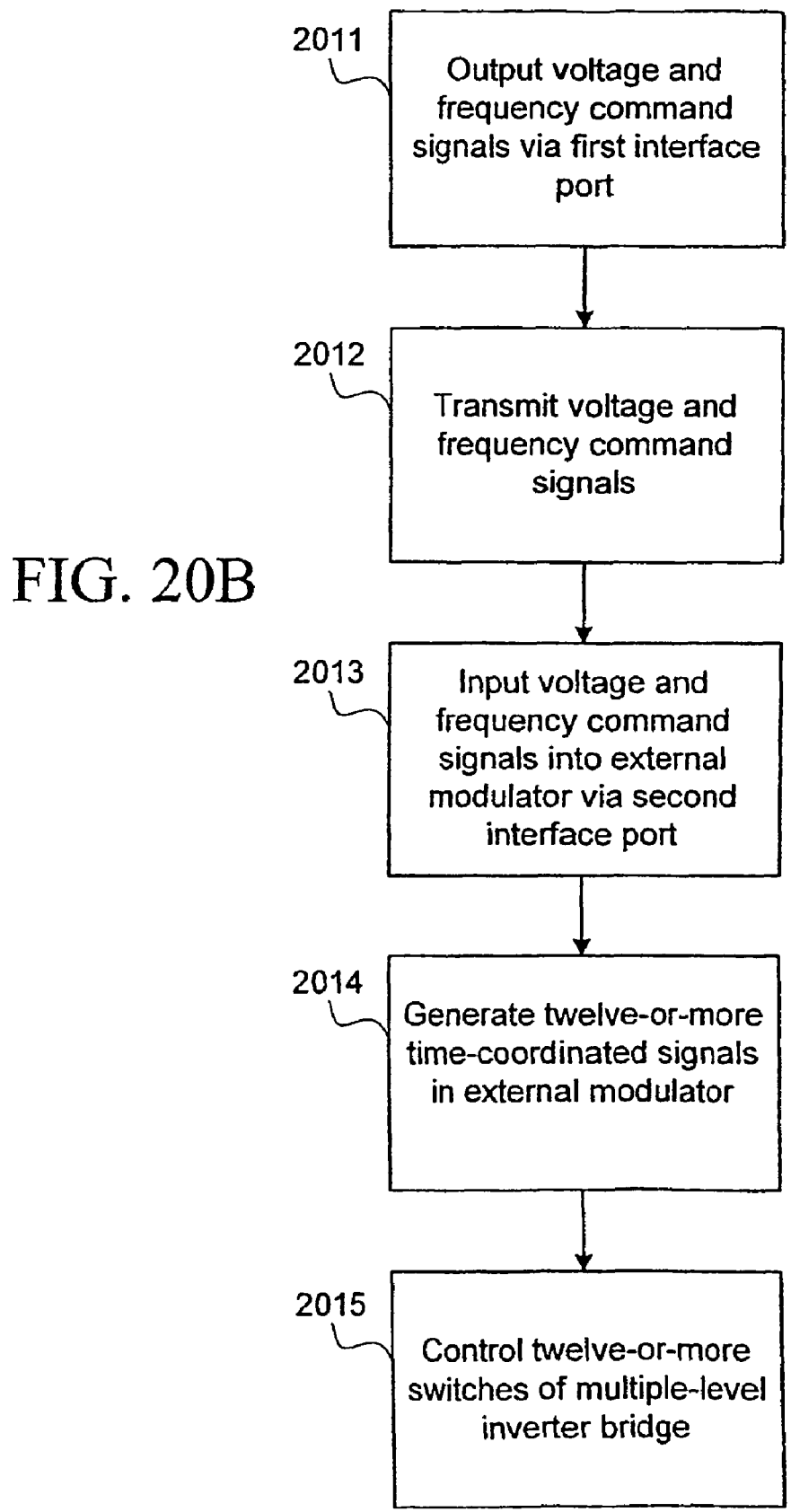
FIG. 20B illustrates process steps for implementing a second variation of the invention utilizing scalar control, converting scalar control data from a two-level induction motor controller into the twelve-or-more signals needed to control the twelve-or-more switches of the multiple-level inverter bridge.

Referring to FIG. 20B, utilizing scalar control, the procedure comprises extracting the frequency and output voltage command signals from a two-level induction motor controller via an interface port (step 2011), transmitting voltage and frequency command signals from the interface port of the controller (step 2012) and inputting the command signals into an external modulator (step 2013), generating twelve-or-more time-coordinated signals in the external modulator (step 2014) and controlling the switches of a multiple-level inverter bridge with the time-coordinated signals (step 2015).

In a preferred implementation, the existing controller's Controller Area Network (CAN) serial interface is used to send either the vector or scalar command signals from the control regulator to the external circuit, also having a CAN port. The command signals are then modulated via a multi-level space vector modulator, or they are transformed into three sine waves which are then compared to multiple levels of triangular carrier signals to generate multilevel pulse-width modulated signals, to drive the switches in a multilevel inverter bridge.

Figure 21:
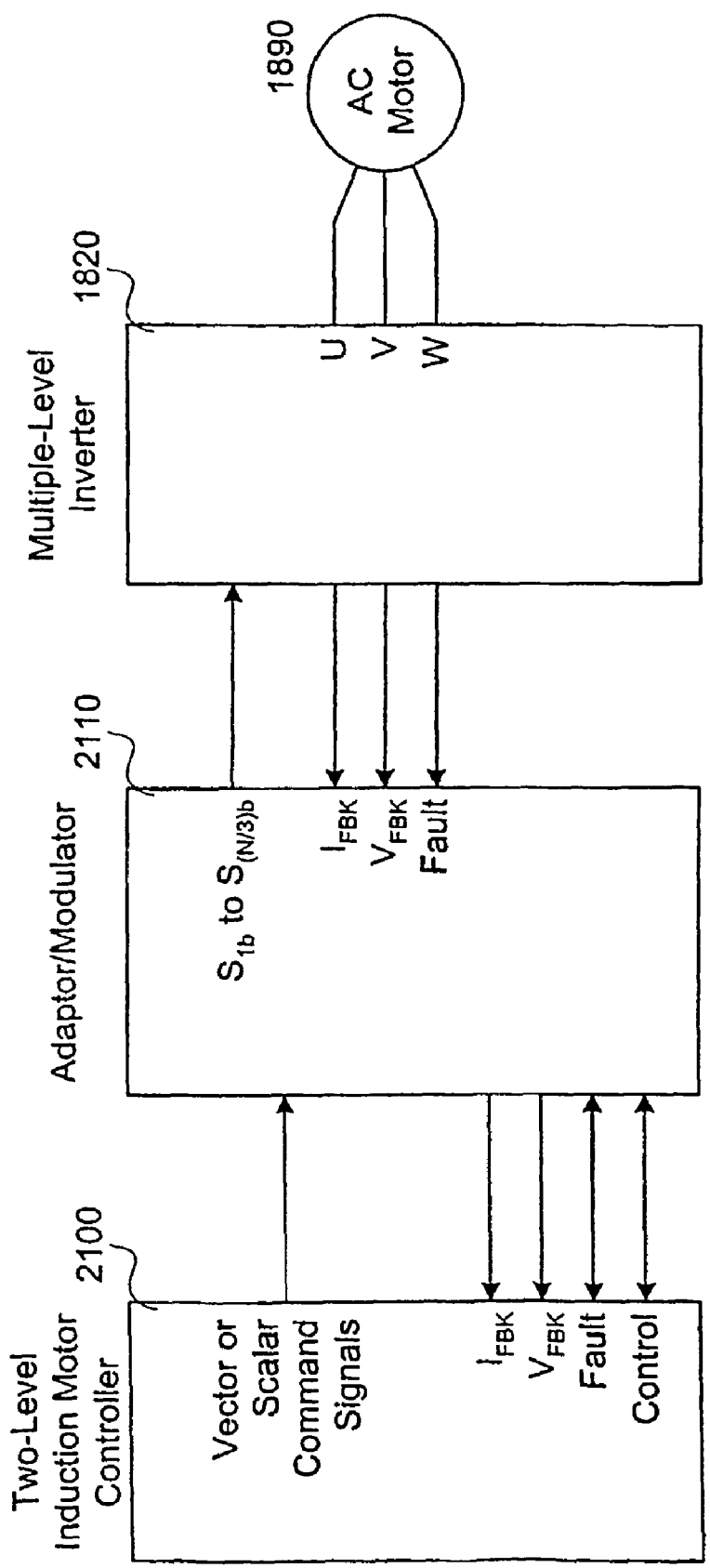
FIG. 21 illustrates a signal flow within an induction motor drive system implementing the second variation of the invention.

Signal flow within the system is illustrated in FIG. 21. The "off-the-shelf" two-level induction motor controller 2100 outputs vector and/or scalar command signals, which the adapter/modulator circuit 2110 converts into N time-coordinated signals. The N time-coordinated signals control the switches in the N switches in the multiple-level inverter 1820, which provides a three-phase output to an AC motor 1890.

In addition to the modulator and interface circuitry, the adapter/modulator (2110) preferably also provides fault and control signal capabilities, as discussed in the first variation of the invention.

There are time constraints to attend when controlling an induction motor in the sense that it can not take too long for the information to pass to the multilevel modulator, lest it will cause the control system to loose control of the motor. Therefore, the interface ports need to be fast enough. Preferably, the vector or scalar command signals extracted from the two-level controller should be, at a minimum, updated every millisecond.

Vector and Scalar Control Theory

Induction motors are non-linear systems where the torque they generate does not follow directly the stator current magnitude. That is because the stator current is formed by two orthogonal vector components: the flux generating vector which is 90 degrees out of phase relative to the stator voltage; and the torque generating vector which is in phase with the applied stator voltage. Until the advent of fast microprocessors, the way of controlling torque in an AC drive was to merely keep the ratio of Volts per Hertz (V/Hz) constant, in an open-loop fashion (i.e., scalar control).

This scalar control mode is still widely used for those types of load that do not require tight speed and torque control, such as fans. It also is suitable for applications where one AC drive is connected to several AC induction motors in parallel. The dynamic response of V/Hz controls is limited by the slip frequency of the motor which can vary by hundreds of RPM.

For tighter torque and speed regulation, field orientation methods or vector control are used. Basically, vector control, separates the flux vector and the torque vector in the motor current information. This is done mathematically in a process called Clarke and Park Transformations. The Clarke transformation reduces the balanced three phase current signals ia, ib and ic, phase shifted by 120 degrees from each other, into two signals: iα and iβ. Signals iα and iβ are sinusoidal signals phase shifted by 90 degrees which represent the three phase vectors in an orthogonal plane.

In order to separate the torque and the flux components of the motor current, iα and iβ signals undergo a Park transformation which generates the signals id (the flux current) and iq (the torque current).

Once the flux and torque vectors are separated, they can be used as feedback signals in two distinct PIED loops, used to regulate flux and torque respectively. The outputs of the PID loops are the voltage commands for regulating torque, Vq, and flux, Vd. They need to be transformed into alpha and beta components in an orthogonal stationary reference frame, with a reverse Park transformation, which generates the signals Vα, and Vβ which are two sinusoidal signals phase shifted by 90 degrees. Vα and Vβ are sufficient to control a space vector type modulator, whereas for sine-triangle modulator Vα and Vβ have to be transformed into three separate sine waves Va, Vb and Vc, phase shifted by 120 degrees, via a reverse Clarke transformation. These sine waves can be used in a sine-triangle modulator to generate the switching signals for the inverter switches.

Figure 29A:
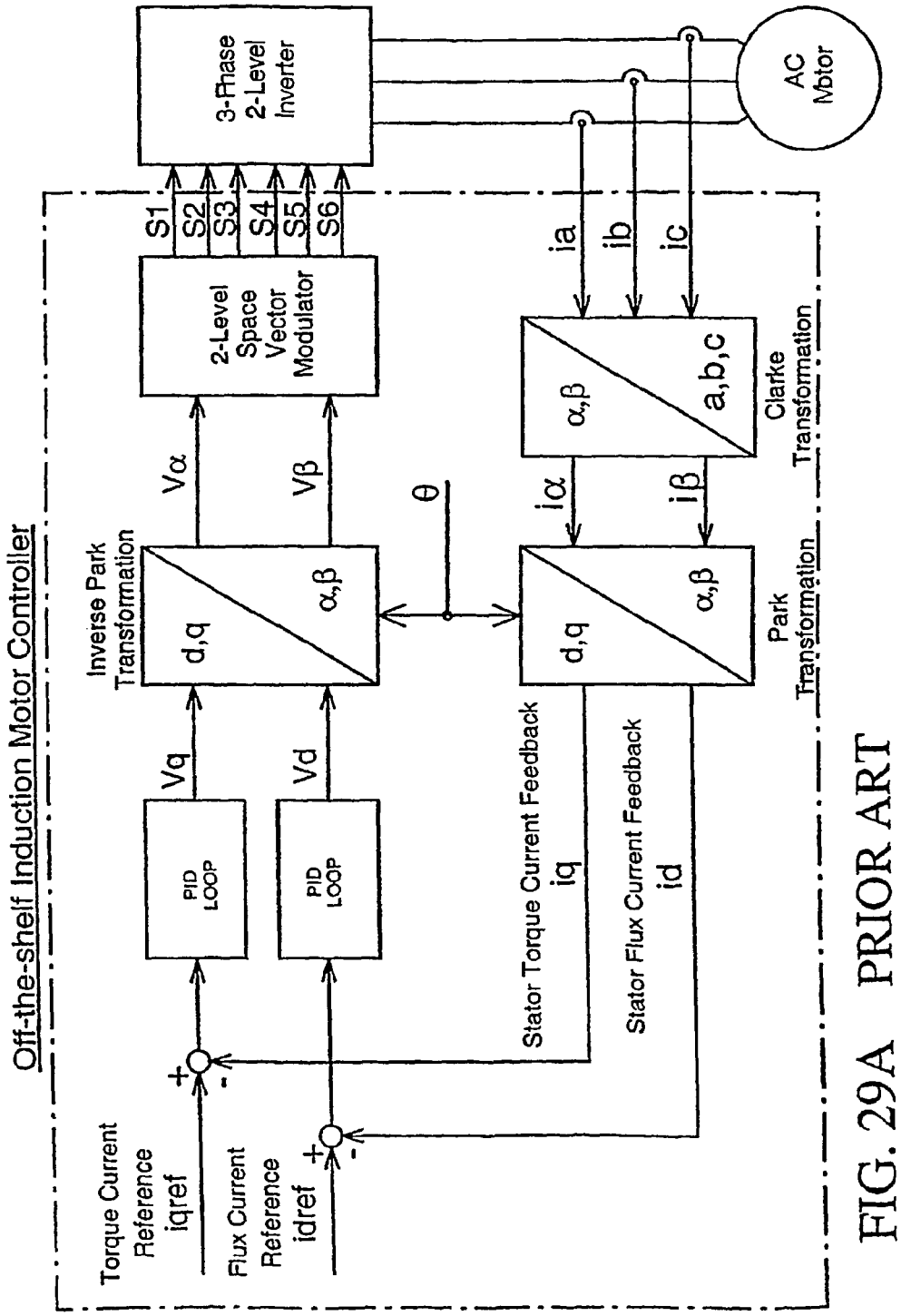
FIGS. 29A and 29B illustrate conventional vector-based controllers connected to an external inverter and AC motor, showing internal signaling aspects of the controllers.
Figure 29B:
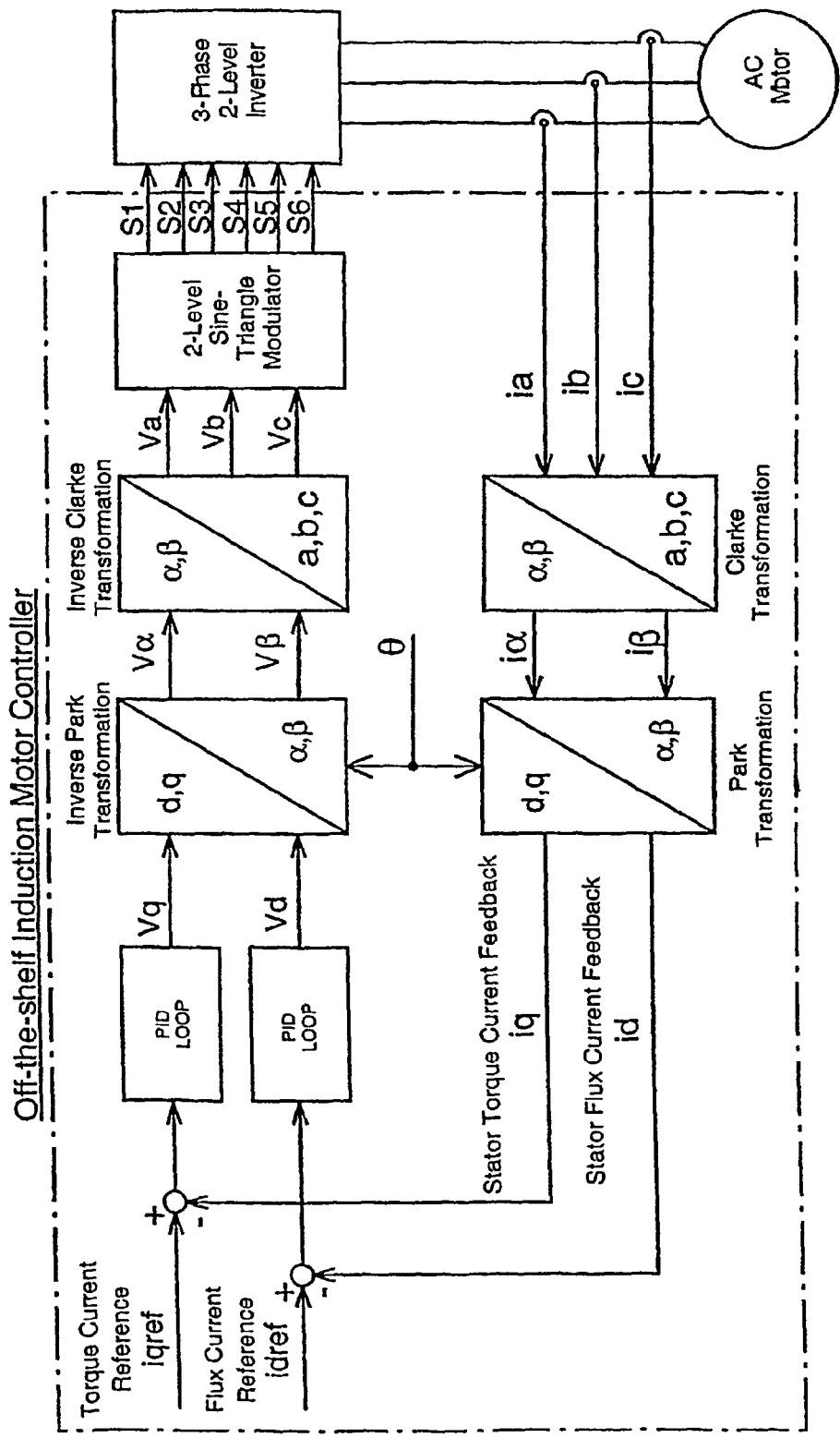

FIG. 29A illustrates a conventional vector-based controller connected to an external inverter and AC motor. The controller includes an internal 2-level space vector modulator. With space vector modulation, the vector command signals provided to the internal modulator are α and β. In comparison, FIG. 29B illustrates another conventional vector-based controller, but includes a sine-triangle modulator. With sine-triangle modulation, Va, Vb and Vc are utilized as the command signals. As shown in these figures, a value θ is utilized in the Park transformations. The value θ is the flux vector phase angle information, which is either calculated or measured.

Figure 22:
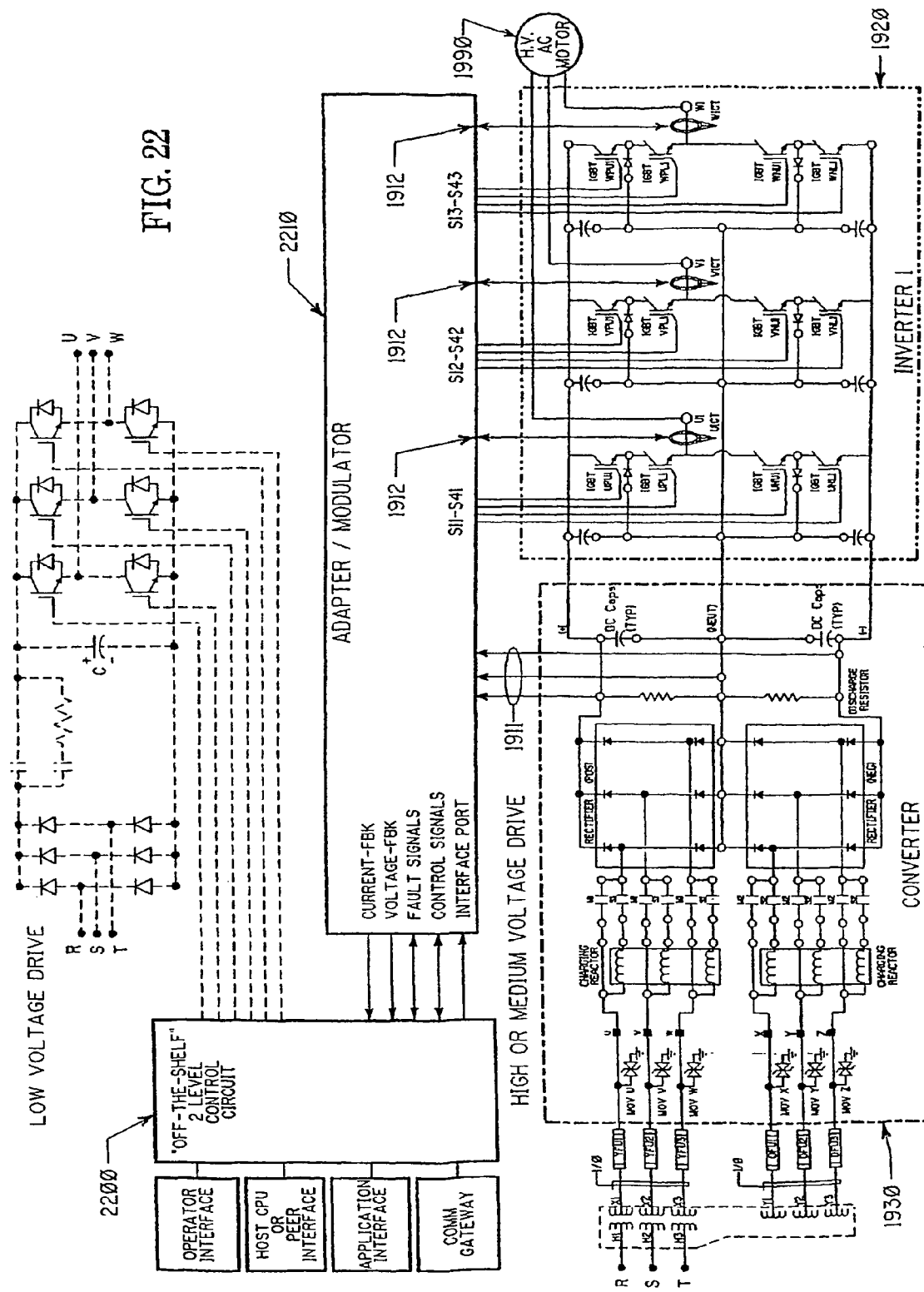
FIG. 22 is a block diagram of an induction motor drive system implementing the second variation of the invention with a three-level inverter bridge.

In the preferred embodiment illustrated in FIG. 22 of the second variation of this invention, either the vector command signals (i.e., flux (Vd) and torque (Vq), or the mathematical transformations (Vα and Vβ or Va, Vb and Vc)) or scalar command signals (i.e., voltage and frequency, or their mathematical transformations (Vα and Vβ or Va, Vb and Vc)) are transferred to a second circuit (2210) external from the "off-the-shelf" controller (2200) via a serial or a parallel interface port. Although these command signals are identified here as voltages, it should be understood that currents may likewise be used throughout this variation of the invention, and where currents are identified, voltages may be used.

The second circuit (2210) includes a modulator to which the command signals are provided. A space vector modulator will require α and β command signals and therefore require a reverse Park Transform. A sine-triangle modulator will require a, b and c command signals and therefore require a reverse Clarke Transform done on α and β signals. A hyteresis modulator typically requires a, b and c. A pulse-pattern modulator can use either α and β or a, b, and c.

Figure 30A:
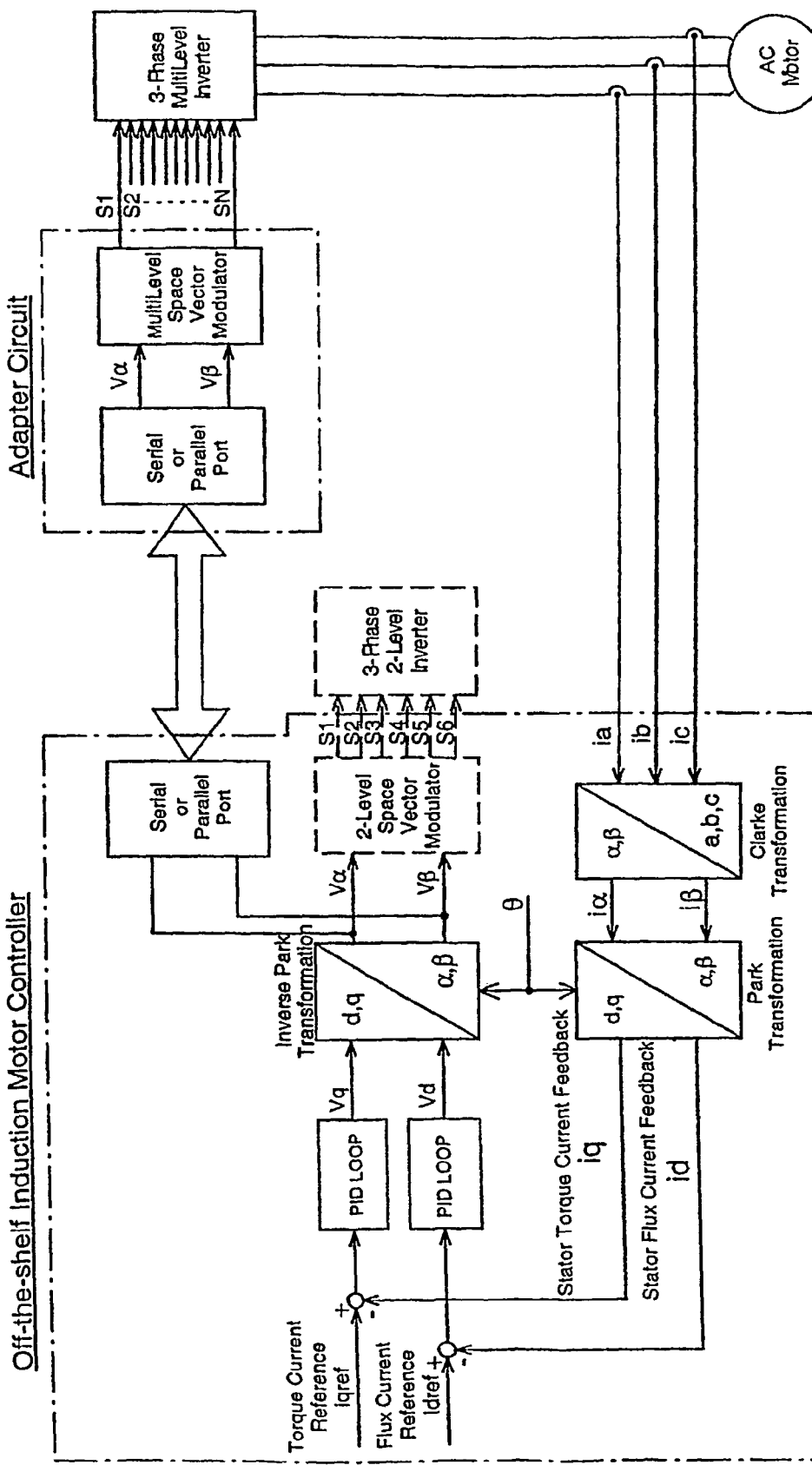
FIGS. 30A-30D illustrate exemplary embodiments of the modulator adapter circuit of the second variation of the invention, connected to a conventional motor controller.
Figure 30B:
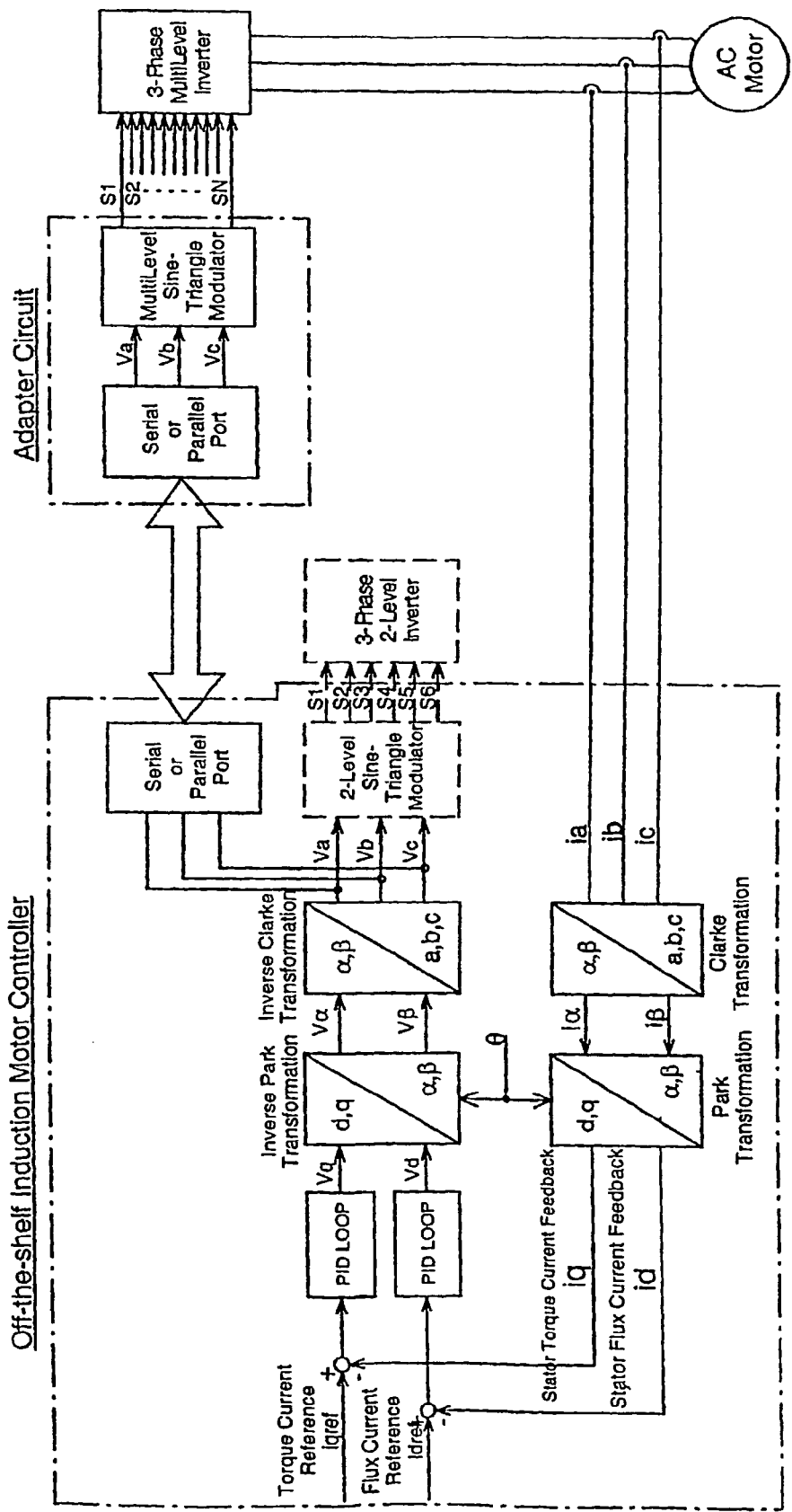
Figure 30C:
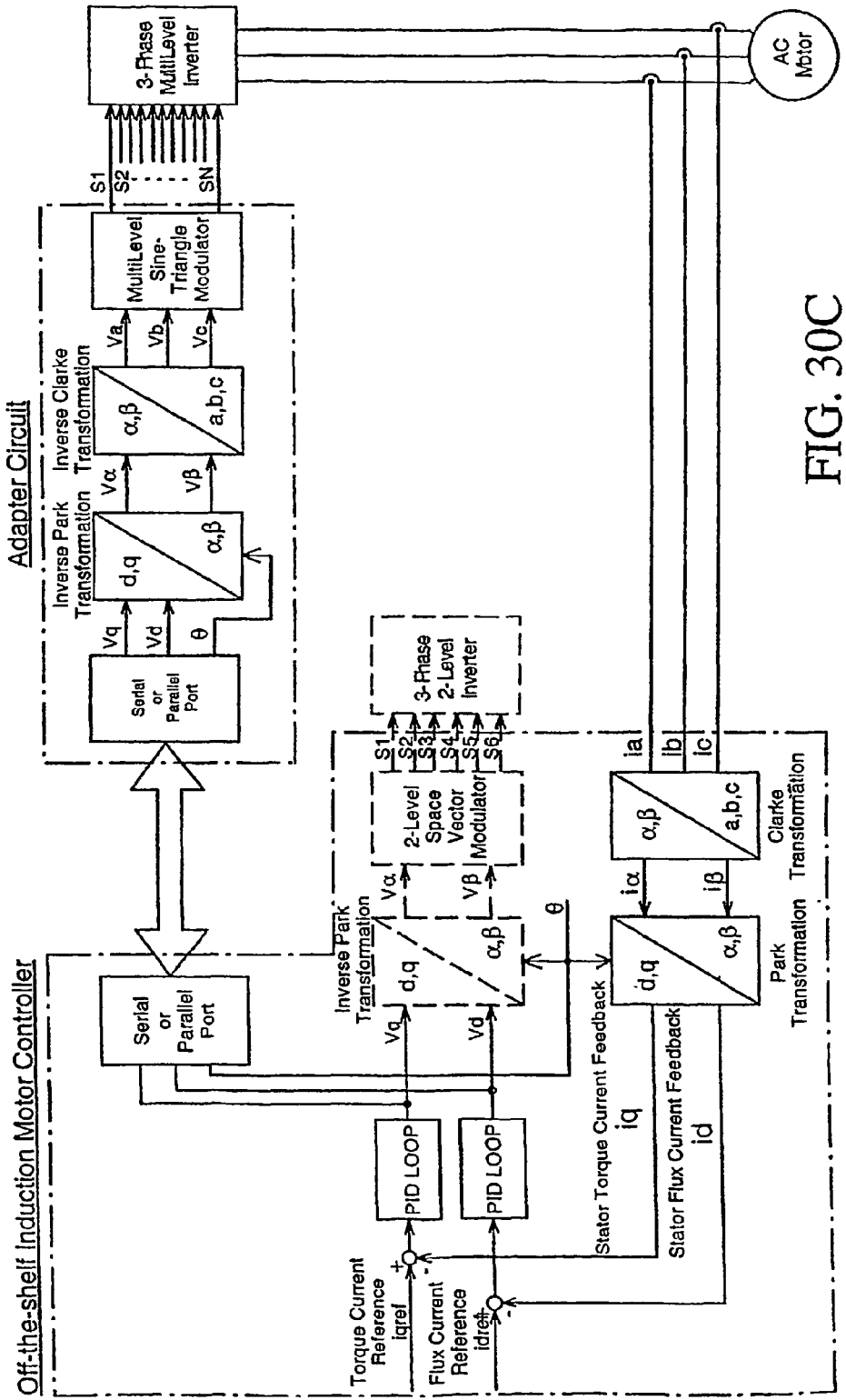
Figure 30D:
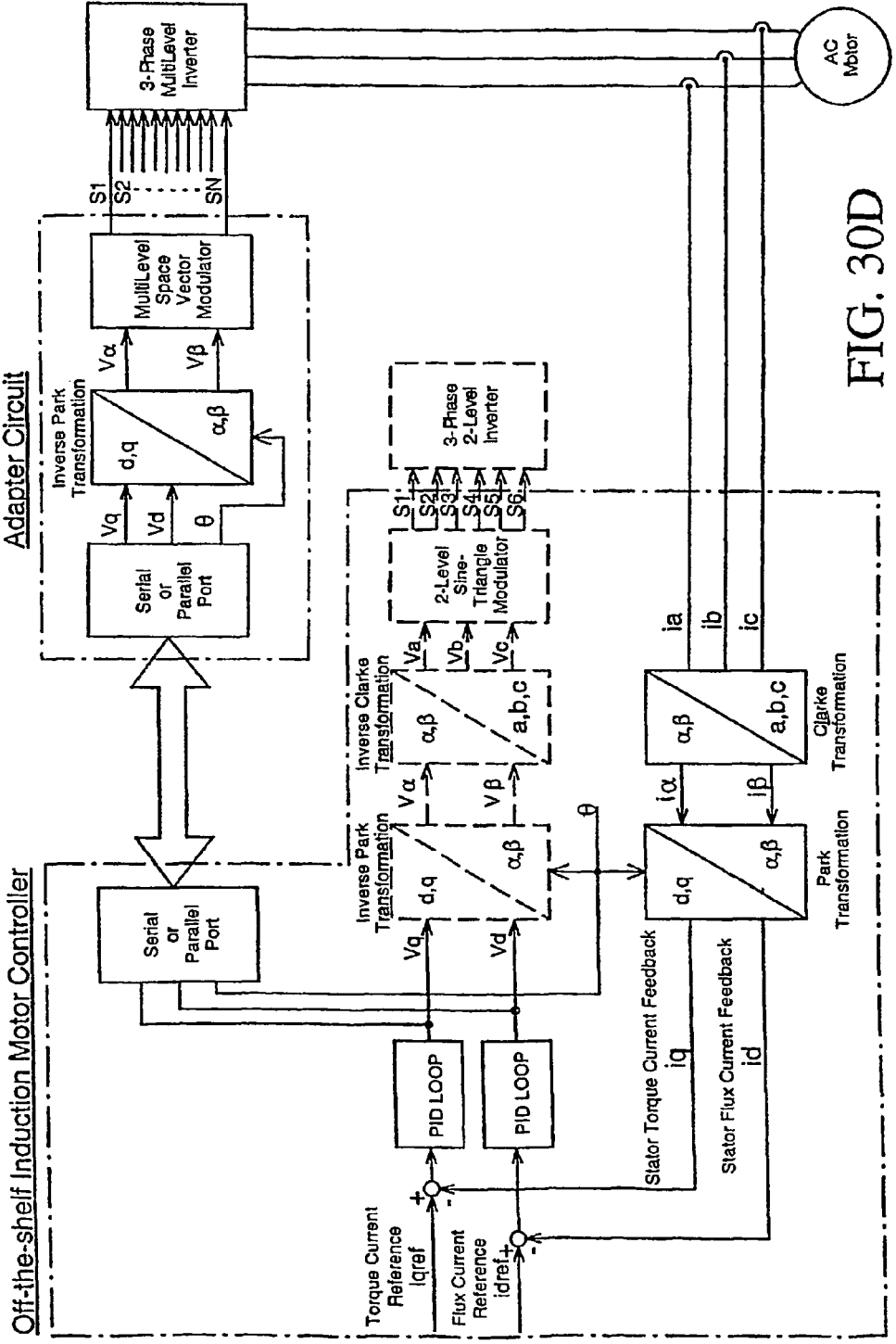

For example, if the modulator is a Space Vector Multilevel Modulator, then if the command signals transferred are Vα and Vβ, the command signals may be taken directly into the modulator without transform, as illustrated in FIG. 30A. If the modulator is a multilevel sine-triangle modulator, then if the command signals transferred are Va, Vb and Vc, the command signals may again be taken directly into the modulator without transform, as illustrated in FIG. 30B. On the other hand, with a multilevel sine-triangle modulator, if the command signals transferred are Vα and Vβ, an inverse Clarke Transformation is performed to obtain Va, Vb and Vc for feeding the modulator. Similarly, with any of these modulator, if the command signals transferred are Vd and Vq, then the appropriate mathematical transformations are done depending on the type of multilevel modulator used, such as illustrated in FIGS. 30C and 30D.

The command signals to be transferred are preferably chosen according to their availability and ease of transfer via the parallel or serial interface port. The modulator then generates the twelve-or-more signals $S_{1b}$-$S_{(N/3)b}$ that control the switches of the inverter bridge (1920).

The drive system illustrated in FIG. 22 is for a three-level system. As with the first variation, the system scales to accommodate four-and-higher level systems.

Two-Level Sine-Triangle Modulator

Figure 23A:
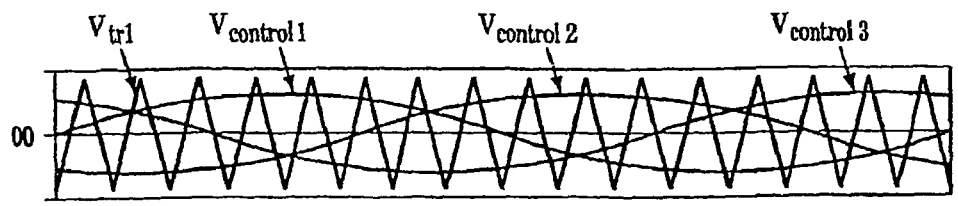
FIGS. 23A-23C demonstrate sine-triangle comparison modulation for a two-level system.
Figure 23B:
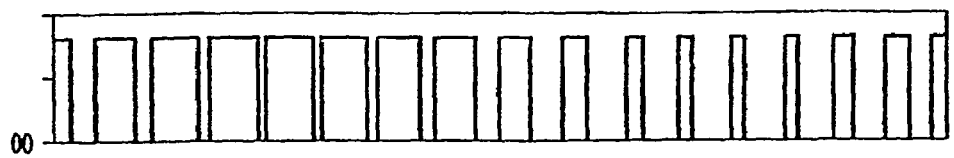
Figure 23C:
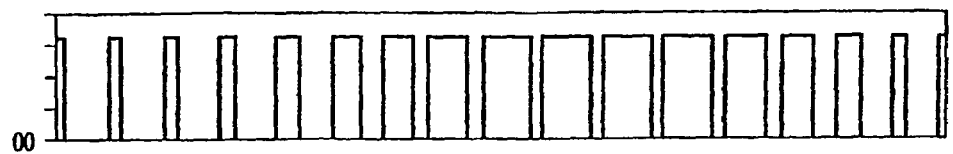

As a further explanation of such modulation schemes, and to contrast the first and second variations of the invention, two-level sine-triangle modulation is illustrated in FIGS. 23A-23C. FIG. 23A shows the three sinusoids extracted from the vector control signals ($v_{control1}$, $v_{control2}$, $v_{control3}$), together with a triangular-waveform carrier ($v_{tri}$) used to convert the sinusoids into pulse-width modulated signals. The frequency of the sinusoids is the desired motor frequency. By varying the frequency of the sinusoids, the motor shaft speed is changed. The amplitude and the phase of the sinusoids are dependent on the motor torque and motor flux requirements in case of vector control. In case of scalar control the amplitude of the sinusoids is independent of the motor status. The carrier frequency is set based on the switching frequency capability of the power semiconductor switches, as well as the drive's cooling capability.

The three pairs of modulated signals ($A_{1b}$ and $A_{2b}$) output from the Two-level Sine-triangle Modulator are generated by comparing the carrier frequency and the sinusoids. For example, to generate a pulse-width modulated signal $A_{11}$, $A_{11}$ is set low when the carrier signal $v_{tri}$ exceeds the sinusoid $v_{control1}$ as shown in FIG. 23B. Similarly, pulse-width modulated signal $A_{12}$ is set low when the carrier signal $v_{tri}$ exceeds the sinusoid $v_{control2}$, as illustrated in FIG. 23C.

Figure 24:
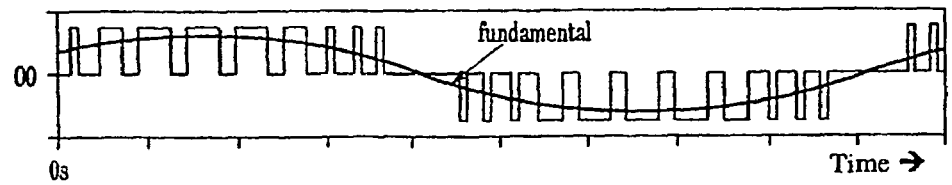
FIG. 24 illustrates two-level phase-to-phase (or line-to-line) voltage for the sine-triangle modulation scheme of FIGS. 23B and 23C, with an overlaid imaginary fundamental component.

Performing a phase-to-phase voltage comparison, subtracting $A_{12}$ from $A_{11}$, as shown in FIG. 24, the superimposed sine wave shows the fundamental portion of the pulsating waveform. A spectrum analysis of the resulting output voltages from the inverter (FIG. 25) shows this fundamental, as well as the carrier and harmonic contents.

The fundamental component is important because it is the critical to generating useful torque in an induction motor. Harmonics generate vibrations and heat, and are therefore considered losses. As shown, the spectrum analysis of the output voltage has a strong fundamental component at 60Hz, as well as the carrier frequency component with its harmonics.

This two-level spectrum analysis is consistent with the output of a two-level inverter driven by an "off-the-shelf" two level control circuit, and is also consistent with the output of a multiple-level inverter in accordance with the first variation of the invention. In other words, the harmonic content of the drive voltages in the first variation of the invention are consistent with the harmonic content characteristics of the six modulated signals output from the two-level controller, upon which the twelve-or-more signals are based.

Multilevel Sine-Triangle Modulator

Figure 26A:
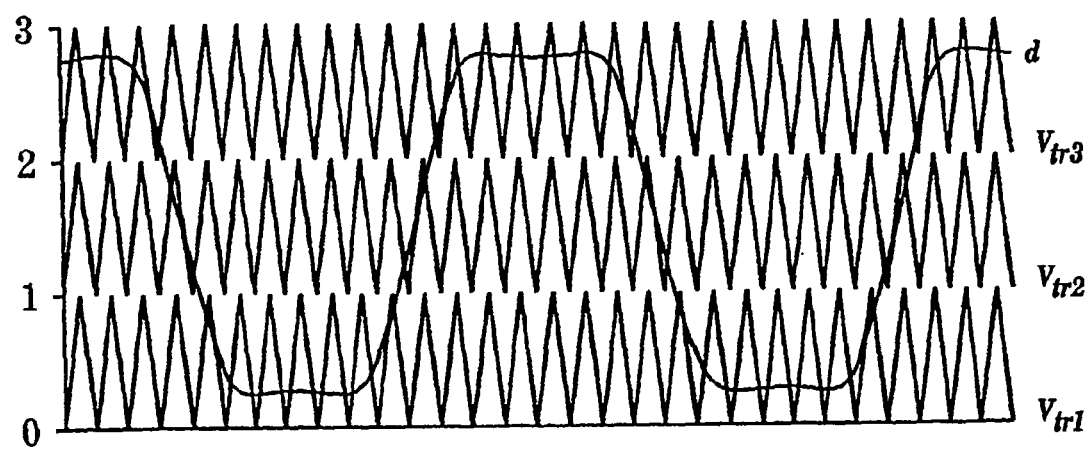
FIG. 26A illustrates a set of four-level sine-triangle modulation carrier waveforms and the sine wave resulting from the modulation.
Figure 26B:
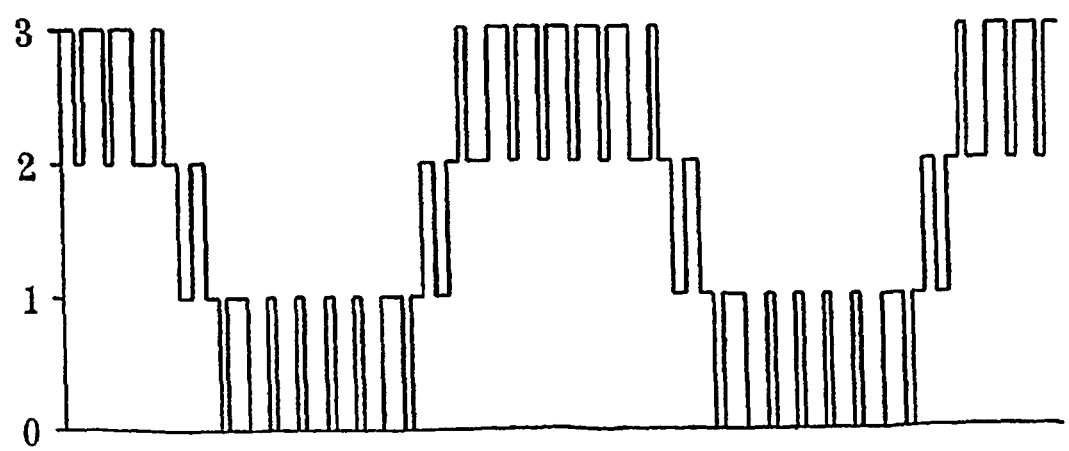
FIG. 26B illustrates the switching states of the phase output voltage from a four-level inverter bridge, for the sine wave of FIG. 26A.

FIG. 26A show the four level sine-triangle modulation wave forms. Depicted are one of the three-phase sine waves output from a four-level inverter bridge (the sine wave has the third harmonic injection, which distorts the sine wave but allows for higher output voltages), as well as the three vertically staggered in-phase triangular carrier signals which create the switching signals for the four-level inverter bridge having six switches per phase. The resulting switching states are apparent in the phase output voltage (one-of-three) in FIG. 26B, as would be output by the four-level inverter branch illustrated in FIG. 3B.

Whereas a two-level Sine-triangle Modulator has only one triangular carrier signal as depicted in FIG. 23A, a three-level Sine-triangle Modulator has two vertically staggered in-phase triangular carrier signals to generate the switching signals for the four switches per phase of a three-level inverter bridge (FIG. 3A) four switches per phase. A five-level Sine-triangle Modulator would have four vertically staggered in-phase triangular carrier signals, a six-level system would have five carriers, and so on.

Space Vector Modulation

The three-phase balanced output voltages of an inverter bridge can be represented by a rotating voltage vector. An inverter bridge with any number of levels has a finite number of switch states proportional to the number of switches which is proportional to the number of levels. For example, a two-level inverter bridge can generate eight discreet voltage states or fixed voltage vectors, while a three-level inverter bridge can generate twenty-seven voltage states or fixed voltage vectors. The voltage vector that represents the three-phase output voltage may assume infinite number of positions from zero to three-hundred-and-sixty degrees.

The Space Vector Modulator identifies the position of the output voltage vector in relation to the fixed voltage vectors of a given inverter bridge. It will always fall between two adjacent fixed voltage vectors. The modulator then creates a weighted average of these two adjacent fixed voltage vectors by varying the duty cycle between the two fixed vectors, during the switching period (which is defined by the switching frequency, which needs to be significantly higher than the fundamental frequency, i.e., if the fundamental frequency is 60 Hz, the switching frequency needs to be several times higher) in order to reproduce the given output voltage vector.

The advantage that a Space Vector Modulator presents is that it can reduce the switching frequency in comparison to a Sine-triangle Modulator, for a given output harmonic distortion. Increasing switching frequency will always reduce harmonic distortion but the consequence is increased power losses in the switches. Therefore, any modulation scheme which obtains a certain level of harmonic distortion, but with reduced switching frequency, brings a great advantage.

Hysteresis Modulation

The sinusoids that are generated by the control devices (which are also called reference signals) of an off-the-shelf induction motor controller, can be compared with the actual value of motor current or flux (the motor flux can be obtained by integrating the motor voltage) via a digital or analog comparator circuit with a pre-defined hysteresis. This hysteresis is measured in volts in case of a voltage source inverter, or in amperes in case of a current source inverter. If a digital comparator circuit is used, the actual value signals (also called feedback signals) need to be digitized via an analog-to-digital converter. The actual values of current or voltage are obtained with voltage or current sensing devices that are located inside the AC drive circuit. The output of the comparators is a pulsating signal that feed the switches of the three-phase inverter bridge. The resulting drive output is equal to the scaled reference signal, plus or minus the hysteresis value of the comparator circuit.

Pulse Pattern Modulation

The data generated by the scalar or vector control devices can be referenced to a number of pulse patterns stored in a digital circuit memory device, normally referred to as a table, such that each value of those control signals will call out a certain pulse pattern from the table that activate the AC drive inverter bridge switches. Even though this process requires a very fast microprocessor or digital logic circuit, it may allow for the AC drive output to have lower harmonic distortion by providing a pre-defined or pre-engineered inverter switch state to generate the output voltage and current.

Comparison Between Variations

Figure 25:
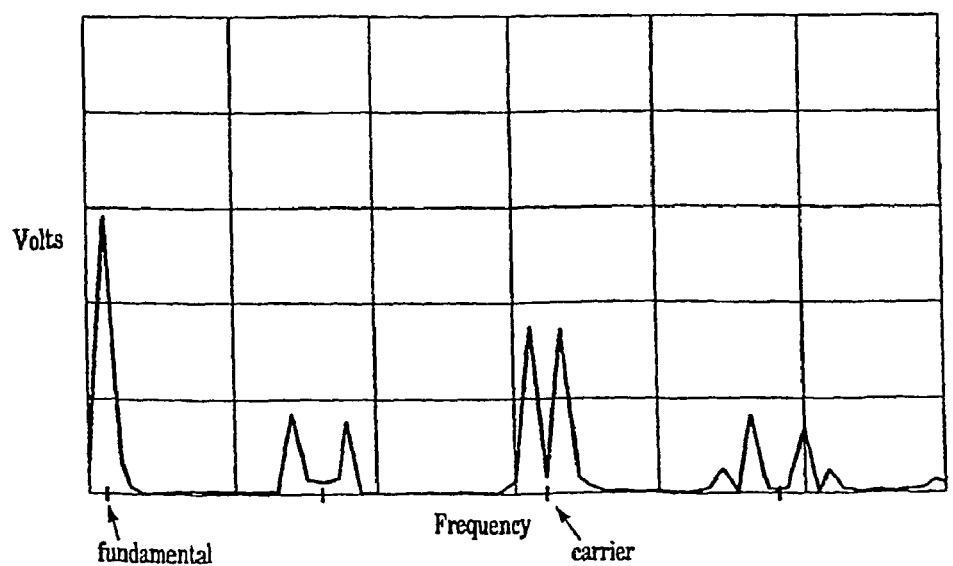
FIG. 25 is a spectrum analysis for the two-level phase-to-phase (or line-to-line) output voltage of FIG. 24.

There is a fundamental difference between the two variations of the invention in respect to the output voltage waveform obtained, which explains the difference in harmonic contents. The first variation of this invention manipulates the six modulated signals from the "off-the-shelf" controller and creates from them, twelve-or-more signals of a multiple-or-more level inverter bridge. The resulting medium-or-high voltage output is a two-level PWM voltage waveform just like the output of the low voltage AC drive, except for the higher voltage levels. This is why the first variation of the invention has high harmonic content as depicted in FIG. 25.

The second variation of this invention takes the control output signals of an off-the-shelf low voltage AC drive, via serial or parallel interface, and uses them in conjunction with a specialized multilevel modulator that generates twelve-or-more driving signals for the three-or-more level inverter bridge. The resulting medium-or-high voltage output is a three-or-more level PWM voltage waveform which resembles much closer the shape of a sine wave, and therefore has lower harmonic distortion than the first variation of the invention.

FIG. 27A-C show the output voltage waveforms for a three-level drive implementing the second variation of the invention. These wave forms are valid for any type of three-level AC drive using a three-level modulator. The phase voltage in FIG. 27A is measured between any of the three signals supplied to the motor (e.g., signals at 171-173 in FIG. 2) and the neutral point between the two capacitors at the output of the rectifier bridge (i.e., "neutral bus"). The line-to-line voltage in FIG. 27B is measured between any two of the three signals supplied to the motor. The line current illustrated in FIG. 27C is the motor current in any one of the three outputs to the motor.

The waveforms of 26B and 27A-C are an improvement over the two-level results illustrated in FIG. 24, which shows the line-to-line output voltage of a two-level AC drive superimposed by a sine wave that represents the fundamental component of that PWM waveform. When one compares the results from the two-level system with those of three-or-more level systems, one can see the much closer resemblance to a sine wave in the three-or-more level systems than in the two-level output. The closer the resemblance to a sine-wave, the more the carrier frequency component is reduced in the spectral analysis.

Both variations of the present invention allow for any of the existing, low cost, controllers, with their pre-designed complex front-end, man-machine interfacing, and motor control algorithms, to be utilized to drive a multilevel medium or high voltage motor.

It is contemplated that numerous modifications may be made to the embodiments and implementations of the present invention without departing from the spirit and scope of the invention as defined in the following claims.

What is claimed is:

1. A method of controlling a multiple-level inverter bridge with a two-level induction motor controller, the two-level induction motor controller outputting six modulated signals for controlling switching of six switches in a two-level inverter bridge, said method comprising:
   converting the six modulated signals into N time-coordinated signals, wherein $N \geq 12$ and N is an integer-multiple of 3;
   controlling N switches of the multiple-level inverter bridge by applying the N time-coordinated signals,
   wherein the multiple-level inverter bridge comprises three branches, each branch having N/3 switches and producing one phase of a three-phase output of the multiple-level inverter bridge, and never-less-than N/6 of the N/3 switches of a respective branch of the multiple level inverter bridge having a logical-off state.

2. The method of controlling a multiple-level inverter bridge with a two-level induction motor controller as defined in claim 1,
   wherein the six modulated signals are further characterized as being three pairs of modulated signals $A_{1b}$ and $A_{2b}$ ($b \in \{1, 2, 3\}$), each pair of modulated signals intended for controlling one-of-three branches of a two-level inverter bridge, each branch b producing one phase of a three-phase output of a two-level inverter bridge;
   said step of converting the six modulated signals into N time-coordinated including:
      generating three sets of time-coordinated signals $S_{1b}$ to $S_{(N/3)b}$ from the three pairs of modulated signals $A_{1b}$ and $A_{2b}$ output by the two-level induction motor controller, each set of time-coordinated signals $S_{1b}$ to $S_{(N/3)b}$ being timed to control the switches of branch b of the multiple-level inverter bridge, timing of each set of time-coordinated signals $S_{1b}$ to $S_{(N/3)b}$ varying based on at least a delay time of the switches of the respective branch b, and for each branch b, never-less-than N/6 of the time-coordinated signals $S_{1b}$ to $S_{(N/3)b}$ having a logical-off state; and
   said step of controlling said N switches of the multiple-level inverter bridge including:
      applying each set b of time-coordinated signals $S_{1b}$ to $S_{(N/3)b}$ to the N/3 switches of a corresponding branch b of the multiple-level inverter bridge.

3. The method of controlling a multiple-level inverter bridge with a two-level induction motor controller as defined in claim 2, said step of generating three sets of time-coordinated signals $S_{1b}$ to $S_{(N/3)b}$ from the three pairs of modulated signals $A_{1b}$ and $A_{2b}$ comprising:
   for time-coordinated signals $S_{1b}$ to $S_{(N/6)b}$, forming each $S_{yb}$ to have a logical-on state after, and a logical-off state before, $S_{(y+1)b}$, y being a series of integers from 1 to (N/6−1), and
   for time-coordinated signals $S_{(N/6+1)b}$ to $S_{(N/3)b}$, forming each $S_{zb}$ to have a logical-on state after, and a logical-off state before, $S_{(z-1)b}$, z being a series of integers from (N/6+2) to (N/3).

4. The method of controlling a multiple-level inverter bridge with a two-level induction motor controller as defined in claim 2, said step of generating the three sets of time-coordinated signals $S_{1b}$ to $S_{(N/3)b}$ from the three pairs of modulated signals $A_{1b}$ and $A_{2b}$ comprising:
   forming time-coordinated-signals $S_{1b}$ to $S_{(N/6)b}$ by adding a turn-on delay $d_{1x} \cdot \Delta t_b$, and a turn-off delay $d_{2x} \cdot \Delta t_b$, to the modulated signal $A_{1b}$; and
   forming time-coordinated signals $S_{(N/3)b}$ to $S_{(N/6+1)b}$ by adding a turn-on delay $d_{1x} \cdot \Delta t_b$, and a turn-off delay $d_{2x} \cdot \Delta t_b$, to the modulated signal $A_{2b}$;
   wherein $\Delta t_b$ is a turn-off delay time of a switch with a longest turn-off delay time of N/3 switches in a branch b of the multiple-level inverter bridge, $d_{1x} \geq 0$, $d_{2x} \geq 0$, and x=1 to N/6, and
   wherein every $d_{1x}$ has a different value, and every $d_{2x}$ has a different value.

5. The method of controlling a multiple-level inverter bridge with a two-level induction motor controller as defined in claim 4,
   wherein for time-coordinated signals $S_{1b}$ to $S_{(N/6)b}$, each $S_{yb}$ has a logical-on state after, and a logical-off state before, $S_{(y+1)b}$, y being a series of integers from 1 to (N/6−1), and
   wherein for time-coordinated signals $S_{(N/6+1)b}$ to $S_{(N/3)b}$, each $S_{zb}$ has a logical-on state after, and a logical-off state before, $S_{(z-1)b}$, z being a series of integers from (N/6+2) to (N/3).

6. The method of controlling a multiple-level inverter bridge with a two-level induction motor controller as defined in claim 2,
   wherein the multiple-level inverter has three levels and N=12, each branch b of the three-level inverter comprising four switches connected in series and controlled by time-coordinated signals $S_{1b}$-$S_{4b}$; and
   said step of generating the three sets of time-coordinated signals $S_{1b}$-$S_{4b}$ from the three pair of modulated signals $A_{1b}$ and $A_{2b}$ comprising:
      forming time-coordinated signal $S_{1b}$ by adding a turn-on delay of $3\Delta t_b$ to the modulated signal $A_{1b}$;
      forming time-coordinated signal $S_{2b}$ by adding a turn-on delay of $\Delta t_b$ and a turn-off delay of $2\Delta t_b$ to the modulated signal $A_{1b}$;
      forming time-coordinated signal $S_{3b}$ by adding a turn-on delay of $\Delta t_b$ and a turn-off delay of $2\Delta t_b$ to the modulated signal $A_{2b}$;
      forming time-coordinated signal $S_{4b}$ by adding a turn-on delay of $3\Delta t_b$ to the modulated signal $A_{2b}$;
      wherein $\Delta t_b$ is a turn-off delay time of a switch with a longest turn-off delay time of the four switches in the respective branch b.

7. The method of controlling a multiple-level inverter bridge with a two-level induction motor controller as defined in claim 2,
   wherein the multiple-level inverter has four levels and N=18, each branch b of the four-level inverter comprising six switches connected in series and controlled by time-coordinated signals $S_{1b}$-$S_{6b}$; and said step of generating the three sets of time-coordinated signals $S_{1b}$-$S_{6b}$ from the three pair of modulated signals $A_{1b}$ and $A_{2b}$ comprising:

forming time-coordinated signal $S_{1b}$ by adding a turn-on delay of $5\Delta t_b$ to the modulated signal $A_{1b}$;

forming time-coordinated signal $S_{2b}$ by adding a turn-on delay of $3\Delta t_b$ and a turn-off delay of $2\Delta t_b$ to the modulated signal $A_{1b}$;

forming time-coordinated signal $S_{3b}$ by adding a turn-on delay of $\Delta t_b$ and a turn-off delay of $4\Delta t_b$ to the modulated signal $A_{1b}$;

forming time-coordinated signal $S_{4b}$ by adding a turn-on delay of $\Delta t_b$ and a turn-off delay of $4\Delta t_b$ to the modulated signal $A_{2b}$;

forming time-coordinated signal $S_{5b}$ by adding a turn-on delay of $3\Delta t_b$ and a turn-off delay of $2\Delta t_b$ to the modulated signal $A_{2b}$;

forming time-coordinated signal $S_{6b}$ by adding a turn-on delay of $5\Delta t_b$ to the modulated signal $A_{2b}$;

wherein $\Delta t_b$ is a turn-off delay time of a switch with a longest turn-off delay time of the six switches in the respective branch b.

8. The method of controlling a multiple-level inverter bridge with a two-level induction motor controller as defined in claim 2, wherein the multiple-level inverter has five levels and N=24, each branch b of the five-level inverter comprising eight switches connected in series and controlled by time-coordinated signals $S_{1b}$-$S_{8b}$; and said step of generating the three sets of time-coordinated signals $S_{1b}$-$S_{8b}$ from the three pair of modulated signals $A_{1b}$ and $A_{2b}$ comprising:

forming time-coordinated signal $S_{1b}$ by adding a turn-on delay of $7\Delta t_b$ to the modulated signal $A_{1b}$;

forming time-coordinated signal $S_{2b}$ by adding a turn-on delay of $5\Delta t_b$ and a turn-off delay of $2\Delta t_b$ to the modulated signal $A_{1b}$;

forming time-coordinated signal $S_{3b}$ by adding a turn-on delay of $3\Delta t_b$ and a turn-off delay of $4\Delta t_b$ to the modulated signal $A_{1b}$;

forming time-coordinated signal $S_{4b}$ by adding a turn-on delay of $\Delta t_b$ and a turn-off delay of $6\Delta t_b$ to the modulated signal $A_{1b}$;

forming time-coordinated signal $S_{5b}$ by adding a turn-on delay of $\Delta t_b$ and a turn-off delay of $6\Delta t_b$ to the modulated signal $A_{2b}$;

forming time-coordinated signal $S_{6b}$ by adding a turn-on delay of $3\Delta t_b$ and a turn-off delay of $4\Delta t_b$ to the modulated signal $A_{2b}$;

forming time-coordinated signal $S_{7b}$ by adding a turn-on delay of $5\Delta t_b$ and a turn-off delay of $2\Delta t_b$ to the modulated signal $A_{2b}$;

forming time-coordinated signal $S_{8b}$ by adding a turn-on delay of $7\Delta t_b$ to the modulated signal $A_{2b}$;

wherein $\Delta t_b$ is a turn-off delay time of a switch with a longest turn-off delay time of the eight switches in the respective branch b.

9. An adapter circuit for controlling a multiple-level inverter bridge with a two-level induction motor controller, the two-level induction motor controller outputting six modulated signals for controlling switching in a two-level inverter bridge, and the multiple-level inverter bridge having N≧12 switches divided into 3 branches, the adapter circuit, comprising:

three pairs of modulated signal inputs $A_{1b}$ and $A_{2b}$ (b∈{1, 2, 3}), whereby the six modulated signals from the two-level induction motor controller are input;

three sets of time-coordinated signal outputs $S_{1b}$ to $S_{(N/3)b}$, wherein each set b of time-coordinated signals output via $S_{1b}$ to $S_{(N/3)b}$ is timed to control N/3 switches of branch b of the multiple-level inverter bridge; and timing circuitry comprising circuitry selected from the group consisting of combinatorial circuits, sequential circuits, delay elements, analog-based logic gates, programmable logic, and a combination thereof, generating time-coordinated signals output via $S_{1b}$ to $S_{(N/6)b}$ from modulated signals input via $A_{1b}$, and generating time-coordinated signals output via $S_{(N/6+1)b}$ to $S_{(N/3)b}$ from modulated signals input via $A_{2b}$, adding at least a turn-on delay or turn-off delay to each modulated signal input via $A_{1b}$ and $A_{2b}$, wherein for each set b of time-coordinated signals output via $S_{1b}$ to $S_{(N/3)b}$, never-less-than N/6 of the N/3 time-coordinated signals has a logical-off state.

10. The adapter circuit as defined in claim 9, wherein for time-coordinated signals output via $S_{1b}$ to $S_{(N/6)b}$, each $S_{yb}$ has a logical-on state after, and a logical-off state before, $S_{(y+1)b}$, y being a series of integers from 1 to (N/6−1), and wherein for time-coordinated signals output via $S_{(N/6+1)b}$ to $S_{(N/3)b}$, each $S_{zb}$ has a logical-on state after, and a logical-off state before, $S_{(z−1)b}$, z being a series of integers from (N/6+2) to (N/3).

11. The adapter circuit as defined in claim 9, wherein within each set b of time-coordinated signals output via $S_{1b}$ to $S_{(N/3)b}$:

each time-coordinated signal output via $S_{1b}$ to $S_{(N/6)b}$ is formed by adding a turn-on delay $d_{1x} \cdot \Delta t_b$ and a turn-off delay $d_{2x} \cdot \Delta t_b$ to the modulated signal input via $A_{1b}$; and each time-coordinated signal output via $S_{(N/3)b}$ to $S_{(N/6+1)b}$ is formed by adding a turn-on delay $d_{1x} \cdot \Delta t_b$ and a turn-off delay $d_{2x} \cdot \Delta t_b$, to the modulated signal input via $A_{2b}$;

wherein $\Delta t_b$ is a turn-off delay time of a switch with a longest turn-off delay time of N/3 switches in a branch b of the multiple-level inverter bridge, $d_{1x} \geq 0$, $d_{2x} \geq 0$, and x=1 to N/6, and wherein every $d_{1x}$ has a different value, and every $d_{2x}$ has a different value.

12. The adapter circuit as defined in claim 11, wherein for time-coordinated signals output via $S_{1b}$ to $S_{(N/6)b}$, each $S_{yb}$ has a logical-on state after, and a logical-off state before, $S_{(y+1)b}$, y being a series of integers from 1 to (N/6−1), and wherein for time-coordinated signals output via $S_{(N/6+1)b}$ to $S_{(N/3)b}$, each $S_{zb}$ has a logical-on state after, and a logical-off state before, $S_{(z−1)b}$, z being a series of integers from (N/6+2) to (N/3).

13. The adapter circuit as defined in claim 11, wherein N=12, $d_{11}$=3, $d_{12}$=1, $d_{21}$=0, and $d_{22}$=2.

14. The adapter circuit as defined in claim 11, wherein N=18, $d_{11}$=5, $d_{12}$=3, $d_{13}$=1, $d_{21}$=0, $d_{22}$=2, and $d_{23}$=4.

15. The adapter circuit as defined in claim 11, wherein N=24, $d_{11}$=7, $d_{12}$=5, $d_{13}$=3, $d_{14}$=1, $d_{21}$=0, $d_{22}$=2, $d_{23}$=4, and $d_{24}$=6.

16. The adapter circuit as defined in claim 9, said combinatorial circuits comprising AND and OR gates, and said sequential circuits comprising flip-flops.

17. The adapter circuit as defined in claim 9, wherein said adapter circuit comprises a Complex Programmable Logic Device.

18. An adapter for controlling a multiple-level inverter bridge with a two-level induction motor controller, the two-level induction motor controller outputting six modulated signals for controlling switching in a two-level inverter bridge, and the multiple-level inverter bridge having $N \geq 12$ switches divided into 3 branches, the adapter, comprising:

three pairs of modulated signal inputs $A_{1b}$ and $A_{2b}$ (b∈ {1, 2, 3}), whereby the six modulated signals from the two-level induction motor controller are input;

three sets of time-coordinated signal outputs $S_{1b}$ to $S_{(N/3)b}$, wherein each set b of time-coordinated signals output via $S_{1b}$ to $S_{(N/3)b}$ is timed to control N/3 switches of branch b of the multiple-level inverter bridge; and first conversion means for generating time-coordinated signals output via $S_{1b}$ to $S_{(N/6)b}$ from a modulated signals input via $A_{1b}$, adding at least a turn-on delay or turn-off delay to generate $S_{1b}$ to $S_{(N/6)b}$ from the modulated signal input via $A_{1b}$, second conversion means for generating time-coordinated signals output via $S_{(N/6+1)b}$ to $S_{(N/3)b}$ from a modulated signal input via $A_{2b}$, adding at least a turn-on delay or turn-off delay to generate $S_{(N/6+1)b}$ to $S_{(N/3)b}$ from the modulated signal input via $A_{2b}$, wherein for each set b of time-coordinated signals output via $S_{1b}$ to $S_{(N/3)b}$, never-less-than N/6. of the N/3 time-coordinated signals has a logical-off state.

19. An induction motor drive system for driving a three-phase motor, comprising:

a two-level induction motor controller, outputting signals for controlling a two-level inverter bridge;

a multiple-level inverter bridge, having $N \geq 12$ switches arranged to form 3 branches, each branch providing one phase of a three-phase output for driving the three-phase motor; and an adapter circuit, generating N time-coordinated signals controlling the N switches of the multiple-level inverter bridge from said signals output by the two-level induction motor controller.

20. The induction motor drive system as defined in claim 19, wherein the signals output from the two-level induction motor controller comprise three pairs of modulated signal inputs $A_{1b}$ and $A_{2b}$ (b∈ {1, 2, 3 }), intended for controlling switching in a two-level inverter bridge; and wherein the N-time coordinated signals are further characterized as being three sets of time-coordinated signals $S_{1b}$ to $S_{(N/3)b}$, each set being timed to control the N/3 switches of branch b of the multiple-level inverter bridge, and within each set b, never-less-than N/6 of the time-coordinated signals $S_{1b}$ to $S_{(N/3)b}$ having a logical-off state; and wherein the adapter circuit comprises circuits selected from the group consisting of combinatorial circuits, sequential circuits, delay elements, analog-based logic gates, programmable logic, and a combination thereof generating the time-coordinated signals $S_{1b}$ to $S_{(N/6)b}$ from the modulated signal $A_{1b}$, and timing circuitry generating time-coordinated signals $S_{(N/6+1)b}$ to $S_{(N/3)b}$ from the modulated signal $A_{2b}$, forming $S_{1b}$ to $S_{(N/3)b}$ by adding at least a turn-on delay or turn-off delay to the modulated signal $A_{1b}$ and $A_{2b}$.

21. The induction motor drive system as defined in claim 20, wherein for time-coordinated signals $S_{1b}$ to $S_{(N/6)b}$, each $S_{yb}$ has a logical-on state after, and a logical-off state before, $S_{(y+1)b}$, y being a series of integers from 1 to (N/6−1), and wherein for time-coordinated signals $S_{(N/6+1)b}$ to $S_{(N/3)b}$, each $S_{zb}$ has a logical-on state after, and a logical-off state before, $S_{(z-1)b}$, z being a series of integers from (N/6+2) to (N/3).

22. The induction motor drive system as defined in claim 20, wherein within each set b of time-coordinated signals $S_{1b}$ to $S_{(N/3)b}$:

each time-coordinated signal $S_{1b}$ to $S_{(N/6)b}$ is formed by adding a turn-on delay $d_{1x} \cdot \Delta t_b$ and a turn-off delay $d_{2x} \cdot \Delta t_b$ to the modulated signal $A_{1b}$; and each time-coordinated signal $S_{(N/3)b}$ to $S_{(N/6+1)b}$ is formed by adding a turn-on delay $d_{1x} \cdot \Delta t_b$ and a turn-off delay $d_{2x} \cdot \Delta t_b$, to the modulated signal $A_{2b}$;

wherein $\Delta t_b$ is a turn-off delay time of a switch with a longest turn-off delay time of N/3 switches in a branch b of the multiple-level inverter bridge, $d_{1x} \geq 0$, $d_{2x} \geq 0$, and x=1 to N/6, and wherein every $d_{1x}$ has a different value, and every $d_{2x}$ has a different value.

23. The induction motor drive system as defined in claim 22, wherein for time-coordinated signals $S_{1b}$ to $S_{(N/6)b}$, each $S_{yb}$ has a logical-on state after, and a logical-off state before, $S^{(y+1)b}$, y being a series of integers from 1 to (N/6−1), and wherein for time-coordinated signals $S_{(N/6+1)b}$ to $S_{(N/3)b}$, each $S_{zb}$ has a logical-on state after, and a logical-off state before, $S_{(z-1)b}$, z being a series of integers from (N/6+2) to (N/3).

24. The induction motor drive system as defined in claim 19, wherein the signals output from the two-level induction motor controller comprise three pairs of modulated signal inputs $A_{1b}$ and $A_{2b}$ (b∈ {1, 2, 3}), intended for controlling switching in a two-level inverter bridge; and wherein the N-time coordinated signals are further characterized as being three sets of time-coordinated signals $S_{1b}$ to $S_{(N/3)b}$, each set being timed to control the N/3 switches of branch b of the multiple-level inverter bridge, and within each set b, never-less-than N/6 of the time-coordinated signals $S_{1b}$ to $S_{(N/3)b}$ having a logical-off state; and wherein the adapter circuit comprises:

first conversion means for generating time-coordinated signals output via $S_{1b}$ to $S_{(N/6)b}$ from a modulated signals input via $A_{1b}$, adding at least a turn-on delay or turn-off delay to generate $S_{1b}$ to $S_{(N/6)b}$ from the modulated signal input via $A_{1b}$, and second conversion means for generating time-coordinated signals output via $S_{(N/6+1)b}$ to $S_{(N/3)b}$ from a modulated signal input via $A_{2b}$, adding at least a turn-on delay or turn-off delay to generate $S_{(N/6+1)b}$ to $S_{(N/3)b}$ from the modulated signal input via $A_{2b}$.

25. A method of controlling a multiple-level inverter bridge with a two-level induction motor controller, the two-level induction motor controller comprising a regulator and an internal modulator for a two-level inverter bridge, command signals being output from the regulator for control of the internal modulator, the method comprising:

outputting the command signals from the two-level induction motor controller via a first interface port of the two-level induction motor controller;

transmitting the command signals output from said first interface port via a serial or parallel connection;

inputting the transmitted command signals into an external adapter circuit via a second interface port, said adapter circuit comprising a modulator; and generating, in the modulator of the external adapter circuit and based on the command signals input via said second interface port, twelve-or-more time-coordinated signals for controlling an inverter bridge having three-or-more levels.

26. The method of controlling a multiple-level inverter bridge as defined in claim 25, further comprising:

controlling twelve-or-more switches in a multiple-level inverter bridge by applying the twelve-or-more time-coordinated signals generated by the modulator of the external adapter circuit.

27. The method of controlling a multiple-level inverter bridge as defined in claim 25, wherein said steps of outputting, transmitting, and inputting result in updated command signals being periodically provided to the external adapter circuit.

28. The method of controlling a multiple-level inverter bridge as defined in claim 25, wherein the two-level induction motor controller utilizes vector control, said regulator being a flux and torque regulator and said command signals output from the two-level induction motor controller being flux (d) and torque (q) command signals.

29. The method of controlling a multiple-level inverter bridge as defined in claim 28, said method further comprising:

transforming the flux (d) and torque (q) command signals into $\alpha$ and $\beta$ command signals via a Park Transform, after inputting the transmitted command signals into the external adapter circuit, but before generating the twelve-or-more time coordinated signals in the modulator, said modulator of the external adapter circuit generating the twelve-or-more time coordinated signals using the $\alpha$ and $\beta$ command signals.

30. The method of controlling a multiple-level inverter bridge as defined in claim 28, said method further comprising:

transforming the flux (d) and torque (q) command signals into signals $\alpha$ and $\beta$ signals via a Park Transform, after inputting the transmitted command signals into the external adapter circuit, transforming signals $\alpha$ and $\beta$ into three-phase a, b, and c command signals, before generating the twelve-or-more time coordinated signals in the modulator, said modulator of the external adapter circuit generating the twelve-or-more time coordinated signals using the a, b, and c command signals.

31. The method of controlling a multiple-level inverter bridge as defined in claim 25, wherein the two-level induction motor controller utilizes vector control, said regulator being a flux and torque regulator and said command signals output from the two-level induction motor controller being $\alpha$ and $\beta$ command signals.

32. The method of controlling a multiple-level inverter bridge as defined in claim 31, said method further comprising:

transforming the $\alpha$ and $\beta$ command signals into three-phase a, b, and c command signals, after inputting the transmitted command signals into the external adapter circuit, but before generating the twelve-or-more time coordinated signals in the modulator, said modulator of the external adapter circuit generating the twelve-or-more time coordinated signals using the a, b, and c command signals.

33. The method of controlling a multiple-level inverter bridge as defined in claim 25, wherein the two-level induction motor controller utilizes vector control, said regulator being a flux and torque regulator and said command signals output from said two-level induction motor controller being three-phase a, b, and c command signals.

34. The method of controlling a multiple-level inverter bridge as defined in claim 25, wherein the two-level induction motor controller utilizes scalar control, said regulator being a voltage regulator and said command signals output from said two-level induction motor controller being frequency and voltage command signals.

35. The method of controlling a multiple-level inverter bridge as defined in claim 25, wherein the first interface port is a Controller Area Network serial interface.

36. The method of controlling a multiple-level inverter bridge as defined in claim 25, wherein the modulator of the external adapter circuit is selected from the group consisting of a space-vector modulator, a hysteresis modulator, pulse pattern modulator, and a sine-triangle modulator.

* * * * *